(12) United States Patent
Walker et al.

(10) Patent No.: US 8,655,307 B1
(45) Date of Patent: Feb. 18, 2014

(54) SYSTEM AND METHOD FOR DEVELOPING, UPDATING, AND USING USER DEVICE BEHAVIORAL CONTEXT MODELS TO MODIFY USER, DEVICE, AND APPLICATION STATE, SETTINGS AND BEHAVIOR FOR ENHANCED USER SECURITY

(71) Applicant: Lookout, Inc., San Francisco, CA (US)

(72) Inventors: Samuel Alexander Walker, Littleton, CO (US); Ayan Kanti Mandal, Oakland, CA (US); Devesh Senapati, Bloomfield Hills, MI (US); Kevin Patrick Mahaffey, San Francisco, CA (US); David Luke Richardson, San Francisco, CA (US); Brian James Buck, Livermore, CA (US)

(73) Assignee: Lookout, Inc., San Francisco, CA (US)

( * ) Notice: Subject to any disclaimer, the term of this patent is extended or adjusted under 35 U.S.C. 154(b) by 5 days.

(21) Appl. No.: 13/686,028

(22) Filed: Nov. 27, 2012

Related U.S. Application Data

(60) Provisional application No. 61/719,233, filed on Oct. 26, 2012.

(51) Int. Cl.
*H04M 11/00* (2006.01)
*H04B 1/38* (2006.01)
*H04B 1/16* (2006.01)
*G06F 1/32* (2006.01)
*G06F 1/26* (2006.01)

(52) U.S. Cl.
USPC ......... 455/405; 455/574; 455/343.5; 713/321

(58) Field of Classification Search
USPC .................. 455/405, 571–574, 13.4, 69, 522, 455/343.1–343.6; 713/300, 320–321
See application file for complete search history.

(56) References Cited

U.S. PATENT DOCUMENTS

| 3,416,032 A | 12/1968 | Jahns et al. |
| 4,553,257 A | 11/1985 | Mori et al. |

(Continued)

FOREIGN PATENT DOCUMENTS

| GB | 2430588 | 3/2007 |
| WO | 2007081356 | 7/2001 |

(Continued)

OTHER PUBLICATIONS

Prey, available at <http://preyproject.coml>, retrieved Jan. 10, 2012, 4 pages.

(Continued)

*Primary Examiner* — Mahendra Patel
*Assistant Examiner* — Michael Mapa
(74) *Attorney, Agent, or Firm* — Dergosits & Noah LLP

(57) ABSTRACT

Security is enhanced for a user of a mobile device by monitoring and controlling resource usage. Usage information associated with a mobile device is collected. The collected information is used to build a usage model for a user of the mobile device that describes a set of contexts in which the mobile device is used. User activity on the device is monitored and the model is consulted to determine a first time after which it will be acceptable for a battery of the mobile device to fall below a threshold charge level. Based on the monitored activity, a prediction of a second time is made for when the battery will fall below the threshold charge level. If the second time is before or a predetermined amount of time before the first time, usage of the battery is reduced, else, usage of the battery is not reduced.

22 Claims, 17 Drawing Sheets

(56) References Cited

U.S. PATENT DOCUMENTS

| | | |
|---|---|---|
| 5,319,776 A | 6/1994 | Hile et al. |
| 5,574,775 A | 11/1996 | Miller, II et al. |
| 5,715,518 A | 2/1998 | Barrere et al. |
| 6,185,689 B1 | 2/2001 | Todd et al. |
| 6,269,456 B1 | 7/2001 | Hodges et al. |
| 6,272,353 B1 | 8/2001 | Dicker et al. |
| 6,301,668 B1 | 10/2001 | Gleichauf et al. |
| 6,453,345 B2 | 9/2002 | Trcka et al. |
| 6,529,143 B2 | 3/2003 | Mikkola et al. |
| 6,696,941 B2 | 2/2004 | Baker |
| 6,792,543 B2 | 9/2004 | Pak et al. |
| 6,892,225 B1 | 5/2005 | Tu et al. |
| 6,907,530 B2 | 6/2005 | Wang |
| 6,959,184 B1 | 10/2005 | Byers et al. |
| 7,020,895 B2 | 3/2006 | Albrecht |
| 7,023,383 B2 | 4/2006 | Stilp et al. |
| 7,069,589 B2 | 6/2006 | Schmall et al. |
| 7,096,368 B2 | 8/2006 | Kouznetsov et al. |
| 7,123,933 B2 | 10/2006 | Poor et al. |
| 7,127,455 B2 | 10/2006 | Carson et al. |
| 7,159,237 B2 | 1/2007 | Schneier et al. |
| 7,171,690 B2 | 1/2007 | Kouznetsov et al. |
| 7,178,166 B1 | 2/2007 | Taylor et al. |
| 7,181,252 B2 | 2/2007 | Komsi |
| 7,210,168 B2 | 4/2007 | Hursey et al. |
| 7,228,566 B2 | 6/2007 | Caceres et al. |
| 7,236,598 B2 | 6/2007 | Sheymov et al. |
| 7,237,264 B1 | 6/2007 | Graham et al. |
| 7,266,810 B2 | 9/2007 | Karkare et al. |
| 7,290,276 B2 | 10/2007 | Ogata |
| 7,304,570 B2 | 12/2007 | Thomas et al. |
| 7,305,245 B2 | 12/2007 | Alizadeh-Shabdiz |
| 7,308,256 B2 | 12/2007 | Morota et al. |
| 7,308,712 B2 | 12/2007 | Banzhof |
| 7,325,249 B2 | 1/2008 | Sutton et al. |
| 7,356,835 B2 | 4/2008 | Gancarcik et al. |
| 7,376,969 B1 | 5/2008 | Njemanze et al. |
| 7,386,297 B2 | 6/2008 | An |
| 7,392,043 B2 | 6/2008 | Kouznetsov et al. |
| 7,392,543 B2 | 6/2008 | Szor |
| 7,397,424 B2 | 7/2008 | Houri |
| 7,397,434 B2 | 7/2008 | Mun et al. |
| 7,401,359 B2 | 7/2008 | Gartside et al. |
| 7,403,762 B2 | 7/2008 | Morgan et al. |
| 7,414,988 B2 | 8/2008 | Jones et al. |
| 7,415,270 B2 | 8/2008 | Wilhelmsson et al. |
| 7,415,536 B2 | 8/2008 | Nakazawa |
| 7,433,694 B2 | 10/2008 | Morgan et al. |
| 7,467,206 B2 | 12/2008 | Moore et al. |
| 7,471,954 B2 | 12/2008 | Brachet et al. |
| 7,472,422 B1 | 12/2008 | Agbabian |
| 7,474,897 B2 | 1/2009 | Morgan et al. |
| 7,493,127 B2 | 2/2009 | Morgan et al. |
| 7,502,620 B2 | 3/2009 | Morgan et al. |
| 7,515,578 B2 | 4/2009 | Alizadeh-Shabdiz |
| 7,525,541 B2 | 4/2009 | Chun et al. |
| 7,539,882 B2 | 5/2009 | Jessup et al. |
| 7,551,579 B2 | 6/2009 | Alizadeh-Shabdiz |
| 7,551,929 B2 | 6/2009 | Alizadeh-Shabdiz |
| 7,634,800 B2 | 12/2009 | Ide et al. |
| 7,685,132 B2 | 3/2010 | Hyman |
| 7,696,923 B2 | 4/2010 | Houri |
| 7,768,963 B2 | 8/2010 | Alizadeh-Shabdiz |
| 7,774,637 B1 | 8/2010 | Beddoe et al. |
| 7,783,281 B1 | 8/2010 | Cook et al. |
| 7,809,353 B2 | 10/2010 | Brown et al. |
| 7,809,366 B2 | 10/2010 | Rao et al. |
| 7,809,936 B2 | 10/2010 | Einloth et al. |
| 7,818,017 B2 | 10/2010 | Alizadeh-Shabdiz et al. |
| 7,835,754 B2 | 11/2010 | Alizadeh-Shabdiz et al. |
| 7,856,234 B2 | 12/2010 | Alizadeh-Shabdiz et al. |
| 7,856,373 B2 | 12/2010 | Ullah |
| 7,861,303 B2 | 12/2010 | Kouznetsov et al. |
| 7,907,966 B1 | 3/2011 | Mammen |
| 7,916,661 B2 | 3/2011 | Alizadeh-Shabdiz et al. |
| 7,991,854 B2 | 8/2011 | Bahl |
| 7,999,742 B2 | 8/2011 | Alizadeh-Shabdiz et al. |
| 8,014,788 B2 | 9/2011 | Alizadeh-Shabdiz et al. |
| 8,019,357 B2 | 9/2011 | Alizadeh-Shabdiz et al. |
| 8,031,657 B2 | 10/2011 | Jones et al. |
| 8,037,203 B2 | 10/2011 | Accapadi et al. |
| 8,054,219 B2 | 11/2011 | Alizadeh-Shabdiz |
| 8,087,082 B2 | 12/2011 | Bloch et al. |
| 8,089,398 B2 | 1/2012 | Alizadeh-Shabdiz |
| 8,089,399 B2 | 1/2012 | Alizadeh-Shabdiz |
| 8,090,386 B2 | 1/2012 | Alizadeh-Shabdiz |
| 8,108,555 B2 | 1/2012 | Awadallah et al. |
| 8,121,617 B1 | 2/2012 | LaGrotta et al. |
| 8,126,456 B2 | 2/2012 | Lotter et al. |
| 8,127,158 B2 | 2/2012 | Jessup et al. |
| 8,127,358 B1 | 2/2012 | Lee |
| 8,135,395 B2 | 3/2012 | Cassett et al. |
| 8,195,196 B2 | 6/2012 | Haran et al. |
| 8,259,568 B2 | 9/2012 | Laudermilch et al. |
| 8,261,351 B1 | 9/2012 | Thornewell et al. |
| 8,266,288 B2 | 9/2012 | Banerjee et al. |
| 8,266,324 B2 | 9/2012 | Baratakke et al. |
| 8,346,860 B2 | 1/2013 | Berg et al. |
| 8,356,080 B2 | 1/2013 | Luna et al. |
| 8,364,785 B2 | 1/2013 | Plamondon |
| 8,370,580 B2 | 2/2013 | Mobarak et al. |
| 8,370,933 B1 | 2/2013 | Buckler |
| 8,401,521 B2 | 3/2013 | Bennett et al. |
| 8,447,856 B2 | 5/2013 | Drako |
| 8,463,915 B1 | 6/2013 | Kim |
| 8,484,332 B2 | 7/2013 | Bush et al. |
| 8,504,775 B2 | 8/2013 | Plamondon |
| 2001/0044339 A1 | 11/2001 | Cordero et al. |
| 2002/0042886 A1 | 4/2002 | Lahti et al. |
| 2002/0087483 A1 | 7/2002 | Harif |
| 2002/0108058 A1 | 8/2002 | Iwamura |
| 2002/0183060 A1 | 12/2002 | Ko et al. |
| 2002/0191018 A1 | 12/2002 | Broussard |
| 2003/0028803 A1 | 2/2003 | Bunker et al. |
| 2003/0046134 A1 | 3/2003 | Frolick et al. |
| 2003/0079145 A1 | 4/2003 | Kouznetsov et al. |
| 2003/0115485 A1 | 6/2003 | Milliken |
| 2003/0120951 A1 | 6/2003 | Gartside et al. |
| 2003/0131148 A1 | 7/2003 | Kelley et al. |
| 2004/0022258 A1 | 2/2004 | Tsukada et al. |
| 2004/0025042 A1 | 2/2004 | Kouznetsov et al. |
| 2004/0133624 A1 | 7/2004 | Park |
| 2004/0158741 A1 | 8/2004 | Schneider |
| 2004/0185900 A1 | 9/2004 | McElveen |
| 2004/0209608 A1 | 10/2004 | Kouznetsov et al. |
| 2004/0225887 A1 | 11/2004 | O'Neil et al. |
| 2004/0259532 A1 | 12/2004 | Isomaki et al. |
| 2005/0010821 A1 | 1/2005 | Cooper et al. |
| 2005/0015443 A1 | 1/2005 | Levine et al. |
| 2005/0074106 A1 | 4/2005 | Orlamunder et al. |
| 2005/0076246 A1 | 4/2005 | Singhal |
| 2005/0091308 A1 | 4/2005 | Bookman et al. |
| 2005/0125779 A1 | 6/2005 | Kelley et al. |
| 2005/0130627 A1 | 6/2005 | Calmels et al. |
| 2005/0138395 A1 | 6/2005 | Benco et al. |
| 2005/0138413 A1 | 6/2005 | Lippmann et al. |
| 2005/0138450 A1 | 6/2005 | Hsieh |
| 2005/0154796 A1 | 7/2005 | Forsyth |
| 2005/0186954 A1 | 8/2005 | Kenney |
| 2005/0197099 A1 | 9/2005 | Nehushtan |
| 2005/0221800 A1 | 10/2005 | Jackson et al. |
| 2005/0227669 A1 | 10/2005 | Haparnas |
| 2005/0237970 A1 | 10/2005 | Inoue |
| 2005/0240999 A1 | 10/2005 | Rubin et al. |
| 2005/0254654 A1 | 11/2005 | Rockwell et al. |
| 2005/0278777 A1 | 12/2005 | Loza |
| 2005/0282533 A1 | 12/2005 | Draluk et al. |
| 2006/0026283 A1 | 2/2006 | Trueba |
| 2006/0073820 A1 | 4/2006 | Craswell et al. |
| 2006/0075388 A1 | 4/2006 | Kelley et al. |
| 2006/0080680 A1 | 4/2006 | Anwar et al. |

(56) References Cited

U.S. PATENT DOCUMENTS

| | | |
|---|---|---|
| 2006/0095454 A1 | 5/2006 | Shankar et al. |
| 2006/0101518 A1 | 5/2006 | Schumaker et al. |
| 2006/0130145 A1 | 6/2006 | Choi et al. |
| 2006/0150238 A1 | 7/2006 | D'Agostino |
| 2006/0150256 A1 | 7/2006 | Fanton et al. |
| 2006/0179485 A1 | 8/2006 | Longsine et al. |
| 2006/0217115 A1 | 9/2006 | Cassett et al. |
| 2006/0218482 A1 | 9/2006 | Ralston et al. |
| 2006/0224742 A1 | 10/2006 | Shahbazi |
| 2006/0236325 A1 | 10/2006 | Rao et al. |
| 2006/0253205 A1 | 11/2006 | Gardiner |
| 2006/0253584 A1 | 11/2006 | Dixon et al. |
| 2006/0272011 A1 | 11/2006 | Ide et al. |
| 2006/0277408 A1 | 12/2006 | Bhat et al. |
| 2006/0294582 A1 | 12/2006 | Linsley-Hood et al. |
| 2007/0005327 A1 | 1/2007 | Ferris |
| 2007/0011319 A1 | 1/2007 | Mcclure et al. |
| 2007/0015519 A1 | 1/2007 | Casey |
| 2007/0016953 A1 | 1/2007 | Morris et al. |
| 2007/0016955 A1 | 1/2007 | Goldberg et al. |
| 2007/0021112 A1 | 1/2007 | Byrne et al. |
| 2007/0028095 A1 | 2/2007 | Allen et al. |
| 2007/0028303 A1 | 2/2007 | Brennan |
| 2007/0028304 A1 | 2/2007 | Brennan |
| 2007/0038677 A1 | 2/2007 | Reasor et al. |
| 2007/0050471 A1 | 3/2007 | Patel et al. |
| 2007/0086476 A1 | 4/2007 | Iglesias et al. |
| 2007/0089165 A1 | 4/2007 | Wei et al. |
| 2007/0090954 A1 | 4/2007 | Mahaffey |
| 2007/0154014 A1 | 7/2007 | Aissi et al. |
| 2007/0174472 A1 | 7/2007 | Kulakowski |
| 2007/0174490 A1 | 7/2007 | Choi et al. |
| 2007/0186282 A1 | 8/2007 | Jenkins |
| 2007/0190995 A1 | 8/2007 | Wang et al. |
| 2007/0214504 A1 | 9/2007 | Milani Comparetti et al. |
| 2007/0220608 A1 | 9/2007 | Lahti et al. |
| 2007/0240217 A1 | 10/2007 | Tuvell et al. |
| 2007/0240218 A1 | 10/2007 | Tuvell et al. |
| 2007/0240221 A1 | 10/2007 | Tuvell et al. |
| 2007/0240222 A1 | 10/2007 | Tuvell et al. |
| 2007/0248047 A1 | 10/2007 | Shorty et al. |
| 2007/0250627 A1 | 10/2007 | May et al. |
| 2007/0253377 A1 | 11/2007 | Janneteau et al. |
| 2007/0293263 A1 | 12/2007 | Eslambolchi et al. |
| 2007/0297610 A1 | 12/2007 | Chen et al. |
| 2008/0028470 A1 | 1/2008 | Remington et al. |
| 2008/0046369 A1 | 2/2008 | Wood |
| 2008/0046557 A1 | 2/2008 | Cheng |
| 2008/0047007 A1 | 2/2008 | Satkunanathan et al. |
| 2008/0049653 A1* | 2/2008 | Demirhan et al. ............ 370/311 |
| 2008/0065507 A1 | 3/2008 | Morrison et al. |
| 2008/0070495 A1 | 3/2008 | Stricklen et al. |
| 2008/0072329 A1 | 3/2008 | Herschaft et al. |
| 2008/0086773 A1 | 4/2008 | Tuvell et al. |
| 2008/0086776 A1 | 4/2008 | Tuvell et al. |
| 2008/0109871 A1 | 5/2008 | Jacobs |
| 2008/0127171 A1 | 5/2008 | Tarassov |
| 2008/0127179 A1 | 5/2008 | Moss et al. |
| 2008/0127334 A1 | 5/2008 | Gassoway |
| 2008/0127336 A1 | 5/2008 | Sun et al. |
| 2008/0132218 A1 | 6/2008 | Samson et al. |
| 2008/0134281 A1 | 6/2008 | Shinde et al. |
| 2008/0140767 A1 | 6/2008 | Rao et al. |
| 2008/0148381 A1 | 6/2008 | Aaron |
| 2008/0172746 A1 | 7/2008 | Lotter et al. |
| 2008/0178294 A1 | 7/2008 | Hu et al. |
| 2008/0181116 A1 | 7/2008 | Kavanaugh et al. |
| 2008/0186162 A1 | 8/2008 | Rajan et al. |
| 2008/0196104 A1 | 8/2008 | Tuvell et al. |
| 2008/0200160 A1 | 8/2008 | Fitzpatrick et al. |
| 2008/0208950 A1 | 8/2008 | Kim et al. |
| 2008/0209557 A1 | 8/2008 | Herley et al. |
| 2008/0235801 A1 | 9/2008 | Soderberg et al. |
| 2008/0276111 A1 | 11/2008 | Jacoby et al. |
| 2008/0293396 A1 | 11/2008 | Barnes et al. |
| 2008/0307243 A1* | 12/2008 | Lee ............................... 713/320 |
| 2008/0318562 A1 | 12/2008 | Featherstone et al. |
| 2009/0070283 A1 | 3/2009 | Kang et al. |
| 2009/0172227 A1 | 7/2009 | Taylor et al. |
| 2009/0199298 A1 | 8/2009 | Miliefsky |
| 2009/0205016 A1 | 8/2009 | Milas |
| 2009/0205047 A1 | 8/2009 | Podjarny |
| 2009/0248623 A1 | 10/2009 | Adelman et al. |
| 2009/0292487 A1* | 11/2009 | Duncan et al. .................. 702/63 |
| 2009/0293125 A1 | 11/2009 | Szor |
| 2010/0019731 A1* | 1/2010 | Connolly et al. ............. 320/136 |
| 2010/0064341 A1 | 3/2010 | Aldera |
| 2010/0088398 A1 | 4/2010 | Plamondon |
| 2010/0097494 A1* | 4/2010 | Gum et al. .................. 348/231.5 |
| 2010/0100591 A1 | 4/2010 | Burgess et al. |
| 2010/0100939 A1 | 4/2010 | Burgess et al. |
| 2010/0100959 A1 | 4/2010 | Mahaffey |
| 2010/0100963 A1 | 4/2010 | Mahaffey et al. |
| 2010/0100964 A1 | 4/2010 | Burgess et al. |
| 2010/0154032 A1 | 6/2010 | Ollmann |
| 2010/0210240 A1 | 8/2010 | Mahaffey et al. |
| 2010/0240425 A1* | 9/2010 | Horino ........................... 455/572 |
| 2010/0313270 A1 | 12/2010 | Kim et al. |
| 2010/0317324 A1 | 12/2010 | Brown et al. |
| 2010/0332593 A1 | 12/2010 | Barash et al. |
| 2011/0047033 A1 | 2/2011 | Mahaffey et al. |
| 2011/0047594 A1 | 2/2011 | Mahaffey et al. |
| 2011/0047597 A1 | 2/2011 | Barton et al. |
| 2011/0047620 A1 | 2/2011 | Mahaffey et al. |
| 2011/0119765 A1 | 5/2011 | Burgess et al. |
| 2011/0145920 A1 | 6/2011 | Burgess et al. |
| 2011/0171923 A1 | 7/2011 | Daly et al. |
| 2011/0241872 A1 | 10/2011 | Mahaffey |
| 2011/0296510 A1 | 12/2011 | Hatlelid et al. |
| 2012/0042382 A1 | 2/2012 | Mahaffey |
| 2012/0060222 A1 | 3/2012 | Burgess et al. |
| 2012/0072569 A1 | 3/2012 | Xu |
| 2012/0084836 A1 | 4/2012 | Mahaffey et al. |
| 2012/0084864 A1 | 4/2012 | Burgess et al. |
| 2012/0096555 A1 | 4/2012 | Mahaffey |
| 2012/0110174 A1 | 5/2012 | Mahaffey et al. |
| 2012/0124239 A1 | 5/2012 | Shribman et al. |
| 2012/0159636 A1 | 6/2012 | Pandya et al. |
| 2012/0179801 A1 | 7/2012 | Luna et al. |
| 2012/0179814 A1 | 7/2012 | Swildens et al. |
| 2012/0188064 A1 | 7/2012 | Mahaffey et al. |
| 2012/0196571 A1 | 8/2012 | Grkov et al. |
| 2012/0215938 A1 | 8/2012 | Fletcher et al. |
| 2012/0233695 A1 | 9/2012 | Mahaffey et al. |
| 2012/0246499 A1 | 9/2012 | Jessup et al. |
| 2012/0259954 A1 | 10/2012 | McCarthy et al. |
| 2012/0278467 A1 | 11/2012 | Schneider |
| 2012/0303735 A1 | 11/2012 | Raciborski et al. |
| 2012/0317153 A1 | 12/2012 | Parthasarathy et al. |
| 2012/0317233 A1 | 12/2012 | Redpath |
| 2012/0317370 A1 | 12/2012 | Luna |
| 2012/0324076 A1 | 12/2012 | Zerr et al. |
| 2012/0324094 A1 | 12/2012 | Wyatt et al. |
| 2012/0324259 A1* | 12/2012 | Aasheim et al. ............... 713/320 |
| 2012/0324568 A1 | 12/2012 | Wyatt et al. |
| 2013/0013775 A1 | 1/2013 | Baumback et al. |
| 2013/0019311 A1 | 1/2013 | Swildens et al. |
| 2013/0023209 A1 | 1/2013 | Fisher et al. |
| 2013/0041946 A1 | 2/2013 | Joel et al. |
| 2013/0041974 A1 | 2/2013 | Luna et al. |
| 2013/0047034 A1 | 2/2013 | Salomon et al. |
| 2013/0054796 A1 | 2/2013 | Baumback et al. |
| 2013/0067054 A1 | 3/2013 | Pulleyn et al. |
| 2013/0086682 A1 | 4/2013 | Mahaffey et al. |

FOREIGN PATENT DOCUMENTS

| | | |
|---|---|---|
| WO | 2005101789 | 10/2005 |
| WO | 2006110181 | 10/2006 |
| WO | 2008007111 | 1/2008 |
| WO | 2008057737 | 5/2008 |

(56) References Cited

FOREIGN PATENT DOCUMENTS

| WO | 2010048218 | 4/2010 |
|---|---|---|
| WO | 2010048220 | 4/2010 |
| WO | 2012027588 | 1/2012 |

OTHER PUBLICATIONS

Qualys, "Executive Dashboard," Internet Archive, Way back Machine, availble at <http://web.archive.org/web20080507161417/www.qualys.com/products/screens/?screen=Executive +Dashboard>, retrieved Feb. 23, 2011, 1 page.
Qualys, "Vulnerability Management," Internet Archive, Way Back Machine, available at <http://web.archive.org/web/20080611095201/www.qualys.com/solutions/vulnerability_management> Retrieved Feb. 24, 2011, 1 page.
Real world Computing, Jun. 16, 2008 (PC Pro), pp. 1-2.
Simone, "Playing with ActiveMQ," Mostly Useless, Dec. 27, 2007, available at <http://www.mostly-useless.com/blog/2007/12/27/playing-with-activemq/>, retrieved Mar. 30, 2012, 6 pages.
Teh, Joe, "Norton 360 Version 3.0 Review,"Mar. 9, 2009, Available at <http://techielobang-com/blog/2009/03/09/norton-360-version-30-review/> Retrieved Feb. 23, 2011, 12 pages.
Trillian, available at <http://www.trillian.im/>, retrieved Sep. 14, 2011, 24 pages.
U.S. Appl. No. 12/255,614; Prosecution history available via USPTO IFW (including Office Action dated Apr. 14, 2011).
U.S. Appl. No. 12/255,621; Prosecution history available via USPTO IFW (including OA dated Apr. 13, 2011).
U.S. Appl. No. 12/255,626; Prosecution history available via USPTO IFW (including OA dated Feb. 1, 2011).
U.S. Appl. No. 12/255,635; Prosecution history available via USPTO IFW (including OA dated Mar. 24, 2011).
U.S. Appl. No. 13/033,025; Prosecution history available via USPTO.
U.S. Appl. No. 13/212,055; Prosecution history available via USPTO.
U.S. Appl. No. 12/255,632. Prosecution history available via USPTO IFW (including Notice of Allowance dated Nov. 3, 2011).
U.S. Appl. No. 12/255,632. Prosecution history available via USPTO IFW (including office action dated Apr. 13, 2011).
U.S. Appl. No. 13/160,382. Prosecution history available via USPTO IFW (including office action dated Dec. 26, 2012).
U.S. Appl. No. 12/372,719. Prosecution history available via USPTO IFW, Feb. 14, 2013.
U.S. Appl. No. 12/621,431. Prosecution history available via USPTO IFW, Jan. 17, 2013.
U.S. Appl. No. 12/868,669. Prosecution history available via USPTO IFW, Nov. 14, 2012.
U.S. Appl. No. 12/868,672. Prosecution history available via USPTO IFW, Nov. 14, 2012.
U.S. Appl. No. 12/868,676. Prosecution history available via USPTO IFW, May 22, 2013.
U.S. Appl. No. 12/876,018. Prosecution history available via USPTO IFW, Jul. 18, 2013.
U.S. Appl. No. 13/160,382. Prosecution history available via USPTO IFW, Jun. 5, 2013.
U.S. Appl. No. 13/160,447. Prosecution history available via USPTO IFW, Mar. 22, 2013.
U.S. Appl. No. 13/162,477. Prosecution history available via USPTO IFW, Jul. 12, 2012.
U.S. Appl. No. 13/267,731. Prosecution history available via USPTO IFW, Apr. 2, 2013.
U.S. Appl. No. 13/460,549. Prosecution history available via USPTO IFW, Apr. 15, 2013.
U.S. Appl. No. 13/461,054. Prosecution history available via USPTO IFW, May 1, 2012.
U.S. Appl. No. 13/461,984. Prosecution history available via USPTO IFW, May 2, 2012.
U.S. Appl. No. 12/255,621. Prosecution history available via USPTO IFW, Dec. 12, 2011.
U.S. Appl. No. 13/741,988. Prosecution history available via USPTO IFW, Jan. 15, 2013.
U.S. Appl. No. 13/689,588. Prosecution history available via USPTO IFW, Nov. 29, 2012.
Virus Total, VT Community, www.virustotal.com/index.html; Dated Dec. 16, 2011; 44 pages.
Windows Update, Internet Archive, Way Back Machine, available at <http://web.archive.org/web/20071022193017/http://en.wikipedia.org/wiki/Windows_Update> Retrieved Feb. 23, 2011, 3 pages.
Sprite Mobile, Sprite Backup, Internet Archive, Way Back Machine, available at http://web.archive.org/web/20080901220103/http://www.spritesoftware.com/?page_id=280, 4 pages, Retrieved Jan. 16, 2013.
Sprint Nextel, Mobile Locator, Internet Archive, Way Back Machine, available at http://web.archive.org/web/20080901070835/http://www.nextel.com/en/solutions/gps/mobile_locator.shtml, 2 pages, Retrieved Jan. 16, 2013.
Richardson, Alexis "Introduction to RabbitMQ," Google UK, Sep. 25, 2008, available at <http://www.rabbitmq.com/resources/google-tech-talk-final/alexis-google-rabbitmq-talk.pdf>, retrieved Mar. 30, 2012, 33 pages.
Fisher, Oliver "Malware? We Don't Need No Stinking Malware!," Google, Oct. 24, 2008, available at <http://googlewebmastercentral.blogspot.com/2008/10/malware-we-dont-need-no-stinking.html>, retrieved Mar. 30, 2012, 11 pages.
Reardon, Marguerite "Mobile Phones That Track Your Buddies," Cnet, Nov. 14, 2006, available at <http://news.cnet.com/Mobile-phones-that-track-your-buddies/2100-1039_3-6135209.html>, retrieved Mar. 30, 2012, 4 pages.
Fette, Ian "Understanding Phishing and Malware Protection in Google Chrome," The Chromium Blog, Nov. 14, 2008, available at <http://blog.chromium.org/2008/11/understanding-phishing-and-malware.htm>, retrieved May 17, 2011, 6 pages.
Kincaid, Jason "Urban Airship Brings Easy Push Notifications to Android," TechCrunch, Aug. 10, 2010, available at <http://techcrunch.com/2010/08/10/urban-airship-brings-easy-push-notifications-to-android/>, retrieved Jun. 16, 2011, 5 pages.
Keane, Justin K. "Using the Google Safe Browsing API from PHP," Mad Irish, Aug. 7, 2009, available at <http://www.madirish.net/node/245>, retrieved Mar. 30, 2012, 5 pages.
Jefferies, Charles P. "Webroot AntiVirus 2010 With Spy Sweeper Review," Notebook Review, Jun. 22, 2010, available at <http:// http://www.notebookreview.com/default.asp?newsID=5700&review=Webroot+AntiVirus+2010+With+Spy+Sweeper+Review>, retrieved May 18, 2011, 3 pages.
"Berry Locator", 2007, Mobireport LLC, 1 page.
"Firefox", Wikipedia, Jul. 20, 2011, available at <http://en.wikipedia.org/wiki/firefox> Retrieved Aug. 10, 2011, 37 Pages.
"F-Secure Mobile Security for S60 Users Guide", F-Secure Corporation 2009, pp. 1-34.
"Java Virtual Machine", Wikipedia, Aug. 7, 2011, Available at <http://en.wikipedia.org/wiki/Java_Virtual_Machine> Retrieved Aug. 10, 2011, 7 pages.
"Kaspersky Mobile Security", Kaspersky Lab 1997-2007, 1 page.
"Kaspersky Mobile Security", Kaspersky Lab 2008, available at <http://www.kaspersky.com/kaspersky_mobile_security> Retrieved Sep. 11, 2008, 2 Pages.
"Norton Smartphone Security",Symantec, 2007, Available at <http://www.symantec.com/norton/smartphone-security> Retrieved Oct. 21, 2008, 2 pages.
"PhoneBak PDA Phone Anti-theft software for your PDA phone", 2007, Bak2u Pte Ltd (Singapore) pp. 1-4.
"PhoneBak: Mobile Phone Theft Recovery Software", 2007, Westin Tech.
"Symantec Endpoint Protection", Symantec, 2008, Available at <http://www.symantec.com/business/products/family.jsp?familyid=endpointsecurity>, 6 pages.
"Symantec Mobile Security Suite for Windows Mobile", Symantec, 2008 Available at <http://www.symantec.com/business/products/sysreq.jsp?pcid=2241&pvid=mobile_security_suite_1>, 5 pages.
"TippingPoint Security Management System (SMS)", TippingPoint, Available at <http://www.tippingpoint.com/products_sms.html>, 2 pages.

(56) References Cited

OTHER PUBLICATIONS

Summerson, Cameron "5 Android Antivirus Apps Compared, Find Out Which Ones Are Worth Having!," Android Headlines, Mar. 8, 2011, available at <http://androidheadlines.com/2011/03/5-android-antivirus-apps-comapred-find-out-which-ones-are-worth-having.html>, retrieved Mar. 30, 2012, 9 pages.
"Android Cloud to Device Messaging Framework," Google Code Labs, available at <http://code.google.com/android/c2dm/>, retrieved Sep. 14, 2011, 9 pages.
"BlackBerry Push Service Overview," Dec. 16, 2009, available at <http://us.blackberry.com/developers/platform/pushapi.jsp#tab__tab__resources>, retrieved Sep. 14, 2011, 21 pages.
"eSoft unveils SiteFilter 3.0 for OEMs," Infosecurity, Mar. 23, 2010, available at <http://www.infosecurity-magazine.com/view/8273/esoft-unveils-sitefilter-30-for-oems/>, retrieved Mar. 30, 2012, 2 pages.
"Get the Physical Location of Wireless Router From its MAC Address (BSSID)," Coderrr, Sep. 10, 2008, available at <http://coderr.wordpress.com/2008/09/10/get-the-physical-location-of-wireless-router-from-its-mac-address-bssid/>, retrieved Mar. 30, 2012, 13 pages.
"Hooking—Wikipedia, the Free Encyclopedia," Internet Archive Wayback Machine, Apr. 13, 2010, available at <http://web.archive.org/web/20100415154752/http://en.wikipedia.org/wiki/Hooking>, retrieved Mar. 30, 2012, 6 pages.
Mytton, David "How to Build an Apple Push Notification Provider Server (Tutorial)," Server Density, Jul. 10, 2009, available at <http://blog.serverdensity.com/2009/07/10/how-to-build-an-apple-push-notification-provider-server-tutorial/>, retrieved Apr. 2, 2012, 33 pages.
"Pidgin The Universal Chat Client," Pidign, available at <http://www.pidgin.im/>, retrieved Sep. 14, 2011, 14 pages.
Pogue, David "Simplifying the Lives of Web Users," The New York Times, Aug. 18, 2010, available at <http://www.nytimes.com/2010/08/19/technology/personaltech/19pogue.html>, retrieved May 17, 2011, 5 pages.
"Twilio Cloud Communications Web Service API for Building Voice and Sms Applications," Twilio available at <http://www.twilio.com>, retrieved Sep. 14, 2011, 12 pages.
"Understanding Direct Push," Microsoft, Feb. 18, 2009, available at <http://technet.microsoft.com/en-us/library/aa997252(v=exchg.80).aspx>, retrieved Mar. 30, 2012, 3 pages.
"Urban Airship: Powering Modern Mobile," available at <http://urbanairship.com/products/>, retrieved Sep. 16, 2011, 14 pages.
"zVeloDB URL Database," zVelo, available at <https://zvelo.com/technology/zvelodb-url-database>, retrieved Mar. 30, 2012, 2 pages.
U.S. Appl. No. 11/397,521. Prosecution available via USTP IFW, Sep. 22, 2008.
U.S. Appl. No. 13/284,248. Prosecution available via USPTO IFW, May 23, 2013.
U.S. Appl. No. 13/313,937. Prosecution available via USPTO IFW, Jul. 3, 2012.
U.S. Appl. No. 13/314,032. Prosecution available via USPTO IFW, Nov. 28, 2012.
U.S. Appl. No. 13/333,654. Prosecution available via USPTO IFW, Oct. 31, 2012.
U.S. Appl. No. 13/335,779. Prosecution available via USPTO IFW, Dec. 22, 2011.
U.S. Appl. No. 13/410,979. Prosecution available via USPTO IFW, Mar. 2, 2012.
Amazon.com: Mining the Web Discovering Knowledge from Hypertext Data (9781558607545): Soumen Chakrabarti: Books, Amazon available at <http://www.amazon.com/exec/obidos/ASIN/1558607544/>, retrieved Jun. 7, 2012, pp. 1-7.
Clickatell, available at <http://www.clickatell.com>, retrieved Sep. 14, 2011, 11 pages.
Dolcourt, Jessica Dashwire: Manage Your Cell Phone on the Web, News Blog, with Jessica Dolocourt, Oct. 29, 2007, 5:00am PDT <http://news.cnet.com/8301-10784_3-9805657-7.html> retrieved Jun. 15, 2009; pp. 1-3.
Diligenti, M., et al., Focused Crawling Using Context Graphs:, Proceedings of the 26th VLDB Conference, Cairo, Egypt, 2000, pp. 1-8.
Grafio "Stay Secure", Opera Software, Sep. 29, 2008, Available at <http://widgets.opera.com/widget/4495> Retrieved Oct. 21, 2008, 4 pages.
McAfee, Internet Archive, Way Back Machine, available at <http://web.archive.org/web/20080611095201/www.qualys.com/solutions/vulnerability_management>retrieved Feb. 24, 2011, 1 page.
MobileWipe web page, pp. 1-4.
PagerDuty, available at <http://www.pagerduty.com>, retrieved Sep. 14, 2011, 23 pages.
PCT International Search Report and Written Opinion of the International Searching Authority for PCT/US2009/061370; Mailed on Dec. 14, 2009; pp. 1-12.
PCT International Search Report and Written Opinion of the International Searching Authority for PCT/US2009/061372; Mailed on Mar. 24, 2010; pp. 1-16.
PCT International Search Report and Written Opinion of the International Searching Authority for PCT/US2011/049182; Mailed on Dec. 23, 2011; pp. 1-11.
PCT International Preliminary Report on Patentability for PCT/US2011/049182; Mailed on Mar. 7, 2013; pp. 1-9.
"Virgin Media—Phone Lost or Stolen?", web page downloaded Apr. 11, 2013 from http://www.virginmobile.com/vm/ukCoverage.do?contentId=insurance.howdoi.sm283.
"Sprint—Report that your device is lost or stolen", web page downloaded Apr. 11, 2013 from http://support.sprint.com/support/article/Report_that_your_device_is_lost_or_stolen/case-ba416758-20090629-143222.
Tedeschi, Bob, "In Choosing a New Phone, Online Research Goes Only So Far", The New York Times, Oct. 7, 2009; downloaded Jul. 13, 2013 from http://www.nytimes.com/2009/10/08/technology/personaltech/08smat.html?_r=0.
PCT "International Search Report and Written Opinion of the International Searching Authority for PCT/US2013/027166", mailed on Jun. 19, 2013; received on Jun. 21, 2013.
Jung, Jaeyeon et al. "DNS Performance and the Effectiveness of Caching," IEEE/ACM Transactions on Networking, vol. 10, Issue 5, Oct. 2002, pp. 589-603.
Wu, Yi et al. "Performance Analysis of DNS with TTL Value 0 as Location Repository in Mobile Internet," IEEE Wireless Communications and Networking Conference (WCNC), Mar. 11-15, 2007, pp. 3250-3255.
Liljeberg, M. et al. "Optimizing World-Wide Web for Weakly Connected Mobile Workstations: An Indirect Approach," Second International Workshop on Services Distributed and Networked Environments, Jun. 5-6, 1995, pp. 132-139.
Song, Hui and Cao, Guohong. "Cache-Miss-Initiated Prefetch in Mobile Environments," Dept. of Computer Science and Engineering, The Pennsylvania State University, Computer Communications, vol. 28, Issue 7, May 2, 2005, pp. 741-753.

* cited by examiner

2005

Analyze the usage model of the user to determine a first time after which it will be acceptable for a battery of the mobile device to fall below a threshold charge level
2010

Examine current usage of the mobile device to predict a second time at which the battery will fall below the threshold charge level
2015

If the second time is before the first time, reduce usage of the battery
2020

FIG. 20

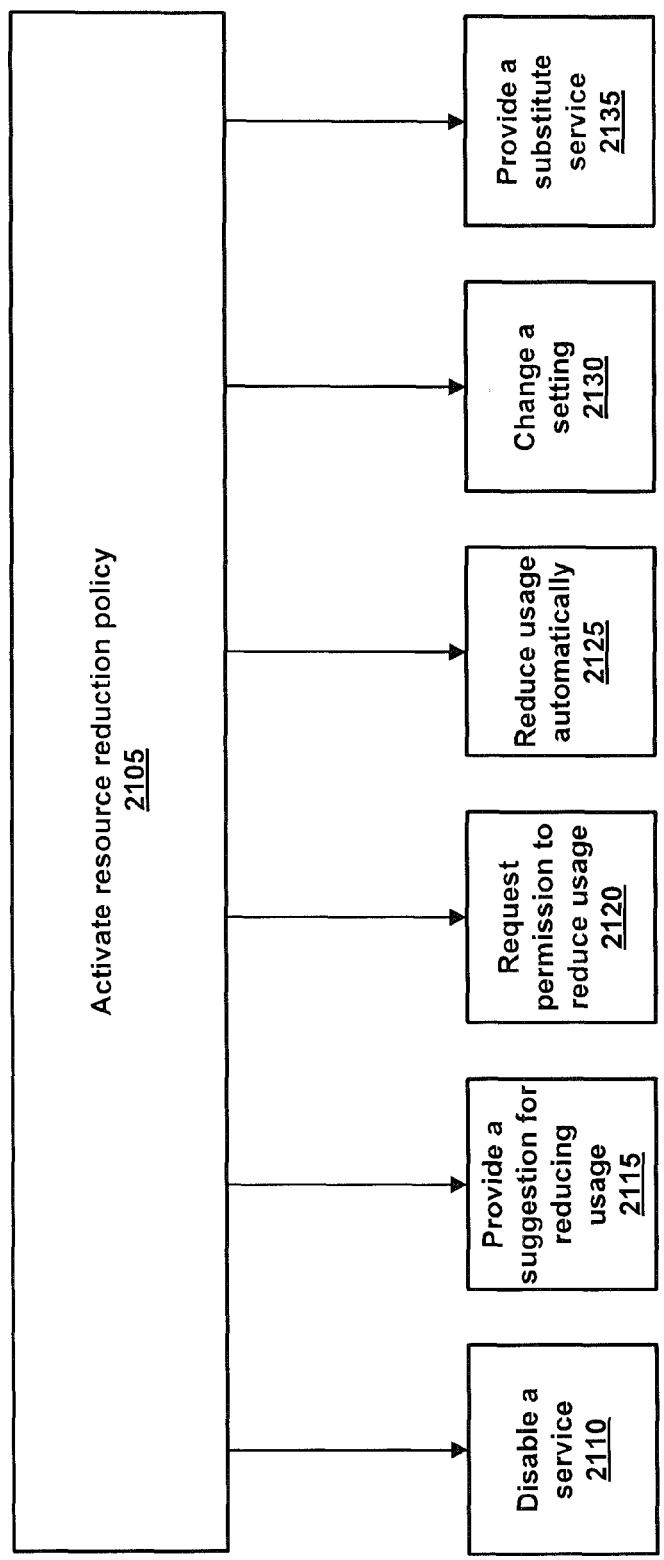

SYSTEM AND METHOD FOR DEVELOPING, UPDATING, AND USING USER DEVICE BEHAVIORAL CONTEXT MODELS TO MODIFY USER, DEVICE, AND APPLICATION STATE, SETTINGS AND BEHAVIOR FOR ENHANCED USER SECURITY

CROSS-REFERENCE TO RELATED APPLICATIONS

This patent application claims priority to U.S. provisional patent application 61/719,233, filed Oct. 26, 2012, which is incorporated by reference along with all other references cited in this application.

BACKGROUND

Portable electronic devices are typically powered by a battery. This allows the device to be used while not plugged into an electrical outlet. One example of a portable electronic device is a mobile device such as a smartphone or tablet computer. Mobile devices are becoming more and more ubiquitous. About 490 million mobile devices were sold in 2011. The number of mobile devices estimated to be in use by 2016 is 10 billion.

People rely on their mobile devices to make and receive phone calls, stay up-to-date on the latest news, take pictures, record video, watch movies, send and receive messages (e.g., email, or text messages), and much more. For example, many people use mobile application programs or apps for finding new places (e.g., mapping applications), social networking, entertainment (e.g., playing games), banking, shopping, keeping track of appointments (e.g., calendaring), and general productivity—just to name a few examples. The reliance on mobile devices is expected to grow exponentially.

These activities consume battery power. For example, battery power is consumed when acquiring location (e.g., GPS coordinates), running an application, making a phone call, sending a text message, and so forth. It can be very frustrating to want to use your mobile device only to find out that the battery is low or dead and you have no way of charging the device. For example, you may not be at home with your charger. In some cases, the loss of battery power can even be life-threatening if, for example, you were unable to make an emergency phone call or activate an emergency alert. Thus, there is a need to develop systems and techniques to intelligently manage mobile device battery use.

BRIEF SUMMARY OF THE INVENTION

In a specific implementation, a system and method are provided for developing or modifying models of power consumption in devices powered by batteries or other power storage mechanisms based on measurements, characteristics, and past and current usage histories of device applications, sensors, communication mechanisms, component usage, available power sources, or current and anticipated locations.

In one embodiment a developed or modified model of power consumption informed by current and anticipated device state is used to alert a device user about the current and projected state of power availability. Alternatively, the system can make suggestions to the user as to how to modify the settings of the device, applications, sensors, communication mechanisms, or components, or to turn them off to reduce power consumption. In another embodiment the model of power consumption and current and anticipated device state is used to directly modify settings for the device, applications, sensors, communication mechanisms, or components, or to turn them off.

In a specific implementation, systems and techniques are provided for data security, resource usage, and context adaptation on a mobile device, specifically to collecting and analyzing context information from a mobile device, developing behavioral context models and predictions, and using them to modify the settings and behavior of applications and device components and to protect the security of context information.

In another specific implementation, usage information associated with a mobile device is collected. The collected information is used to build a usage model for a user of the mobile device that describes a set of contexts in which the mobile device is used. User activity on the device is monitored and the model is consulted to determine a first time after which it will be acceptable for a battery of the mobile device to fall below a threshold charge level. Based on the monitored activity, a prediction of a second time is made for when the battery will fall below the threshold charge level. If the second time is before the first time, usage of the battery is reduced. If the second time is after the first time, usage of the battery is not reduced.

In a specific implementation, a method includes collecting behavior information including a set of activities associated with usage of a mobile communication device, analyzing the behavior information to determine a first time after which it will be acceptable for a battery of the mobile communication device to fall below a threshold charge level, examining current usage of the mobile communication device to predict a second time at which the battery will fall below the threshold charge level, and reducing usage of the battery if the second time is at least a predetermined amount of time before the first time.

The behavior information may be collected by a server. The reducing the usage of the battery may include transmitting instructions from the server to the mobile communication device to change a setting on the mobile communication device from a first value to a second value, where when the setting is at the second value less of the battery is consumed than when the setting is at the first value.

The reducing the usage of the battery may include receiving at the mobile communication device an instruction from a server to disable one or more services on the mobile communication device. The method may further include not reducing the usage of the battery if the second time is a predetermined amount of time after the first time.

In a specific implementation, a method includes determining a first time after which it will be acceptable for a battery of a mobile communication device to fall below a threshold charge level, predicting a second time at which the battery will fall below the threshold charge level, and reducing usage of the battery if the second time is at least a predetermined amount of time before the first time. The method may further include not reducing the usage of the battery if the second time is at least a predetermined amount of time after the first time.

The method may further include interpolating between a first data point and a second data point to predict the second time, where the first data point corresponds to a first charge level of the battery that is recorded at a third time, and the second data point corresponds to a second charge level of the battery that is recorded at a fourth time. Reducing the usage of the battery may include automatically reducing the usage of the battery.

The method may include before the reducing the usage of the battery, prompting a user of the mobile communication device with a suggestion on how to reduce the usage of the battery. The method may include before the reducing the usage of the battery, prompting a user of the mobile communication device for permission to reduce the usage of the battery.

In a specific implementation, reducing the usage of the battery includes at least one of dimming a brightness of a screen of the mobile communication device, disabling Wi-Fi network connectivity on the mobile communication device, disabling Bluetooth connectivity on the mobile communication device, starting an application on the mobile communication device, closing an application on the mobile communication device, or disabling a global positioning system (GPS) receiver on the mobile communication device. In an implementation, when the battery falls below the threshold charge level, the mobile communication device automatically shuts down.

In a specific implementation, a method includes determining a first time after which it will be acceptable for a battery of a mobile communication device to fall below a threshold charge level, storing a set of data points, each data point corresponding to a specific charge level of the battery measured at a specific time, predicting, using the stored set of data points, a second time at which the battery will fall below the threshold charge level, determining that the second time is at least a predetermined amount of time before the first time, and upon the determination, reducing usage of the battery.

Reducing the usage of the battery may include substituting services provided by a first application program currently running on the mobile communication device with services provided by a second application program not currently running on the mobile communication device, where the second application program consumes less of the battery than the first application program.

Reducing the usage of the battery may include changing a setting of the mobile communication device from a first value to a second value, where when the setting is at the second value less of the battery is consumed than when the setting is at the first value. In an implementation, the method further includes before the reducing the usage of the battery, prompting a user of the mobile communication device to change a setting of the mobile communication device from a first value to a second value.

In an implementation, the method further includes before the reducing the usage of the battery, prompting a user of the mobile communication device for permission to change a setting of the mobile communication device, receiving the permission, and upon receipt of the permission, changing the setting.

Reducing the usage of the battery may include storing a location of the mobile communication device, intercepting a request from an application program for a current location of the mobile communication device, retrieving the stored location, and providing the stored location to the application program in response to the request, where the location of the mobile communication device is stored on the mobile communication device before the intercepting the request from the application program.

In a specific implementation, a method includes the steps of on a mobile communications device having an activity monitor component, collecting by the activity monitor component behavioral information concerning a set of activities associated with usage of the mobile communications device, on the mobile communication device, analyzing the data collected by the activity monitor component to estimate a first time when the mobile communications device battery will fall below a predetermined charge level, on the mobile communication device, subsequent to the estimation of the first time, collecting by the activity monitor component current usage information about the mobile communications device, on the mobile communications device, using the current usage information collected by the activity monitor component, estimating a second time when the mobile communications device battery will fall below the predetermined charge level based upon current usage, and, if the estimated second time is a predetermined amount of time before the first estimated time, then employing an active policy manager on the mobile communications device to implement active policies on the mobile communications device to reduce battery usage such that upon re-estimating in view of the implemented active policies, the estimated second time is the same as or later than the estimated first time.

In a specific implementation, a method includes the steps of on a mobile communication device, determining an original battery glide path projection with a first battery exhaustion point, on the mobile communication device, at a time subsequent to the determination of the original battery glide path projection, determining a current battery glide path projection with a second battery exhaustion point, if the second battery exhaustion point is more than a predetermined amount of time before the first battery exhaustion point, then, on the mobile communication device, employing an active policy manager to cause a reduction in battery usage sufficient to allow a third battery exhaustion point to occur at the same time or later than the first exhaustion point.

In a specific implementation, a method includes the steps of on a mobile communications device, determining a first projected battery exhaustion point based upon information about the battery and about the then-current state of the mobile communication device, on the mobile communication device, at a time subsequent to the determination of the first projected battery exhaustion point, determining a second projected battery exhaustion point based upon information about the battery and about the then-current state of the mobile communication device, if the second battery exhaustion point is more than a predetermined amount of time before the first battery exhaustion point, then, on the mobile communication device, employing an active policy manager to cause a reduction in battery usage sufficient to allow a third battery exhaustion point to occur at the same time or later than the first exhaustion point.

BRIEF DESCRIPTION OF THE DRAWINGS

The present invention is illustrated by way of example and not limitation in the figures of the accompanying drawings, in which like references indicate similar elements, and in which:

FIG. 20 shows a flow for the Resource Glide Path.

FIG. 21 shows a block diagram of resource usage policies.

DETAILED DESCRIPTION

Figure 1:
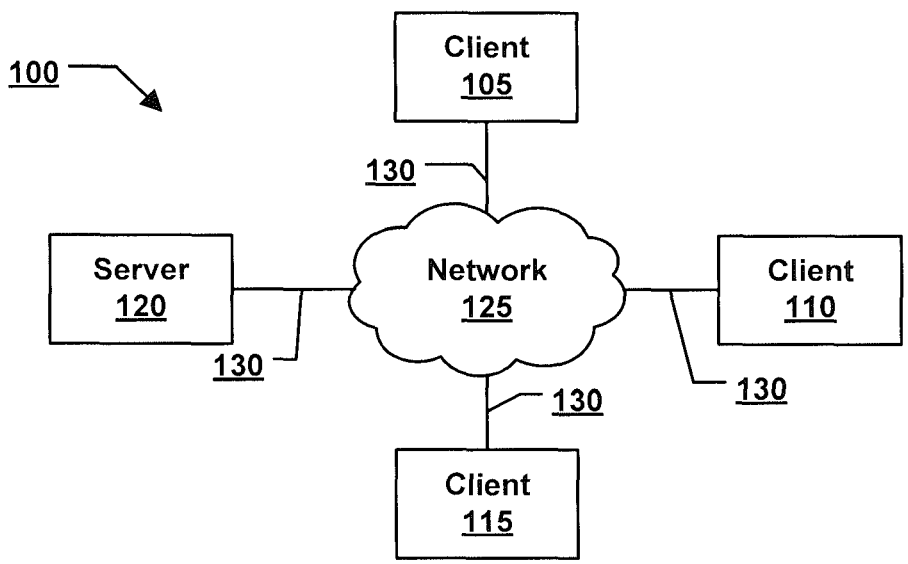
FIG. 1 shows a simplified block diagram of a specific embodiment of a system for managing mobile device resources implemented in a distributed computing network connecting a server and clients.

FIG. 1 is a simplified block diagram of a distributed computer network 100 incorporating a specific embodiment of a system for managing resource usage on a mobile device. Computer network 100 includes a number of client systems 105, 110, and 115, and a server system 120 coupled to a communication network 125 via a plurality of communication links 130. Communication network 125 provides a mechanism for allowing the various components of distributed network 100 to communicate and exchange information with each other.

Communication network 125 may itself be comprised of many interconnected computer systems and communication links. Communication links 130 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, Internet telephony, IP telephony, digital voice, voice over broadband (VoBB), broadband telephony, Voice over IP (VoIP), public switched telephone network (PSTN), and others. While in one embodiment, communication network 125 is the Internet, in other embodiments, communication network 125 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and does not limit the scope of the systems and methods as recited in the claims. One of ordinary skill in the art would recognize other variations, modifications, and alternatives. For example, more than one server system 120 may be connected to communication network 125. As another example, a number of client systems 105, 110, and 115 may be coupled to communication network 125 via an access provider (not shown) or via some other server system.

Client systems 105, 110, and 115 typically request information from a server system which provides the information. Server systems by definition typically have more computing and storage capacity than client systems. However, a particular computer system may act as both a client or a server depending on whether the computer system is requesting or providing information. Aspects of the system may be embodied using a client-server environment or a cloud-cloud computing environment.

Server 120 is responsible for receiving information requests from client systems 105, 110, and 115, performing processing required to satisfy the requests, and for forwarding the results corresponding to the requests back to the requesting client system. The processing required to satisfy the request may be performed by server system 120 or may alternatively be delegated to other servers connected to communication network 125.

Client systems 105, 110, and 115 enable users to access and query information or applications stored by server system 120. Some example client systems include desktop computers, portable electronic devices (e.g., mobile communication devices, smartphones, tablet computers, laptops) such as the Samsung Galaxy Tab®, Google Nexus devices, Amazon Kindle®, Kindle Fire®, Apple iPhone®, the Apple iPad®, Microsoft Surface®, the Palm Pre™, or any device running the Apple iOS™, Android™ OS, Google Chrome OS, Symbian OS®, Windows Mobile® OS, Windows Phone, BlackBerry OS, Embedded Linux, webOS, Palm OS® or Palm Web OS™.

In a specific embodiment, a "web browser" application executing on a client system enables users to select, access, retrieve, or query information and/or applications stored by server system 120. Examples of web browsers include the Android browser provided by Google, the Safari® browser provided by Apple, Amazon Silk® provided by Amazon, the Opera Web browser provided by Opera Software, the BlackBerry® browser provided by Research In Motion, the Internet Explorer® and Internet Explorer Mobile browsers provided by Microsoft Corporation, the Firefox® and Firefox for Mobile browsers provided by Mozilla®, and others (e.g., Google Chrome).

Figure 2:
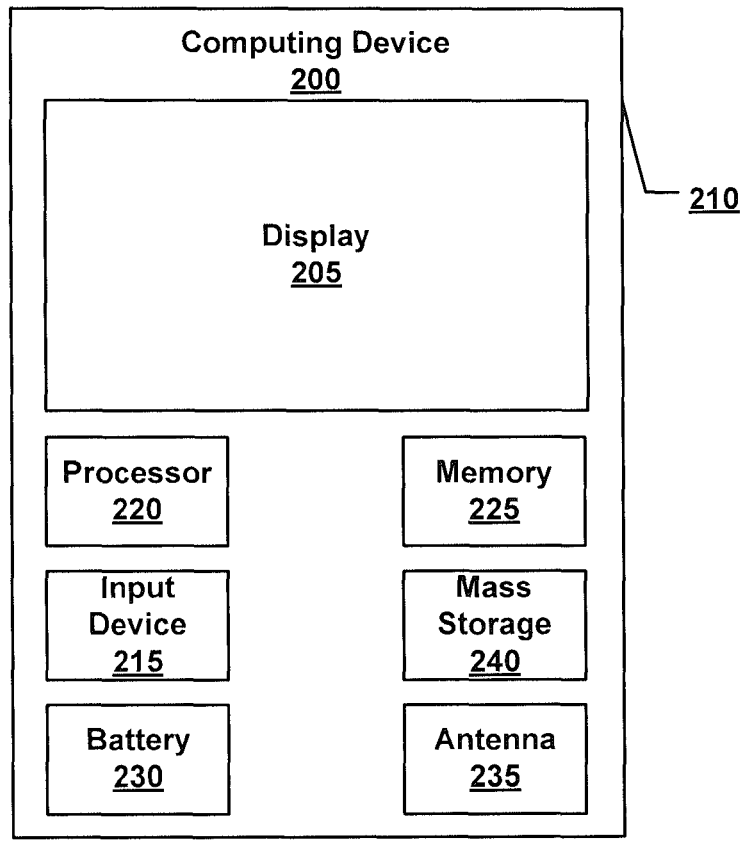
FIG. 2 shows a more detailed diagram of an exemplary client of the mobile device resource management system.

FIG. 2 shows an exemplary computer system such as a client system. In an embodiment, a user interfaces with the system through a client system, such as shown in FIG. 2. Mobile client communication or portable electronic device 200 includes a display, screen, or monitor 205, housing 210, and input device 215. Housing 210 houses familiar computer components, some of which are not shown, such as a processor 220, memory 225, battery 230, speaker, transceiver, antenna 235, microphone, ports, jacks, connectors, camera, input/output (I/O) controller, display adapter, network interface, mass storage devices 240, and the like.

Input device 215 may also include a touchscreen (e.g., resistive, surface acoustic wave, capacitive sensing, infrared, optical imaging, dispersive signal, or acoustic pulse recognition), keyboard (e.g., electronic keyboard or physical keyboard), buttons, switches, stylus, or combinations of these.

Mass storage devices 240 may include flash and other nonvolatile solid-state storage or solid-state drive (SSD), such as a flash drive, flash memory, or USB flash drive. Other examples of mass storage include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+ RW, HD-DVD, or Blu-ray Disc), battery-backed-up volatile memory, tape storage, reader, and other similar media, and combinations of these.

The system may also be used with computer systems having different configurations, e.g., with additional or fewer subsystems. For example, a computer system could include more than one processor (i.e., a multiprocessor system, which may permit parallel processing of information) or a system may include a cache memory. The computer system shown in FIG. 2 is but an example of a computer system suitable for use. Other configurations of subsystems suitable for use will be readily apparent to one of ordinary skill in the art. For example, in a specific implementation, the computing device is mobile communication device such as a smartphone or tablet computer. Some specific examples of smartphones include the Droid Incredible and Google Nexus One, provided by HTC Corporation, the iPhone or iPad, both provided by Apple, and many others. The computing device may be a laptop or a netbook. In another specific implementation, the computing device is a non-portable computing device such as a desktop computer or workstation.

A computer-implemented or computer-executable version of the program instructions useful to practice the systems and techniques described in this application may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software useful to practice the techniques described in this application may be stored or reside in RAM or cache memory, or on mass storage device 240. The source code of this software may also be stored or reside on mass storage device 240 (e.g., flash drive, hard disk, magnetic disk, tape, or CD-ROM). As a further example, code useful for practicing the techniques described in this application may be transmitted via wires, radio waves, or through a network such as the Internet. In another specific embodiment, a computer program product including a variety of software program code to implement features described in this application is provided.

Computer software products may be written in any of various suitable programming languages, such as C, C++, C#, Pascal, Fortran, Perl, Matlab (from MathWorks, www.mathworks.com), SAS, SPSS, JavaScript, CoffeeScript, Objective-C, Objective-J, Ruby, Python, Erlang, Lisp, Scala, Clojure, and Java. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle).

An operating system for the system may be the Android operating system, iPhone OS (i.e., iOS), Windows Phone, Symbian, BlackBerry OS, Palm web OS, bada, Embedded Linux, MeeGo, Maemo, Limo, or Brew OS. Other examples of operating systems include one of the Microsoft Windows family of operating systems (e.g., Windows 95, 98, Me, Windows NT, Windows 2000, Windows XP, Windows XP x64 Edition, Windows Vista, Windows 7, Windows 8, Windows CE, Windows Mobile, Windows Phone 7), Linux, HP-UX, UNIX, Sun OS, Solaris, Mac OS X, Alpha OS, AIX, IRIX32, or IRIX64. Other operating systems may be used.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system useful in practicing the systems and methods in this application using a wireless network employing a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

Figure 3:
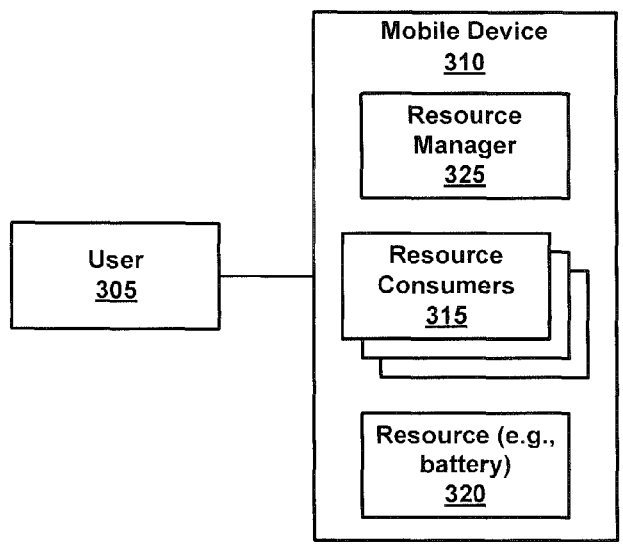
FIG. 3 shows a block diagram of a user interacting with a mobile device having a resource manager of a resource prediction system.

FIG. 3 shows a block diagram of a user 305 using a mobile communication device 310. The mobile communication device includes a set of resource consumers 315, a resource 320, and a resource manager 325. A resource consumer can be any application program, function, setting, option, configuration, or hardware component that consumes a resource of the mobile device. In a specific implementation, the resource includes a battery such as a lithium ion (Li-ion) rechargeable battery. Other examples of batteries include lead-acid, nickel cadmium (NiCd), nickel metal hydride (NiMH), and lithium ion polymer (Li-ion polymer).

The resource manager is part of a resource prediction system 405 (see FIG. 4) that uses contextual information to predict resource usage. The resource manager helps to ensure judicious use of a resource so that the resource can be available when needed. More particularly, mobile devices have a variety of sensors that can sense information about the user and the environment. These devices also have information on the state of device components and resources such as batteries, communications systems, processors, cameras, audio input and output devices, and on the state or configuration of applications installed or running on the device. Such information is referred to as contextual information.

It can be desirable to have applications and external services use contextual information to adapt how applications operate, to obtain additional information based on context for the user or for applications, or to feed external services like social or advertising networks.

Use of sensors and other sources of contextual information consumes resources on the device, such as energy from batteries, or communications bandwidth. Users of such devices have to cope with resource limits and resource exhaustion, such as network data usage limits being exceeded or batteries being drained. It can be desirable to have applications be context-aware and adapt their operation based on the current state of resources or other contextual information. Users and device administrators are not able to develop simple policies that work in all situations to conserve resources according to a user's current context.

It is difficult for users to try to manually manage application and service settings on the device to conserve resources for later use in the day. Device profiles are inadequate because the large number and variety of different contextual situations that users find themselves in would require manually creating and frequently switching among a large number of device profiles.

As more applications and external services attempt to use device contextual information, there is some duplication of effort in obtaining and using contextual information. Different applications may not adapt their operation in a consistent manner. Applications and external services may attempt to obtain and use contextual information in a manner that endangers the security or privacy of the user.

Even when applications are making good use of current contextual information, that may prove insufficient to help the device user achieve a goal of making it through the day (in the case of a battery) or through the month (in the case of a data limit) with enough device resources still available to do perform all, or at least critical, tasks. What looks like a good contextual use of resources based on current state and context at the time could lead to the later exhaustion of a resource when it is still needed; if future use of resources cannot be predicted then it can be impossible for local contextual adaptation to be making good decisions for the longer time period.

Mobile device users report frequently having problems with battery life. Every operation on a mobile device uses some battery, from email to games, from social networks to business applications, from text messages to phone calls. Mobile device users are annoyed and frustrated when they are unable to use their device or its applications because a battery has died.

Previous attempts to address this problem such as task killer programs, battery savers, or profile switchers require frequent attention by the user and address only a small part of the problem of managing resource consumption. For example, profile switcher programs require the mobile device user to develop and label a large number of profiles to attempt to cover normal everyday situations. Users tend to resist excessive configuration of fine-grained controls. Battery saver programs lead to essential services being turned off just before they are actually needed, because the current context state is not sufficient itself to determine what will likely happen in the future.

Figure 4:
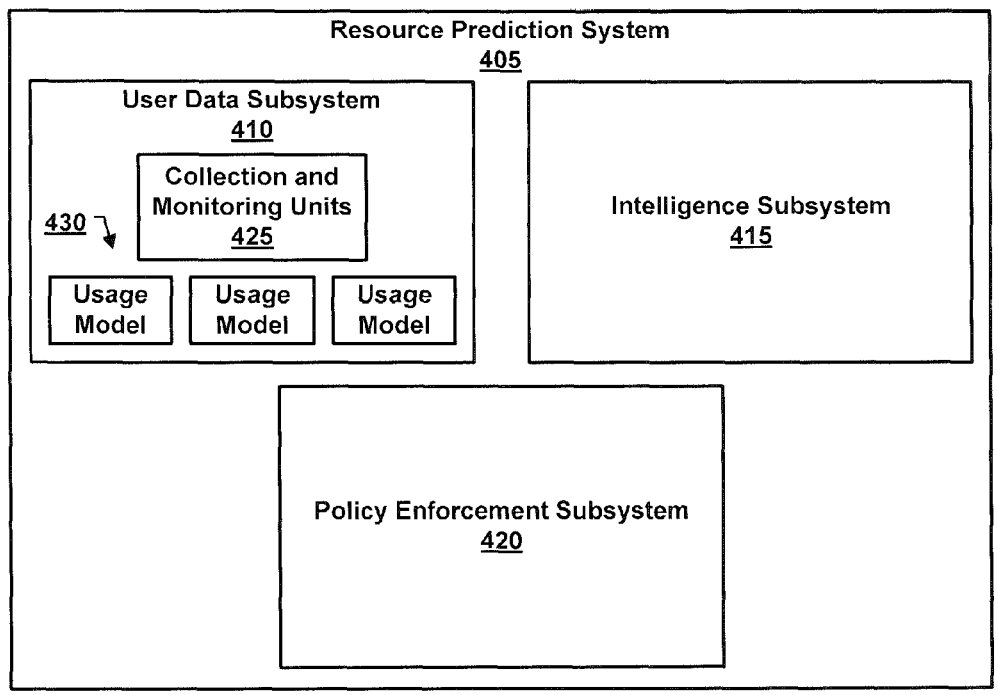
FIG. 4 shows a block diagram of the resource prediction system and its subsystems.

FIG. 4 shows a simplified block diagram of a system 405 configured to provide resource predictions. The features provided by the system may be implemented using a set of subsystems having one or more modules. The modules can be software modules (e.g., software instructions or code) executed by a processor, hardware modules, or combinations of these. The modules (or a subset of the modules) can be part of a computer software product implemented as an independent application (e.g., mobile application program or app) with data input and data display modules. In another specific implementation, the system may be provided within an operating system of the mobile device. In another specific implementation, the system provides prediction as a service to other applications such as through an application programming interface (API) or web service.

In a specific implementation, the one or more modules are distributed across a mobile device and a server system. Typically, a server has more computing resources than a mobile device. For example, a server may have more storage, more memory, faster and more powerful processors, and will not be dependent on a battery as a primary source of power as compared to the mobile device. Thus, one advantage of a distributed system is that processor intensive computing tasks such as those involving large datasets, data mining, pattern discovery, correlations, and the like can be performed on a server. The results of the server computations can be transmitted as instructions for the mobile device to follow and execute.

In another specific implementation, the modules are located on the mobile device and the processing is performed at the mobile device. An advantage of this approach is that the mobile device does not have to connect to the server system. For example, the mobile device may be in an area without network connectivity. However, the user will be provided the benefits of the resource prediction system because the modules are located on the mobile device.

The system, as shown in the example of FIG. 4, a user data subsystem 410, an intelligence subsystem 415, and a policy enforcement subsystem 420. The user data subsystem includes collection and monitoring units 425 to collect users' activity data related to usage of their mobile device. In one embodiment, the user data subsystem includes a usage model 430 that is created and stored for each user of the resource prediction system. A usage model represents the system's understanding of how a user uses the mobile device including the context in which such use occurs and other information that can be used to predict future use of a resource (e.g., battery).

A context describes the conditions under which device usage, non-usage, or both occur. In a specific implementation, determining a current context and predicting a subsequent or later context is used to manage battery usage during the current context so that the battery is available for the subsequent context.

In a specific implementation, context is used to automatically configure the mobile device. For example, in this specific implementation, the system may determine that the current context includes the user attending a meeting in a meeting room at his work location. Based on the current context, the system may automatically activate one or more policies that allow phone calls from family or emergency calls (e.g., call is being placed from a hospital) but block other phone calls, disable mobile device sounds (e.g. chimes), close background applications, and disable location service. Determining context allows the system to discover what the user is currently doing, anticipate or predict what the user is likely to do next, and configure the mobile device accordingly.

There can many different levels of context abstraction. For example, the context "commute to work" may be further detailed as "commute to work in car" or "commute to work on train." These different levels of abstraction allow the system to provide very fine-grained control for adapting device behavior. Context can include geographical location information, applications used, time and date information, and other information. Further discussion is provided below.

The intelligence subsystem is responsible for building and creating the usage models by analyzing the usage data collected by the collection and monitoring units. The analysis can include pattern detection, event and activity correlation, comparisons, and detecting deviations from typical device usage. Based on the analysis, the intelligence subsystem makes a prediction about the resource.

An example of a prediction is that the resource, e.g., battery, will fall below a threshold charge level at a particular time. If the particular time is before a time at which the battery is permitted to fall below the threshold charge level, the system takes actions to help reduce usage of the battery. For example, in some cases it may be okay for the battery to fall below the threshold charge level such as when the user is at home and has access to a charger. It is desirable to intelligently manage use of the battery—rather than simply disabling things—because then the user can enjoy the full functionality of the device and accompanying applications and services.

In an implementation, reducing usage of a resource, such as a battery, is the responsibility of the policy enforcement subsystem. The policy enforcement subsystem activates and enforces resource usage policies on the mobile device in order to help conserve a resource. Examples of resource conservation actions include changing settings on the mobile device (e.g., changing or dimming a brightness setting of the screen, disabling local network connectivity such as Bluetooth), altering the frequency of notifications, disabling a service, providing substitute services that consume less of a resource, and many others. In an implementation, a policy can be activated automatically based on the current context. That is, the policy can be activated without user intervention. In other implementations, the system seeks authorization from the user before activating a policy.

Figure 5:
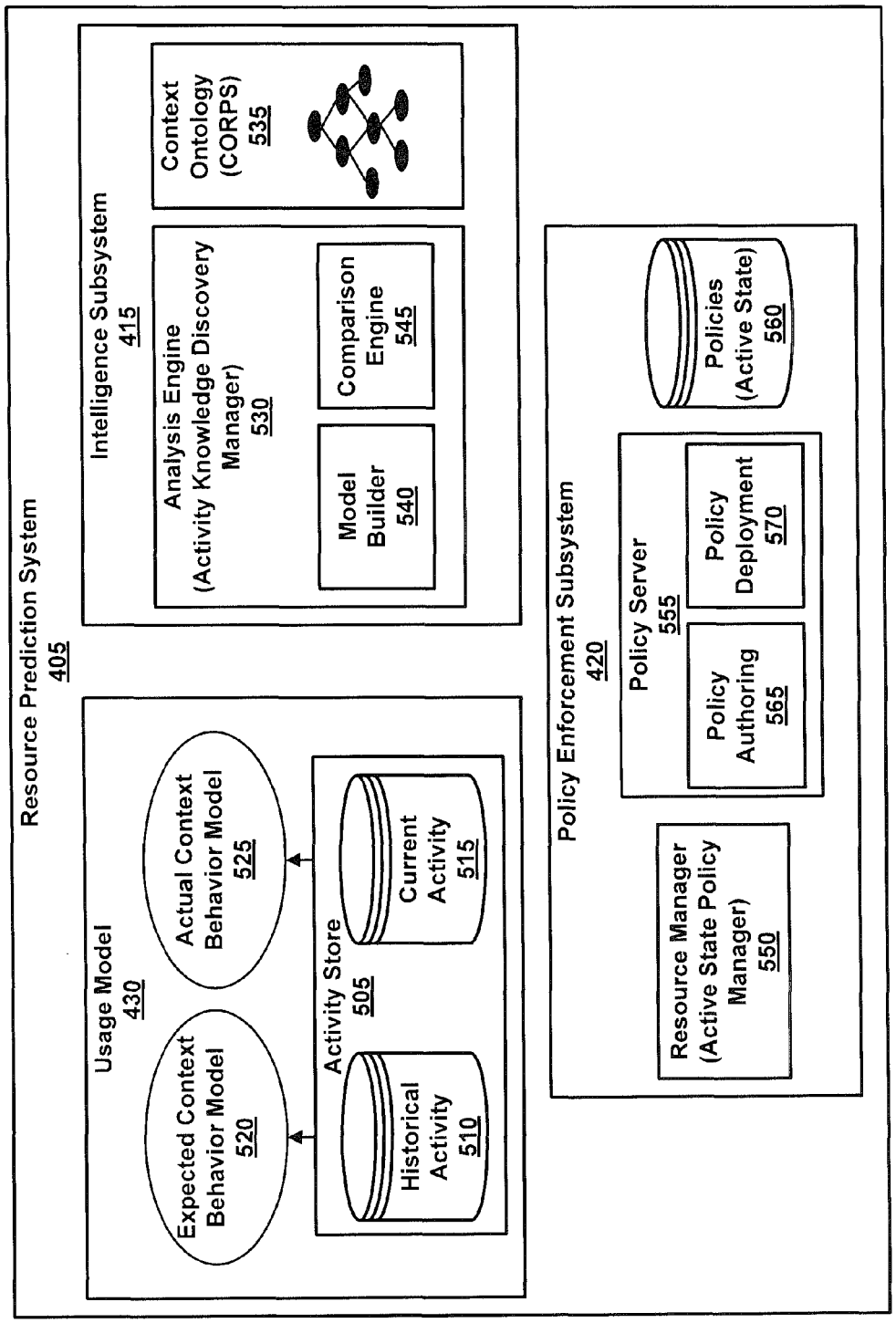
FIG. 5 shows a more detailed block diagram of the resource prediction system shown in FIG. 4.

FIG. 5 shows a more detailed block diagram of the resource prediction system shown in FIG. 4. As discussed above, user data subsystem 410 as shown in FIG. 4 includes usage model 430 that is created by the prediction system and stored for each user of the system. The usage model includes an activity store 505 that stores historical activity data 510 and current activity data 515.

The system uses the historical activity data, and the current activity data to build an expected context behavior model 520, and an actual context behavior model 525, respectively. The expected context behavior model represents a user's expected behavior. For example, the expected context behavior model may include information that describes the user's activities on a typical day (e.g., weekday or weekend). The actual context behavior model represents the user's actual behavior. For example, the actual context behavior may include information that describes the user's activities during a current time period. The current time period may extend to the last minute, last five minutes, last 10 minutes, last 15 minutes, last 30 minutes, last hour, last two hours, or any duration of time that has elapsed as measured from the current time.

Figure 18:
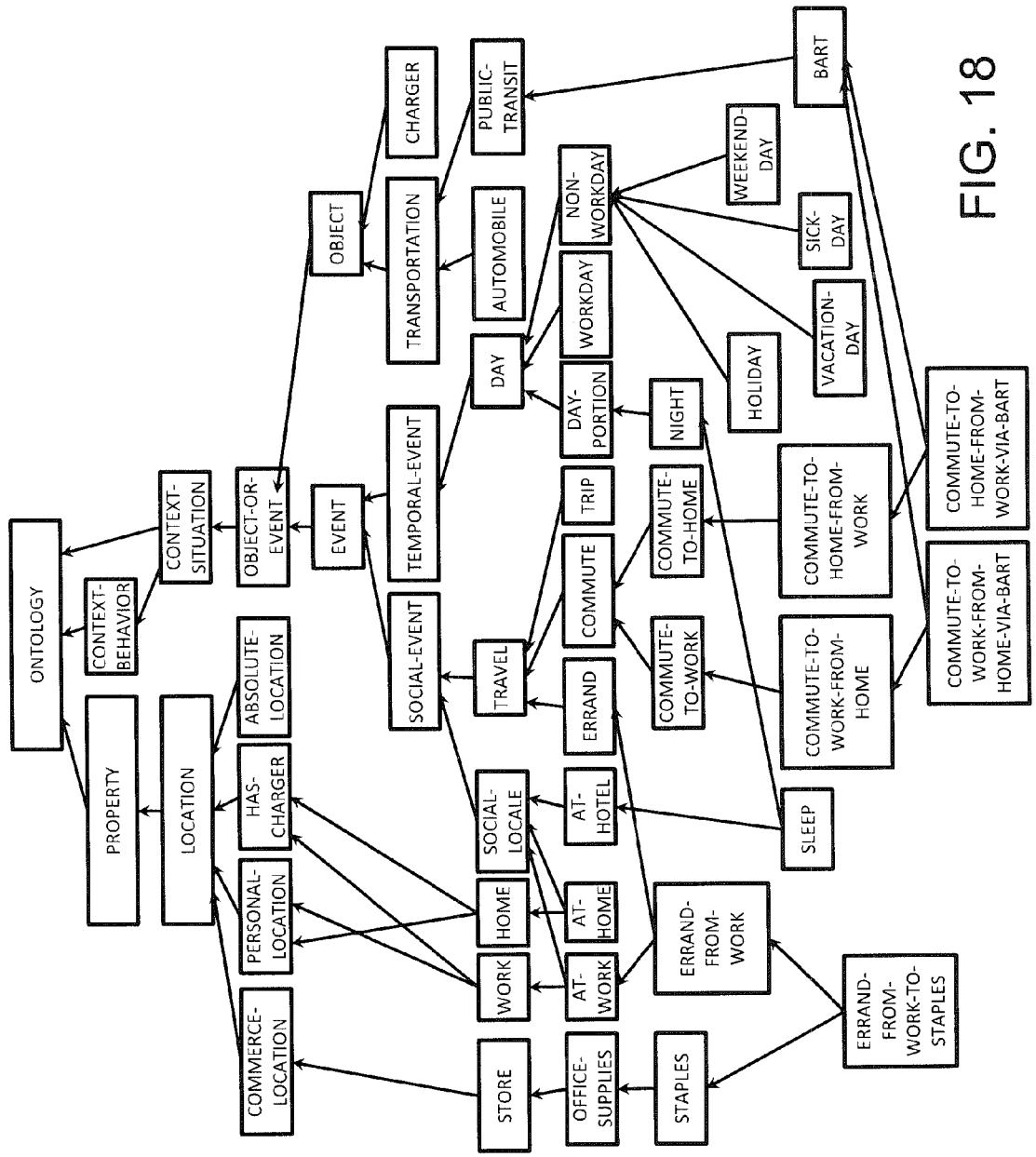
FIG. 18 shows an example of an ontology.

As shown in FIG. 5, intelligence subsystem 415 includes an analysis engine 530 and a context ontology 535. The analysis engine includes a usage model builder 540 and a comparison engine 545. The analysis engine may be referred to as an activity knowledge discovery manager. The context ontology includes a hierarchical arrangement of contexts. A context describes the conditions under which device usage, non-usage, or both occur. The conditions can include time, date, location, speed (e.g., tracking the movement of the device), and other factors (e.g., altitude, or temperature). For example, a portion of an ontology may include Location>Personal-Location>Home>Has-Charger. FIG. 18 shows a more detailed diagram of an example of an ontology. The context ontology may be referred to as the Context Ontology with Resource and Policy Semantics repository or CORPS. Further discussion of CORPS is provided below.

The model builder can act as a bridge between the context ontology and the data collected in the activity store to build the expected and actual context behavior models. The model builder can use the context ontology to tag, categorize, organize, classify, or label the activity data collected in the activity store.

The comparison engine can compare the actual context behavior model with the expected context behavior model to determine any deviations. For example, a user's expected morning routine may include relatively little use of the mobile device, but the user's afternoon routine may include heavy usage of the mobile device to, for example, make phone calls, run productivity applications, check email, and so forth. Consider, however, that for a particular morning the user's actual usage of the mobile device deviates such that actual usage is higher than expected. The higher morning usage uses more battery power than expected according to the expected context behavior model. Based on the higher than expected usage in the morning, the system may make a prediction that the battery charge level will not be sufficient for the user's afternoon routine. In this case, the system can activate resource reduction policies to help ensure that the battery charge level will be sufficient to support the user's afternoon routine. For example, the system may disable a service on the mobile device in order to conserve battery power.

Alternatively, if the actual usage is as-expected the system can permit the service to remain activated. Thus, the user can continue to enjoy the benefits of the service. If the actual usage is less than expected, the system can allow for increased usage of the battery. For example, the system may enable a service.

As shown in FIG. 5, policy enforcement subsystem 420 includes a resource manager 550, a policy server 555, and a policy repository 560. The policy server includes a policy authoring module 565 and a policy deployment module 570. The policy authoring module provides an interface such as a graphical user interface, programmatic interface, or both through which an administrator can create and edit policies. The policies are stored in the policy repository. The policy repository may be referred to as an active state. The policy deployment module is responsible for transmitting policies to the mobile device. Policies may be transmitted on an as-needed basis. This helps to conserve storage resources on the mobile device. Alternatively, policies may be preinstalled on the mobile device so that they can be immediately available when needed.

In an implementation, the resource manager is a module on the mobile device that manages usage of a mobile device resource according to an activated policy. The resource manager may be referred to as an active state policy manger. Further discussion is provided below.

Figure 6:
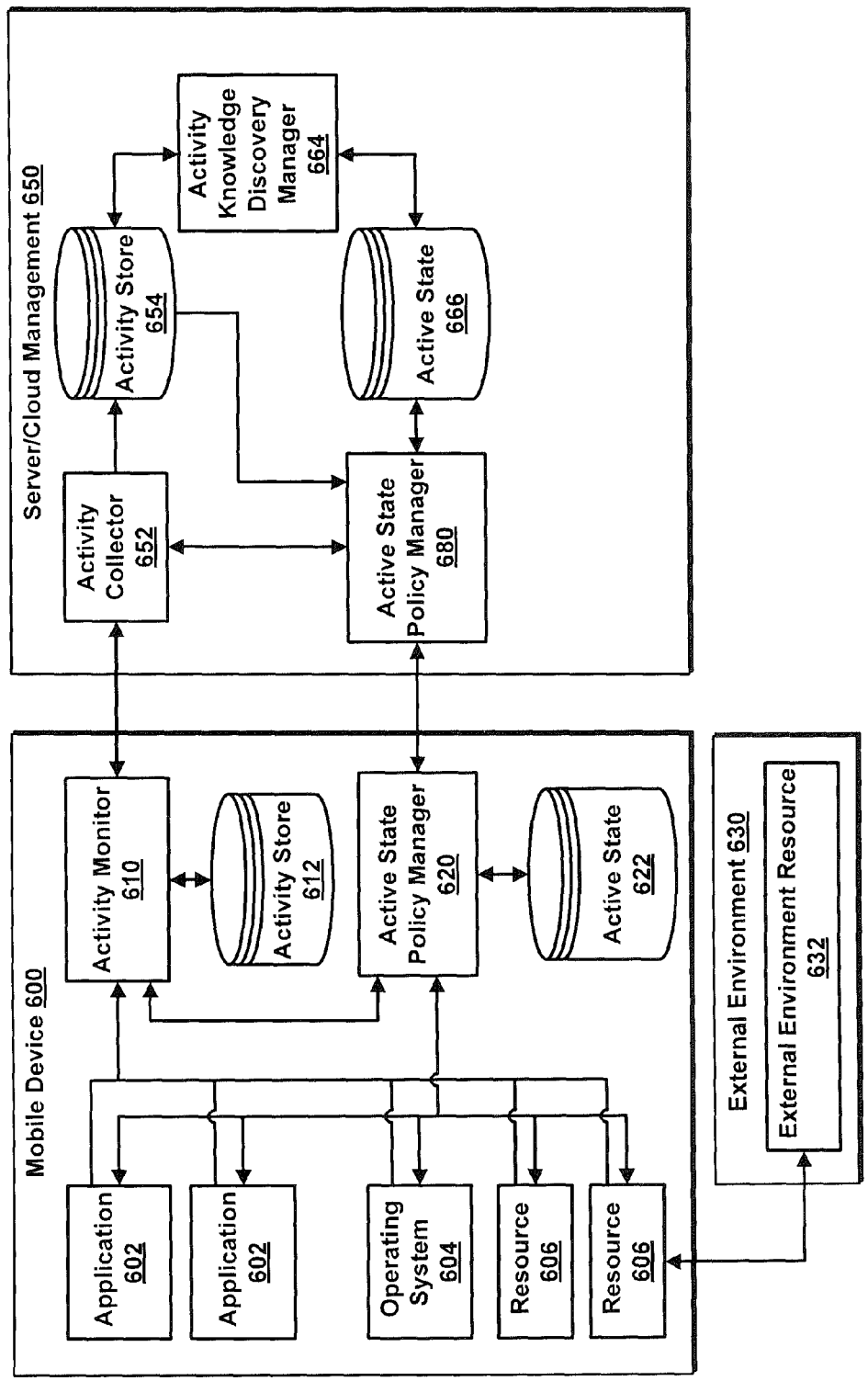
FIG. 6 shows a block diagram of a mobile device and a management service running on a server or in the cloud.

FIG. 6 shows a specific embodiment of the resource prediction system. According to the specific embodiment shown in FIG. 6, a mobile device 600 has a collection of mobile device elements, which include a plurality of applications 602, the operating system 604, and resources 606 used by the applications 602 and by the operating system 604.

Resources 606 include physical items like sensors or device components, or logical items like built-in services. Physical items can include but are not limited to batteries, processors, cameras, audio input or output devices, GPS devices, thermometer sensors, accelerometers, display screens or LED indicators, communications components like cellular communication chips, Wi-Fi communications chips, or batteries.

Logical items can include operating system software components or properties of physical items such as monthly data usage limits. Some resources 606 are exhaustible resources; as they are used, their capacity is reduced, and they can be exhausted. Examples include batteries or network data limits.

Other resources 606, the operating system 604, and applications 602 can in their operation have an effect on an exhaustible resource. The actions they take, their current state, and their configuration settings can all have a different degree of effect on an exhaustible resource.

Not shown in the figure is the presence of virtual machine technologies or device firmware logic. Firmware logic, which is conceptually below the level of the operating system, may have settings or operations which can be used in implementing policies. There can be a virtual machine layer underneath the level of the operating system, which may have settings or operations which can be used in implementing policies. Additionally, the operating system may have the ability to run virtual machine applications, each of which would have the ability to run an operating system and applications; any or all of these may have settings or operations which can be used in implementing policies. There are non-exhaustible resources which are nonetheless finite in some respect, such as memory or storage with respect to the number of bytes that can be stored, or such as CPU with respect to the number of processor cycles available in a given time interval. Any such non-exhaustible resource with a finite capacity can be modeled as a special kind of exhaustible resource with regards to the use of active policies to reduce or optimize resource utilization.

As discussed above, examples of the operating system 604 are the Android operating system used on various mobile devices, or the iOS operating system used on iPhone or iPad devices. Reference to the operating system 604 may also include its components or associated libraries, and any use of a virtualization mechanism which may be hosting and running the operating system or applications.

There may be external environment resources 632 in the external environment 630 which can include but are not limited to battery chargers, sensors, or services that can make information available to resources 606 or which can communicate with and be controlled by resources 606. External environment resources 632 are not properly part of the mobile device 600, although they may communicate with the mobile device 600 or may be sometimes connected to the mobile device 600.

An activity monitor 610 obtains information from applications 602, the operating system 604, resources 606 (which may include information obtained by resources 606 from external environment resources 632), or combinations of these. Such information can include but is not limited to application configuration settings, application current state or activities for running applications, actual application binaries or portions thereof, information provided by the operating system about its current state and settings, raw data information from the various resources, or combinations of these. The operating system may mediate access to some or all of this information.

The activity monitor 610 in its monitoring may obtain the information just once, or may subsequently again obtain the information, which may have changed. Subsequent acts of obtaining information may occur periodically, or may be driven by listening for changes in the information, or may be driven by requests or notifications from mobile device elements or the activity collector 652 or the active state policy manager 620 or 680. As an example, for a given time period, such as a 24-hour time period, the activity monitor may make a single collection of information or may make multiple collections of information.

The activity monitor 610 may store the information it obtains in a local activity store 612. The activity monitor may read the information stored in the local activity store 612 for communication with the activity collector 652, for communication with the active state policy manager 620, or both.

An active state policy manager 620 reads information from or stores information into a local data store called the active state 622. The active state policy manager 620 queries or modifies the settings or state of applications 602, the operating system 604, resources 606, or combinations of these. The active state policy manager 620 may also query or modify the settings or state of external environment resources 632. The active state policy manager 620 communicates with the active state policy manager 680 that is located in the server/cloud management service 650.

In one embodiment the active state policy manager 620 may modify an application 602 by embedding an executable policy into the application.

In another embodiment, the active state policy manager 620 may dynamically attach to an application 602, or to the operating system 604, or to a resource 606, in memory to implement policy enforcement.

In another embodiment, cooperating applications 602 may have been linked with libraries (that front end various calls or messaging in the application which receive or send context information or which access resources or the operating system) that communicate with the active state policy manager 620 to obtain permissions for actions.

In an embodiment the active state policy manager 620, via modification of or dynamic attachment to the applications 602, or the operating system 604, or the resources 606, or a combination thereof, mediates access from the applications 602 to context information available from the operating system 604 or the resources 606, providing its own version of the information or selectively denying access to such information. Its own version of the information could include cached copies of information previously retrieved, or information that has been standardized to hide details regarding the different models or types of resources providing the information, or information that has been modified or had some information removed for privacy reasons.

In an embodiment the active state policy manager 620 may take action on the mobile device elements (applications 602, operating system 604, resources 606). Actions can include starting an application, killing a running application, disabling a resource, or modifying the current state or configuration settings of an application or the operating system or resource. Actions can include the active state policy manager 620 directly and automatically taking the actions, or prompting the mobile device user for permission to take the actions, or suggesting to the mobile device user that the user take specific actions.

The server/cloud management service 650 runs on a plurality of servers, and may be provisioned in the cloud. A server/cloud management service 650 may communicate with multiple mobile devices 600.

The activity collector 652 communicates with the activity monitor 610 which is running on the mobile device 600. The activity collector receives information that has been obtained by the activity monitor 610 and stores it in the activity store 654 that is part of the server/cloud management service 650.

The activity knowledge discovery manager 664 reads information from the activity store 654 and using a variety of knowledge discovery in data techniques, including clustering, data mining, and machine learning techniques, discovers patterns of resource usage and creates resource predictions and writes them into the active state 666 store.

The active state policy manager 680 reads the information in the active state 666, optionally updated with selected unprocessed information from the activity collector 652. The active state policy manager 680 constructs, selects, or modifies policies and writes them to the active state 666 store. The active state policy manager 680 on the server/cloud management service 650 communicates information from the active state 666 store to the active state policy manager 620 that runs on the mobile device 600.

The activity collector 652 informs the activity monitor 610 regarding what information to collect and what information to forward to the activity collector 652. Some information may be monitored by the activity monitor 610 that is not forwarded to the activity collector 652.

Figure 7:
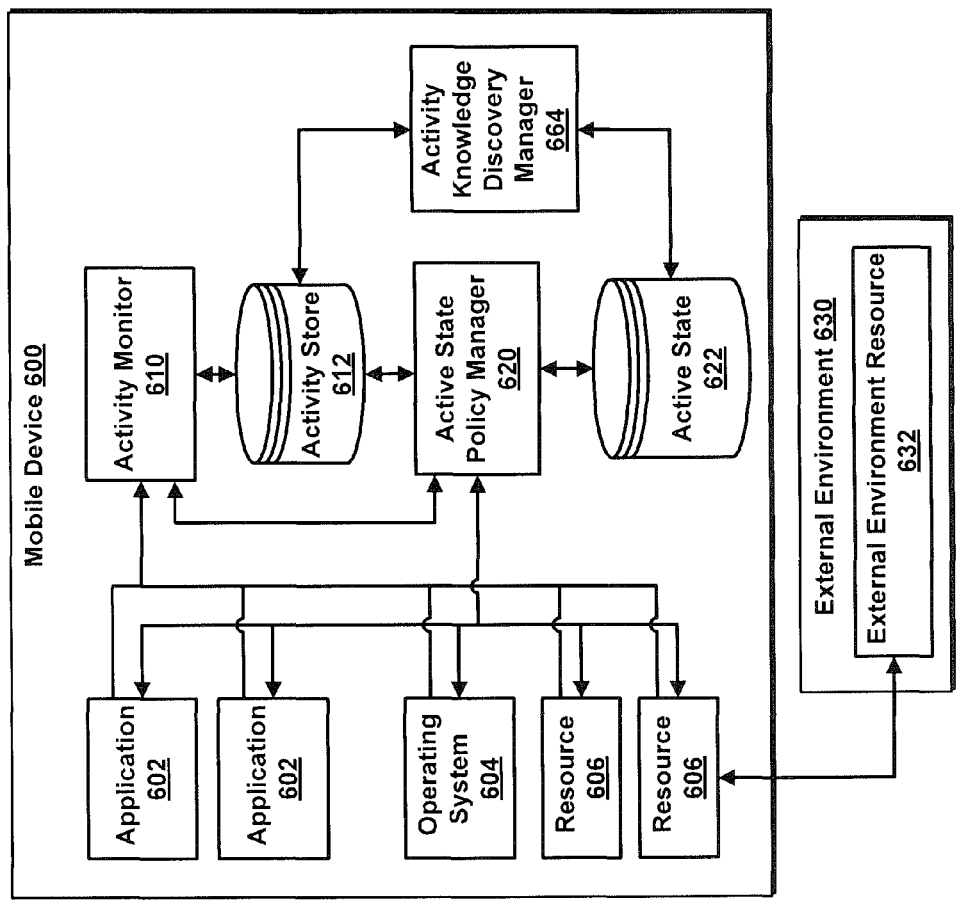
FIG. 7 shows a block diagram of a mobile device with a management service running on the mobile device.

Referring now to FIG. 7, a system is illustrated similar to the one in FIG. 6, but in which there is no server/cloud management service, rather the management parts reside on the mobile device 600.

In another embodiment, the mobile device 600 can run all the elements as shown in FIG. 7, but the activity monitor 610 and active state policy manager 620 can be in communication with an activity collector 652 and an active state policy manager 680, respectively, that are part of a server/cloud management service 650. This is a hybrid embodiment in which the mobile device 600 can perform all the management activities but locally, but may communicate with a server/cloud management service 650.

Figure 8:
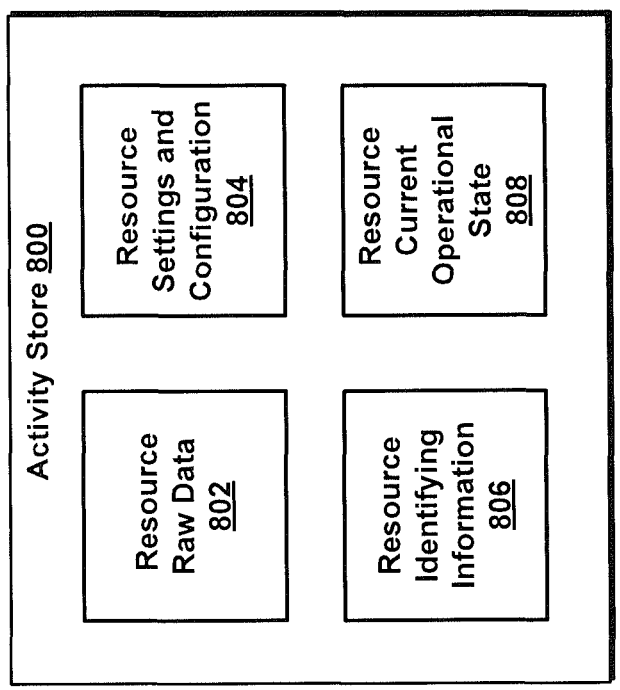
FIG. 8 shows a block diagram of the Activity Store and its components.

Referring now to FIG. 8, the activity store 800 is illustrated in greater detail. Information that identifies the specific instance of a resource (such as a serial number or other unique identifier, or the make or model or type of resource (such as brand and model number of a battery or processor or the name, software identifier [e.g., package name], and version of an application and information about the application publisher [e.g., name, signing certificate]) is included in the resource identifying information 806. Information that relates to the resource settings and configuration 804 is also part of the activity store 800; for an application this can include part or all of the application binary as installed on the mobile device 600 as well as configuration information for the application. The resource current operational state 808 includes those pieces of information such as, for a battery, whether it is currently charging or not, and what the current level of charge is.

For resources that are themselves sensors, there can be a stream of raw (unprocessed) data from the resource; this is the resource raw data 802. The resource settings and configuration 804 also contains information about the format and precision of the resource raw data 802 that the resource can supply. In an embodiment the activity monitor 610 or the activity knowledge discovery manager 664 may perform some processing on the resource raw data 802 to summarize or distill or categorize it, augmenting the resource raw data 802 in the activity store 800.

For the purposes of the activity store 800, resources can also include information obtained from external environment resources 632.

Figure 9:
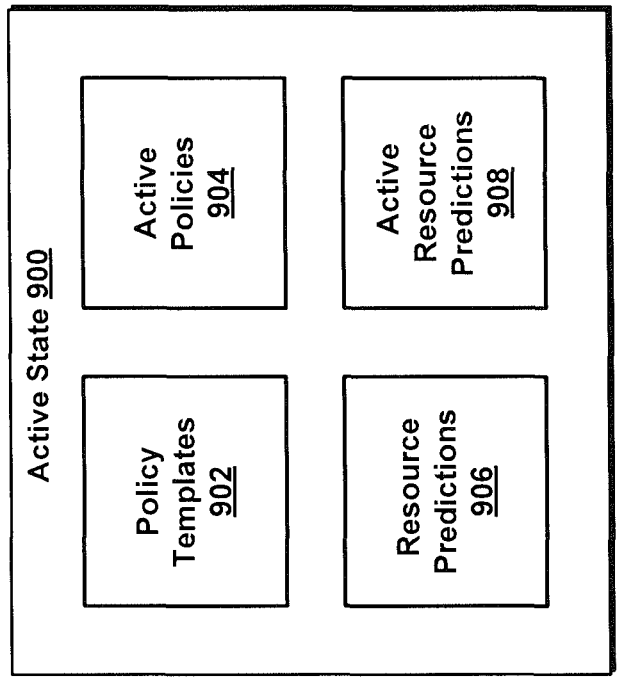
FIG. 9 shows a block diagram of the Active State component.

FIG. 9 illustrates the parts of the active state 900 store, which is represented as active state 622 and active state 666 in FIG. 6 and as active state 622 in FIG. 7.

A policy template 902 is constructed by and written to the active state 900 by the activity knowledge discovery manager 664, or can be manually authored by an administrator. A policy template is set of conditions and possible actions that can be taken on the mobile device 600 by employing the active policy manager to modify the functioning of an application 602 or the operating system 604 or a resource 606 or an external environment resource 632. A policy template may also have associated with it qualitative or quantitative measures of the results that a policy may have on resources.

For example, a policy template that changes the frequency that an email application checks for new mail to once every ten minutes instead of once a minute may qualitatively specify results of lowered battery/power usage, or may quantitatively specify results of reduced battery/power usage of so many mAh saved per hour.

A policy template 902 can be expressed in a number of ways. In one embodiment a policy template is a set of IF-THEN-ELSE rules which test properties of the current device conditions and take actions which can involve modifying the settings or configurations or current state of applications or the operating system or resources on the mobile device 600, or modifying the settings or configurations or current state of other elements of the environment that are external to the mobile device 600.

Using the example of a policy template that reduces the frequency of checking for email, this could be accomplished by modifying a setting in the email application. The email application may have an API or other interface that allows for changing this setting. The email application may store this setting in a configuration file, such that the setting can be modified by altering the configuration file, potentially requiring stopping and restarting the application to accomplish the change in setting. The email application might not expose such a setting, but might use an account sync service provided by the operating system, as in the Android operating system; in such a case the frequency of checking for new email can be accomplished by turning off the automatic sync operation, and periodically "waking it up" by turning it back on for a short period of time.

Other actions can involve sending notifications to the current user on the same or a different device, or executing a named procedure from the policy manager to solicit user input or approval for a tentative decision to take a particular action. In another embodiment a policy could be a piece of source code or executable code to be run on the device in the context of the device's policy manager. In another embodiment a policy could be a set of desired states or configuration settings. A policy template 902 is called a template because it may contain slots that can be filled by values from designated properties from the current device conditions by the active state policy manager 620 or 680.

An active policy 904 is a policy that is constructed by the active state policy manager 620 or 680 optionally using policy templates 902. An active policy 904 represents a policy that the active state policy manager 620 may conditionally enforce on the mobile device 600. Various pieces of information that are specific to a particular device or user may be filled in when turning a policy template into an active policy that is to be running on a device. In a specific implementation, policy templates are organized hierarchically. A higher-level policy template may define a high-level set of goals, such as reducing network traffic and resulting battery usage by reducing frequency of checking for updates for new content. Hierarchically below this may be policy templates for accomplishing the higher-level goal for specific applications, e.g., an email application, Facebook, etc. Further down the hierarchy may be policy templates that are device specific, e.g., the policy template for reducing the frequency of checking for new mail in the Gmail application could be different on an Android device vs. on an iPhone. The expected results on resources associated with a policy template (and with an instantiated policy) are used to modify resource predictions.

The resource predictions 906 are constructed and written to the active state 900 by the activity knowledge discovery manager 664. A resource prediction 906 is based on information that has been gathered into the activity store 612 or activity store 654. A resource prediction 906 is a prediction of what is likely to happen with respect to a resource over time. This can include expected rates of resource usage, usual network locations contacted, usual applications executed, and frequency of certain activities performed on the mobile device 600 by applications 602 or the operating system 604 or resources 606.

An active resource prediction 908 is a specific instantiation of a resource prediction 906 corresponding to conditions pertaining on the mobile device 600 at this point in time.

Figure 10:
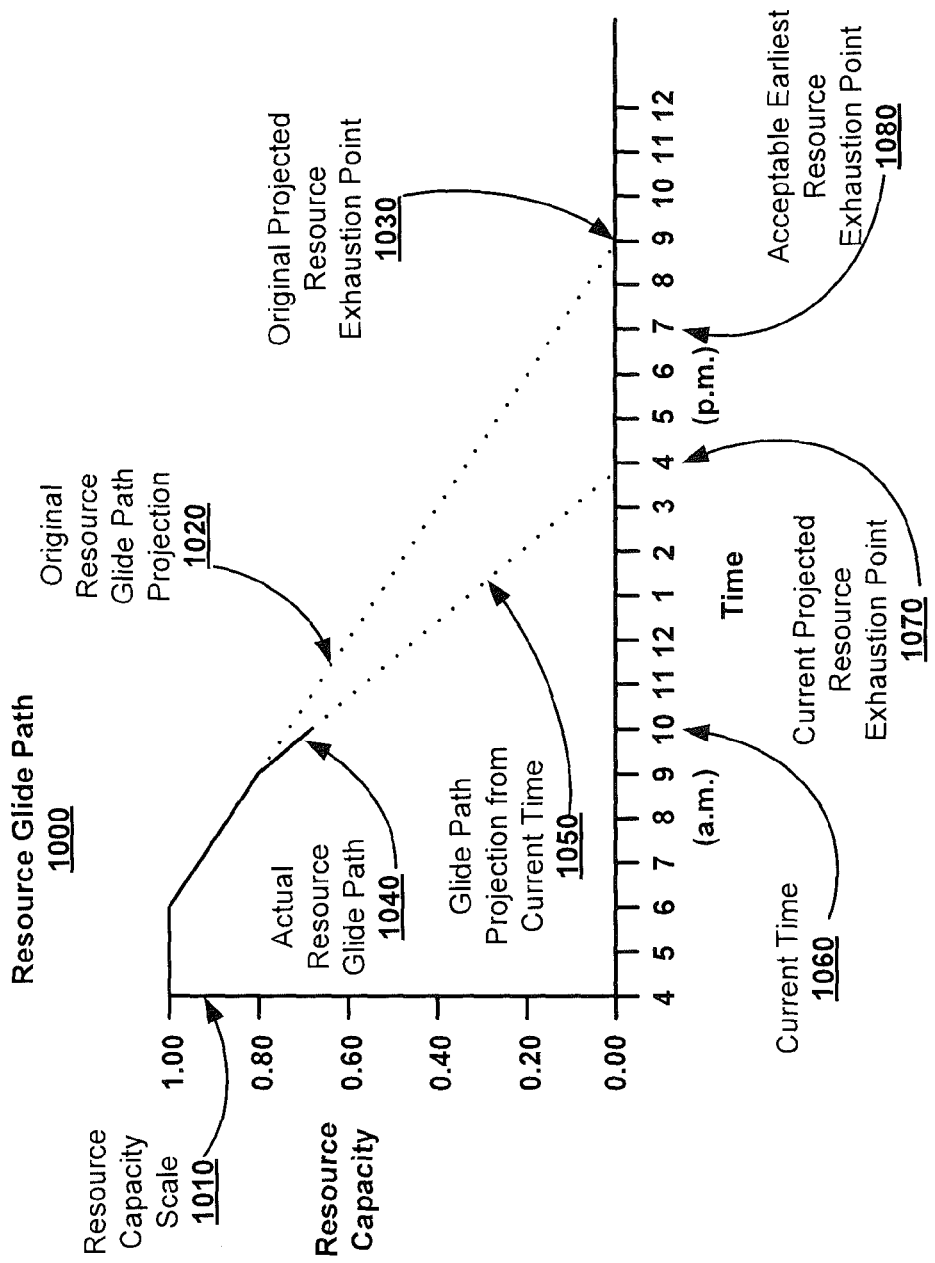
FIG. 10 shows a diagram of a Resource Glide Path.

Turning now to FIG. 10, an example resource glide path 1000 is detailed. As shown in FIG. 10, the resource glide path is plotted on a Cartesian coordinate plane having an x-axis and a y-axis. The x-axis represents resource capacity. The y-axis represents time. The resource glide path 1000 is a property of a resource prediction 906, or an active resource prediction 908.

There can be different resource glide path properties for different resources 606 that exist on the mobile device 600. For example, the resource glide path 1000 could be for a battery resource. In that case, the resource capacity scale 1010 would represent the battery capacity, with 1.00 indicating a fully charged battery, and 0.00 indicating a fully discharged battery. A resource glide path projection 1020 that is a property of a resource prediction 906 is a resource prediction glide path; it represents a prediction of what is likely to happen in the future.

The original resource glide path projection 1020 represents a prediction that had been initially created by the activity knowledge discovery manager 664 and placed into the active state store 622 or 666. The active state policy manager 620 or 680 placed the resource prediction into the active state 622 or 666 as an active resource prediction 908 when it determined that the device conditions corresponded to this resource prediction. An active resource prediction can be modified by the active state policy manager while it is active according to changes in current device conditions.

For example, additional information is available having been gathered by the activity monitor 610 on the mobile device 600. The actual resource glide path 1040 represents the actual resource usage that was measured on the mobile device 610. In this example, more of the resource had been used than had been predicted; the glide path is below the original resource glide path projection 1020.

The active state policy manager 620 has updated the resource glide path 1000 accordingly with a new glide path projection from current time 1050; the current time 1060 is 10:00 a.m. This projection shows a current projected resource exhaustion point 1070 occurring at about 4:00 p.m. The original projected resource exhaustion point 1030 was at about 9:00 p.m. This time was after the acceptable earliest resource exhaustion point 1080, and thus was by definition, acceptable. But the new exhaustion point occurs earlier.

An active policy 904 may take action because there is now a current projected resource exhaustion point 1070 that occurs sooner than the acceptable earliest resource exhaustion point 1080 which corresponds to the user's anticipated arrival at the user's residence where the user can charge the device battery.

The active policy manager can choose a plurality of active policy templates which can be turned into active policies to run on the device. The choice uses the expected impact of the policy upon the resource to determine which and how many active policies should be activated, and what settings they should be using. E.g., the active policy manager can select the active policy templates with the largest anticipated impacts on reducing resource usage, continuing to activate more active policy templates until the aggregate impact on resource usage is low enough to allow the resource exhaustion point to occur at or after the acceptable earliest resource exhaustion point.

In a specific implementation, the system provides a reserve in a resource prediction. An example of a reserve is that the user may want to guarantee that there is always enough resource (e.g., battery power) to be able to make a voice phone call of two minutes duration. Other types of reserves with respect to different user actions within different user applications could also be present. The presence of one or more reserves essentially raises the floor of a resource glide path. Rather than having a floor of resource capacity 0.00, the presence of one or more reserves might raise the floor of resource capacity to 0.22. This affects the time position of resource exhaustion points, which correspond now to places where the resource glide path will intersect the resource floor (higher than 0.00 because of the reserve).

Figure 11:
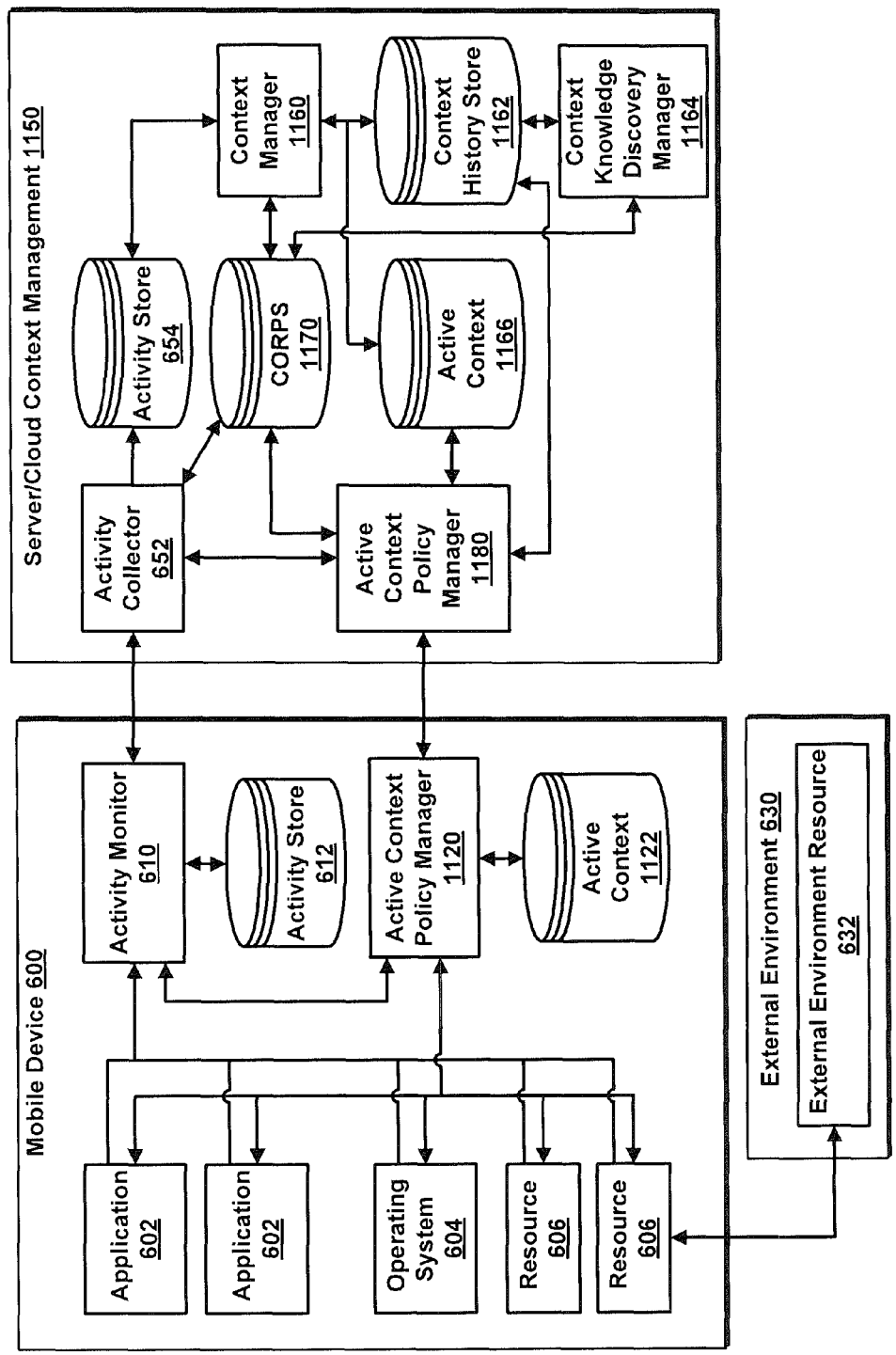
FIG. 11 shows a block diagram of a mobile device and a context management service running on a server or in the cloud.

According to a specific embodiment shown in FIG. 11, a mobile device 600 runs a plurality of applications 602, which are controlled by the operating system 604, which supports use of resources 606 by the applications 602.

An activity monitor 610 obtains information from applications 602, the operating system 604, resources 606, or combinations of these. The activity monitor 610 in its monitoring may obtain the information just once during a particular time period, or may subsequently again obtain the information during the particular time period, which may have changed. Subsequent acts of obtaining information may occur periodically, or may be driven by listening for changes in the information, or may be driven by requests or notifications from mobile device elements or the activity collector 652 or the active context policy manager 1120 or 1180.

The activity monitor 610 may store the information it obtains in a local activity store 612. The activity monitor may read the information stored in the local activity store 612 for communication with the activity collector 652, for communication with the active context policy manager 1120, or both.

An active context policy manager 1120 reads information from or stores information into a local data store called the active context 1122. The active context policy manager 1120 queries or modifies the settings or state of applications 602, the operating system 604, resources 606, or combinations of these. The active context policy manager 1120 communicates with the active context policy manager 1180 that is located in the server/cloud context management service 1150.

In one embodiment the active context policy manager 1120 may modify an application 602 by embedding an executable policy into the application.

In another embodiment, the active context policy manager 1120 may dynamically attach to an application 602, or to the operating system 604, or to a resource 606, in memory to implement policy enforcement.

In another embodiment, cooperating applications 602 may have been linked with libraries (that front end various calls or messaging in the application which receive or send context information or which access resources or the operating system) that communicate with the active context policy manager 1120 to obtain permissions for actions.

In an embodiment the active context policy manager 1120, via modification of or dynamic attachment to the applications 602, or the operating system 604, or the resources 606, or a combination thereof, mediates access from the applications 602 to context information available from the operating system 604 or the resources 606, providing its own version of the information or selectively denying access to such information. Its own version of the information could include cached copies of information previously retrieved, or information that has been standardized to hide details regarding the different models or types of resources providing the information.

In an embodiment the active context policy manager 1120 may take action on the mobile device elements (applications 602, operating system 604, resources 606). Actions can include starting an application, killing a running application, disabling a resource, modifying the current state or configuration settings of an application or the operating system or resource, or combinations of these. Actions can include the active context policy manager 1120 directly and automatically taking the actions, or prompting the mobile device user for permission to take the actions, or suggesting to the mobile device user that the user take specific actions.

The server/cloud context management service 1150 runs on a plurality of servers, and may be provisioned in the cloud. A server/cloud context management service 1150 may communicate with multiple mobile devices 600.

The activity collector 652 communicates with the activity monitor 610 which is running on the mobile device 600. The activity collector receives information that has been obtained by the activity monitor 610 and stores it in the activity store 654 that is part of the server/cloud context management service 1150.

The CORPS 1170 is the Context Ontology with Resource and Policy Semantics repository. The CORPS 1170 contains knowledge about resources, their characteristics, the kinds and ranges of measurements that they can be made, rules for how to transform resource raw data to low-level or high-level contextual information, templates for possible policies regarding data security, privacy, resource usage, or context adaptation for applications, operating system components, or resources.

The CORPS 1170 contains knowledge about what are referred to as context abstractions, specifically, context situations and context behaviors. In general the term context refers to any information that can be used to describe the internal state of an entity, where an entity is a person, place, or object or part thereof that is considered relevant to any interaction between a user and applications, and the external state of other entities or the environment, where environment refers to the computing environment of the device and its components and operating system and applications as well as to the external physical environment of the device and the user. This includes the user and the applications themselves.

Some context information is measurable directly by sensors; this is referred to as resource raw data, or low level data. Other context information requires preprocessing of low-level data; the resulting information is a form of high level data. Context abstractions are conceptual formulations of specific types and values of contextual information. FIG. 18 shows a subset of the CORPS ontology that can be used for making context-based resource usage predictions.

A set of high level data categories with particular values for the high level data may be called a context situation. This feature may be referred to as context-awareness. For example, a set of processed context information regarding device location over time may show that the device is moving at a speed of 2.5 miles per hour (mph). This set of high-level data (which was generated by processing low-level position data over time) corresponds to a context situation, one that could be conceptually labeled as LOW-SPEED-MOTION.

A different set of high-level data from an accelerometer sensor on the mobile device could after preprocessing be determined to represent the small shocks of feet hitting the ground at a regular pace of 1.5 times per second, which corresponds to a normal pace of foot-ground impacts when walking. This context situation could conceptually be labeled as TAKING-STEPS.

Note that neither of the two context situations above necessarily implies that the user is walking (moving on foot). In the former case, the user could be riding in a low speed conveyance and not walking. In the latter case, the user could be walking in place and not moving anywhere. If both context situations, LOW-SPEED-MOTION and TAKING-STEPS are occurring at the same instant in time, this likely represents a higher level conceptual context situation WALKING. The WALKING context situation has fused information from multiple sources and represents an inference, or the result of a reasoning process on other context situations. All three context situations can be considered as active at this point in time.

The manner in which conceptual context situations are related to each other is an ontology. An ontology is a lattice of nodes corresponding to concepts that have various properties or values, and in which nodes may have various relationships to other nodes; in this definition we use the mathematical meaning of the term lattice. The use of the ontology allows for the economical composition of context situations that have different levels of granularity, or represent successively more complex or abstract context situations. Context situations are modeled in the ontology according to their potential usefulness in other activities, such as defining policy rules for context adaptation, or for data security or privacy enforcement. The ontology can be expressed using a variety of formats, such as OWL (Web Ontology Language) or KIF (Knowledge Interchange Format).

A context situation is something that is happening at a particular point in time. Context information can change, which means that a given context situation may no longer be active or current because of the change in context information, but a new context situation may now be active or current. Multiple context situations can be active at any point in time, either because the context situations represent different levels of abstraction, or because they relate to different dimensions of context, or because they are compositions of multiple concurrent context situations.

For example, the context situations COMMUTE and COMMUTE-TO-WORK and COMMUTE-TO-WORK-FROM-HOME and COMMUTE-TO-WORK-FROM-HOME-VIA-BART (or TRAIN) may all be active at the same time, but they represent different levels of abstraction. The context situation USING-EMAIL-APP may be occurring at the same time as all of these other context situations. More specific combinations of co-ocurring context situations can be made explicit and labeled to the extent that they are useful for policy management.

For example, if it were useful, the context situation USING-EMAIL-APP-WHILE-COMMUTING-TO-WORK-FROM-HOME-VIA-BART could be made explicit. In general, the Context Manager decides how far to go in recording information about combination context situations based on how frequently they occur in the user and device history. A highly detailed combination context situation that only has ever occurred once is not likely to be useful in the future, and thus would not be explicitly represented.

On the other hand, a highly detailed combination that occurs very frequently could be useful in making resource predictions. A sequence of context situations is one form of what may be called a context behavior. The context behavior could involve major changes in context situation, such as the user leaving work, and then commuting home. This is a sequence context behavior.

Another form of a context behavior is one in which there are multiple context situations involved, but a higher level context situation may still be active throughout the entire context behavior. An example is a context behavior in which the context situation AT-WORKPLACE is active for eight hours, during which a variety of lower level context situations such as WALKING, MEETING, and TYPING occur. This is an aggregate context behavior.

Both context situations and context behaviors can have different levels of abstraction, or different granularities of time resolution, and can contain other sequences or context behaviors.

The context manager 1160 reads information from the activity store 654 and is responsible for processing the resource raw data, settings, configurations, identifying information and operational state into higher level context information. The context manager uses the information in the CORPS 1170 to perform its processing, and to populate information into the active context 1166 and the context history store 1162.

The context knowledge discovery manager 1164 reads information from the context history store 1162 and using a variety of using a variety of knowledge discovery in data techniques, including clustering, data mining, and machine learning techniques, discovers patterns of resource usage and creates resource predictions, context situation predictions, and context behavior predictions and writes them into the context history store 1162.

The active context policy manager 1180 reads the information in the active context 1166, optionally updated with selected unprocessed information from the activity collector 652. The active context policy manager 1180 uses the information in the CORPS 1170, especially the policy templates, constructs, selects, or modifies policies and writes them to the active context 1166. The active context policy manager 1180 on the server/cloud context management service 1150 communicates information from the active context 1166 to the active context policy manager 1120 that runs on the mobile device 600.

The activity collector 652 uses control information from the CORPS 1170 to inform the activity monitor 610 regarding what information to collect and what information to forward to the activity collector 652. Some information may be monitored by the activity monitor 610 that is not forwarded to the activity collector 652.

In one embodiment an application 602 that is aware of the context infrastructure may provide candidate application-related policies to the active context policy manager 1120. Doing so allows the application 602 to be actively managed according to policy, whether that is a policy provided by the application 602 itself, or new or modified policies being managed by the active context policy manager 1120. Modifications to policies can be made by mobile device users, or by suitably authorized administrators for the mobile device (such as enterprise administrators in a corporation or parents in a family), or by dynamic modifications to active policies generated locally by the active context policy manager 1120 or the remote active context policy manager 1180.

In another embodiment an application 602 that is aware of the context infrastructure may provide definitions of context situations or context behaviors that are of particular interest to the functioning of the application, and which are not already present within the CORPS 1170. Such applications can query current state represented in the active context 1122 or subscribe to notifications regarding the content in the active context 1122 by making requests of the active context policy manager 1120.

In one embodiment the mobile device 600 is temporarily not in communication with the server/cloud context management service 1150. In this embodiment the active context policy manager 1120 is updating the active context 1122 directly using information from the activity monitor 610. In a related embodiment, there is additionally a copy of the context manager 1160 running also on the mobile device 600, which uses a subset of the CORPS 1170, also residing on the mobile device 600. The subset is just that information related to CORPS 1170 information that is known to be relevant to this particular mobile device, this user, and frequent or predicted context situations and context behaviors for this device and this user, together with associated policy templates. In this embodiment the mobile device 600 continues to be capable of active management of policies regarding context adaptation and context information privacy and security.

Figure 12:
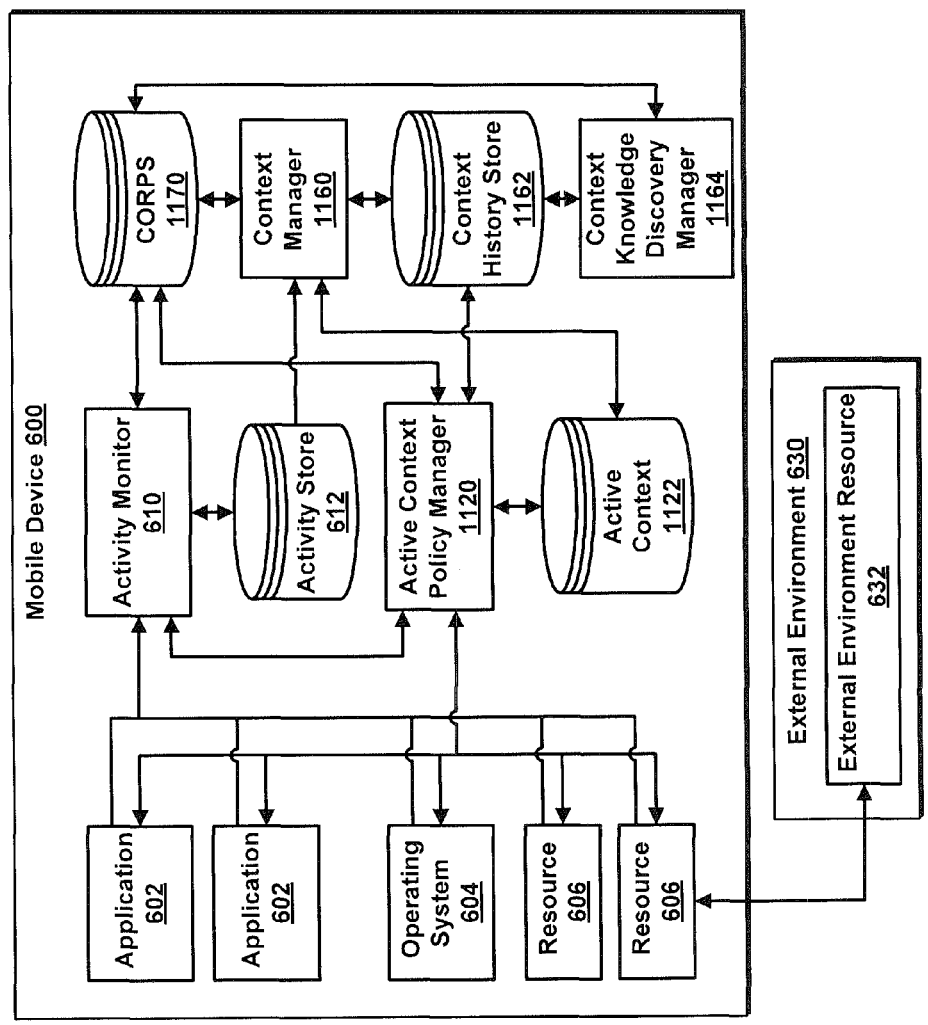
FIG. 12 shows a block diagram of a mobile device with a context management service running on the mobile device.

Referring now to FIG. 12, we see a mobile device 600 that is running all the elements of a context management service on the device itself. Specifically, there is a CORPS 1170, a context manager 1160, a context history store 1162, a context knowledge discovery manager 1164. In this configuration the context management service is capable of running indefinitely on the mobile device without requiring communication with an external server or cloud-based context management service.

Figures 13, 14:
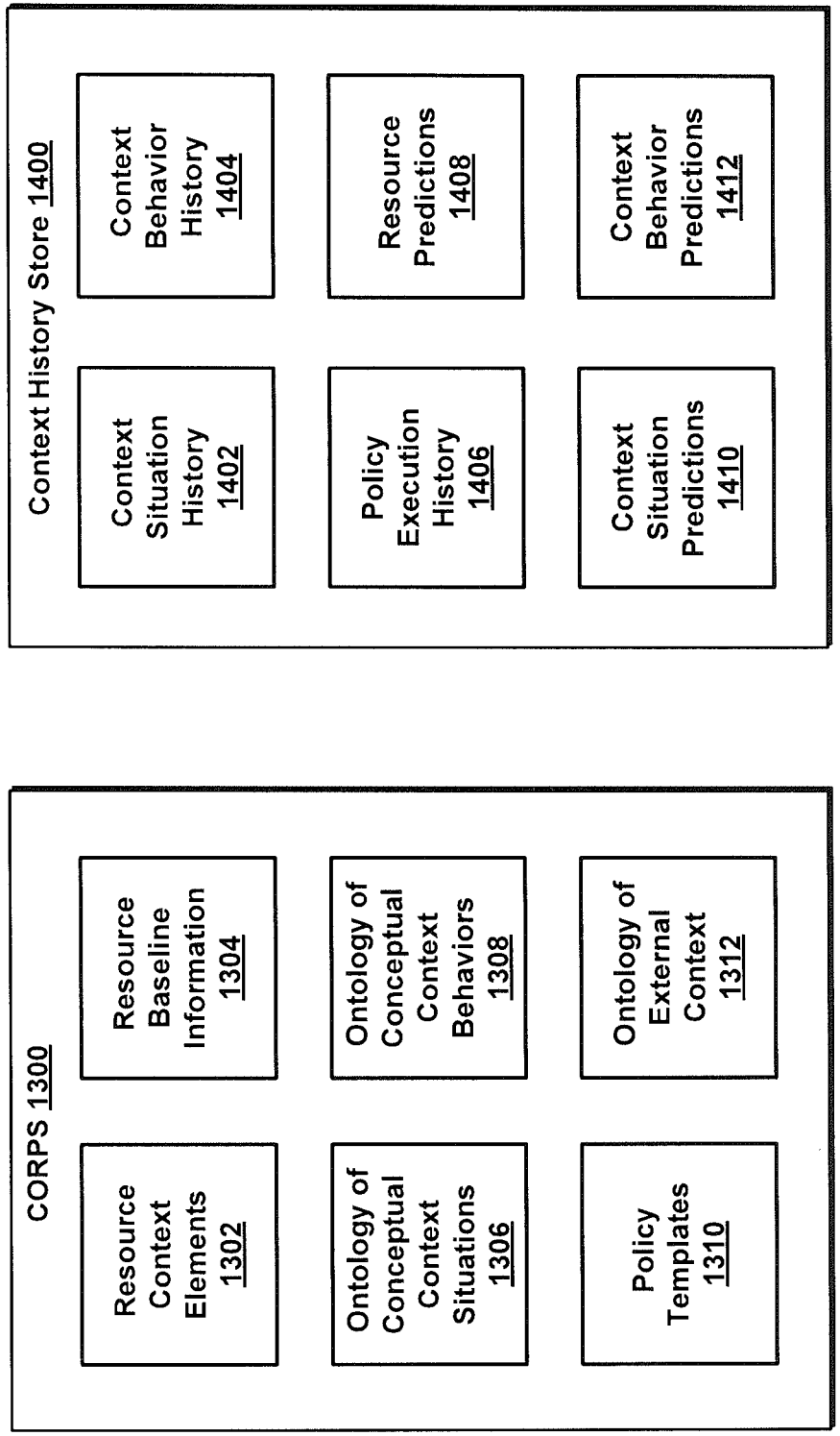
FIG. 13 shows a block diagram of the Context Ontology with Resource and Policy Semantics repository (CORPS).
FIG. 14 shows a block diagram of the Context History Store.

Referring now to FIG. 13, the elements of the CORPS 1300 are detailed. The CORPS 1170 is the Context Ontology with Resource and Policy Semantics repository. The CORPS 1300 contains knowledge about resources, their characteristics, the kinds and ranges of measurements that they can make, rules for how to transform resource raw data to low-level or high-level contextual information, templates for possible policies regarding data security, privacy, resource usage, or context adaptation for applications, operating system components, or resources.

Specifically, the resource context elements 1302 contain information about how to transform or process resource raw data 802 from low level data into high level context data. The resource context elements can contain references to specific methods contained within the context manager 1160 for performing the processing, or to external methods or services for doing same, or can be self-contained mapping rules from low level data onto high level context information. E.g., for a battery level, the low level resource raw data 802 might be for current battery charging rate expressed in terms of mAh/min; the mapping to a high level data could be a set of ranges, specific to the model or type of battery, that map ranges of these values onto ranges designated LOW-CHARGING-RATE, AVG-CHARGING-RATE, or HIGH-CHARGING-RATE.

The resource baseline information 1304 includes characteristics about the resource that may have been externally measured elsewhere, but inform the context management process by providing quantitative structural and behavioral characteristics of resources and by establishing relationships between events on the device and resultant resource usage.

An example includes information about the measured discharge curve of voltage over time for a battery. Another includes information for how much battery charge is consumed for a unit level of operation of the resource, such as the amount of battery charge consumed for one CPU second, or the amount of battery charge consumed for a voice phone call of one minute duration. Another example includes the amount of network bandwidth typically used for email push notifications or for a minute of listening to an internet-based music service. Another example includes the amount of battery charge consumed for one second of CPU processor activity. Another example includes the amount of battery charge consumed in killing a specific application, or in starting a specific application, or in running a specific application for a defined period of time.

The purpose of the resource baseline information 1304 is to make a connection between system-level events or application-level events and underlying resource usage. This information can be measured externally to this system in a laboratory setting and imported into the CORPS 1300, or could be inferred using machine learning and statistical techniques, e.g., principal component analysis, by the context knowledge discovery manager 1164 and stored into the CORPS 1300.

Any event that can happen on the mobile device 600 or in anything running on the mobile device, including applications 602, the operating system 604, resources 606, and the various elements of the system being described here, can be used to establish resource baseline information 1304. In general the resource baseline information 1304 can be used to model explicit known or measured or analytically inferred functional dependencies or effects on other quantities, such as power usage.

The resource baseline information 1304 allows the context manager to reason about some resource measurements (in the example above, a certain amount of CPU time expended, or a voice phone call of a given duration) to estimate other values, such as the amount of battery charge consumed. This capability is useful either when direct measurements of particular resources are not available or when it can be more cost effective to use indirect measurements for some resource types. Additionally, the resource baseline information 1304 can be employed by the context knowledge discovery manager 1164 and by the active context policy manager 1120 or 1180. The potential costs and benefits of particular policies can be estimated in advance by the active context policy manager 1120 or 1180 by using this resource baseline information 1304.

The ontology of conceptual context situations 1306 is a lattice of nodes representing context situations, with each context situation node containing various properties for high level resource context elements. When higher level context situations are composed of lower level context situations, then properties may include values from constituent context situation's properties, or processed combinations of such values. A higher level context situation encompasses a time interval for its context situation that substantially overlaps the time intervals for its constituent context situations. If there is no overlap, but rather a sequence, then a combination of such situations is termed a type of context behavior rather than a higher level context situation.

In one embodiment, conceptual context situations 1306 are manually authored into the CORPS 1300 as a form of expert knowledge.

In another embodiment, conceptual context situations 1306 are automatically entered into the CORPS 1300 using a hierarchical clustering method that creates a dendrogram over combinations of resource context elements 1302. Each level of cluster is a context situation. In another embodiment a plurality of different hierarchical clustering methods can be employed yielding not a single hierarchical dendrogram, but rather a lattice.

In another embodiment, conceptual context situations 1306 are created by looking at the complete set of all possible combinations of resource context elements 1302. This is potentially a very large number of situations. The context manager 1160 may construct such conceptual context situations and promote them into the CORPS 1300 based on the history of context situations within the context history store 1162 that occur frequently or represent discovered association rules with high support and confidence.

In another embodiment, either of the two previous methods can be used looking not just at combinations of resource context elements 1302 but also other lower level conceptual context situations 1306.

The ontology of conceptual context behaviors 1308 can be constructed in similar manner to how conceptual context situations 1306 are created, either by manual authoring or by automated procedures within the context manager 1160 or the context knowledge discovery manager 1164. A context behavior is an ordered sequence or an unordered collection of context situations or other context behaviors which substantially overlap with the time duration of the context behavior. Typically the constituent context situations or other behaviors both begin and end during the time interval of the containing context behavior. But a constituent context situation or other context behavior may begin prior to the beginning of the context behavior as long as it ends after the containing context behavior begins. Likewise, a constituent context situation or other context behavior may begin prior to the end of the containing context behavior but may end after the end of the containing context behavior.

An example of a higher level context situation is MORNING-AT-WORK. The AT-WORKPLACE-LOCATION context situation may involve only location-related resource context elements that indicate that the user and device are physically at the user's workplace location. The MORNING context situation may involve only time-related resource context elements that indicate that the time is in the range from 8 a.m. until 10 a.m. The MORNING-AT-WORK situation can be defined as the combination of the AT-WORKPLACE-LOCATION and MORNING context situations.

Figure 16:
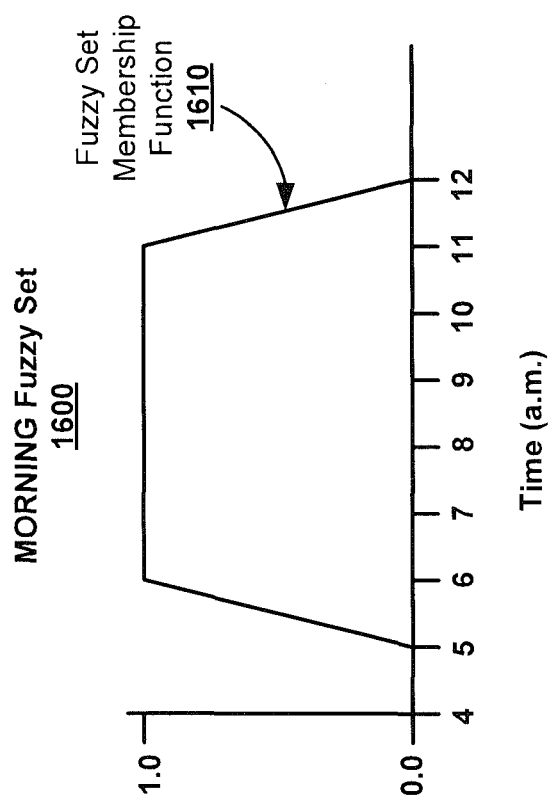
FIG. 16 shows an example diagram of a fuzzy set membership function.

In one embodiment the rules for processing a resource context element 1302 or for property values for a context situation can be defined as a type I fuzzy set. In the example above for clock time, the fuzzy set definition for the time property for the MORNING situation could be a trapezoidal fuzzy definition MORNING fuzzy set 1600 as shown in FIG. 16. In another embodiment the rule could use a type II fuzzy set.

In another embodiment there can be multiple mobile devices 600, either for the same user in communication with the server/cloud context management service 1150. In this case there can be context situations and context behaviors defined using information from a plurality of the mobile devices 600 for the same user. These devices could include smart phones, tablets, or PCs, among others. There may be context information available from one such device that could aid in the contextual management of another such device.

In another embodiment there can be context situations or context behaviors defined using information from a collection of a plurality of mobile devices from a plurality of users. These devices may share a common piece of hardware, or a common current location, or have the same application installed. This can especially be valuable for use in the context history store 1162 in conjunction with the operations of the context knowledge discovery manager 1164.

A policy template 1310 in the CORPS 1300 is policy constructed with respect to context situations or context behaviors in the CORPS 1300. A policy can be enabled by a link to a particular context situation or context behavior. When such a context situation or context behavior is active, the link indicates that the linked policy is to be used for context management on the mobile device. A policy template 1310 can be expressed in a number of ways.

In one embodiment a policy template is a set of IF-THEN-ELSE rules which test properties or relationships of the current context situation and take actions which can involve modifying the settings or configurations or current state of applications or the operating system or resources on the mobile device 600, or modifying the settings or configurations or current state of other elements of the environment that are external to the mobile device 600.

Other actions can involve sending notifications to the current user on the same or a different device, or executing a named procedure from the policy manager to solicit user input or approval for a tentative decision to take a particular action. Such notifications could be an informational message to the user that the active context policy manger has taken an action, or could be a request for the user's permission to take an action, or could be a recommendation to the user that the user take a particular action.

In another embodiment a policy could be a piece of source code or executable code to be run on the device in the context of the device's active context policy manager. In another embodiment a policy could be a set of desired states or configuration settings. In another embodiment a policy could be a set of rules to be enforced on the device by the active context policy manager; for example, the rules could involve which applications are allowed to execute, permissible settings for applications, permissible sensors to be read, or files or databases to be read from or written to, permissible network technologies or network destinations, or types of content allowed to be read from or transmitted away from the device. Policy templates can have a purpose related to resource usage on the device, or related to security or privacy considerations. A policy template 1310 is called a template because it may contain slots that can be filled by values from designated properties from the associated context situation or context behavior.

The ontology of external context 1312 is an ontology of concepts that support reasoning about context elements, context situations, and context behaviors. Properties for nodes are things that are useful in reasoning about context, making distinctions, or in seeking out additional information to enhance existing context information. Relationships for nodes may include "is-a" relationships (hypernymy, hyponomy), "part-of" relationships (meronymy), or other special purpose relationships. Thus the ontology of external context 1312 is an ontology of the world (the parts of the world that are useful to be modeled for context interpretation and enhancement) and of services for context enrichment.

For example, one piece of context information could be the global positioning system (GPS) coordinates of the mobile device's current location expressed as latitude and longitude: 41.767575,−88.070217. The ontology of external context 1312 has a concept node for GPS-COORDINATE. One of the properties for this node is the information about an external service that provides enhanced context information when given a GPS coordinate. An example of enhanced information returned is an address corresponding to the GPS coordinates, and the name of the business or building at that location. In this example, the service returns the information "Cinemark At Seven Bridges IMAX, 6500 Illinois 53, Woodridge, Ill.; (630) 663-8892; cinemark.com" for the given GPS coordinates. The information returned by a context-enhancement service could be in natural language text, or could be in structured data, e.g., {businessName: "Cinemark At Seven Bridges IMAX", address: "6500 Illinois 53, Woodridge, Ill.", phone: "(630) 663-8892", website: "cinemark.com"}.

Another context-enhancement service registered as a value of the BUSINESS-CATEGORY-SERVICE property of the concept node labeled BUSINESS could be called with the information returned from the previous context-enhancement service call to obtain the business category "MOVIE-THEATER". There is a corresponding concept node in the ontology MOVIE-THEATER, inheriting properties from its parent concept node PERFORMANCE-VENUE, which has several properties. One property is a link to a policy template that was written to handle the actions that a user would normally take in a performance venue, namely, to turn the phone ringer from normal ring to vibrate, and to turn off Wi-Fi and GPS services to conserve battery.

The knowledge in the ontology of external context 1312 permits the system to understand more about the user and device's current context, and to obtain additional information to enhance that understanding. This enables policy actions such as automatically adjusting phone ringer settings and turning off certain network services to conserve battery upon the user entering a movie theater, and to restore those settings upon exiting the theater.

In another embodiment the ontology of external context 1312 may contain information about certain external context services which are themselves only available and relevant in certain situations. For example, a user and the user's mobile device are in the AT-HOME situation. The user has a television which is equipped with an external context service that communicates via Wi-Fi or Bluetooth or other networking technology and provides programming information about which television channel is currently being displayed on the television. This external content service can be used to obtain that information and to enrich the context with the expected duration of the program being viewed, or to enable applications that are aware of the context management infrastructure to supply so-called second screen added functionality (the term second-screen refers to a simultaneous although not necessarily coordinated use of a mobile or other computing device while the user is attending to a broadcast or playback or on-demand display of an event on a television).

Additional context enrichment information about what content was being presented on those channels (show episode descriptions, episode identifiers, CCTV text transcripts of voice audio on the shows, actual audio and/or images shown), and information about which related content was shown (promos, advertisements, etc.) can be used by second screen applications to adapt to context, e.g., by serving other content or advertising related to the content, or by connecting to social media channels related to the content.

Turning now to FIG. 14, the details of the context history store 1400 are shown. The context situation history 1402 is a history of substantially every occurrence of each context situation that has occurred on the mobile device 600. Each occurrence is timestamped with the beginning and end of the context situation. The properties of each context situation instance are filled with the values that existed at the time of the occurrence. In one embodiment the older occurrences of context situations may be purged either periodically, or upon request, or substantially similar context situations may be summarized or counted, or based on space available for the storage of the context situation history.

In some cases a property value in the context situation history 1402 is itself multi-valued, a time series of the different values of the property's value during the life of the situation.

One purpose of tracking context situation history 1402 is to be able to identify frequently occurring context situations that represent an opportunity for manually or programmatically authoring new or modified policy templates to deal with the context situation.

Another purpose in tracking context situation history 1402 is to allow various data mining activities of the context knowledge discovery manager 1164 to find clusters or patterns for creating new higher level context situation or context behavior definitions into the CORPS 1170 or to discover association rules with high confidence and support that can be used for predicting resource usage during context situations (context situation predictions 1410 or contributions to resource predictions 1408), or for predicting ordered sequences of context situations or unordered collections of co-occurring situations that can constitute a new context behavior definition to be promoted into the CORPS 1170.

Context behavior history 1404 is similar to context situation history 1402 except that it deals with the processing of historical occurrences of context behaviors.

Policy execution history 1406 is tracked not just for audit and reporting purposes, but also includes tracking of the results and effectiveness of policy execution, especially in terms of resources conserved by active context management. This information is also an input to the context knowledge discovery manager 1164 and to the active context policy manager 1180 or 1120 to assist in the evaluation of existing policies and the generation of new policies.

Resource predictions 1408 are constructed and written to the context history store 1162 by the context knowledge discovery manager 1164, and are based on aggregate statistics across context situation histories for a user's mobile device. A resource prediction 1408 is a prediction of what is likely to happen with respect to a resource over time. This can include expected rates of resource usage, usual network locations contacted, usual applications executed, and frequency of certain activities performed on the mobile device 600 by applications 602 or the operating system 604 or resources 606. These can be important in context management when novel situations are encountered.

Context situation predictions 1410 are predictions of what happens within the duration of a context situation. This can include expected rates of resource usage, usual network locations contacted, and usual applications executed, among other things.

Context behavior predictions 1412 are predictions regarding sequences of constituent context situation transitions, or frequencies of co-occurrence of unordered collections of constituent context situations. Context behavior predictions in high level context behaviors are useful for characterizing such things as the typical workday lifecycle. An important part of prediction is a glide path for resource utilization with respect to a large time granularity context behavior. Context behavior history provides predictions of resource usage when the user is in a particular context behavior; if a user is currently using more resource than typical for a given context behavior (below the glide path) it can be a trigger point for a policy to enforce stricter resource conservation efforts, either automatically, or with the informed consent of the user.

Figure 15:
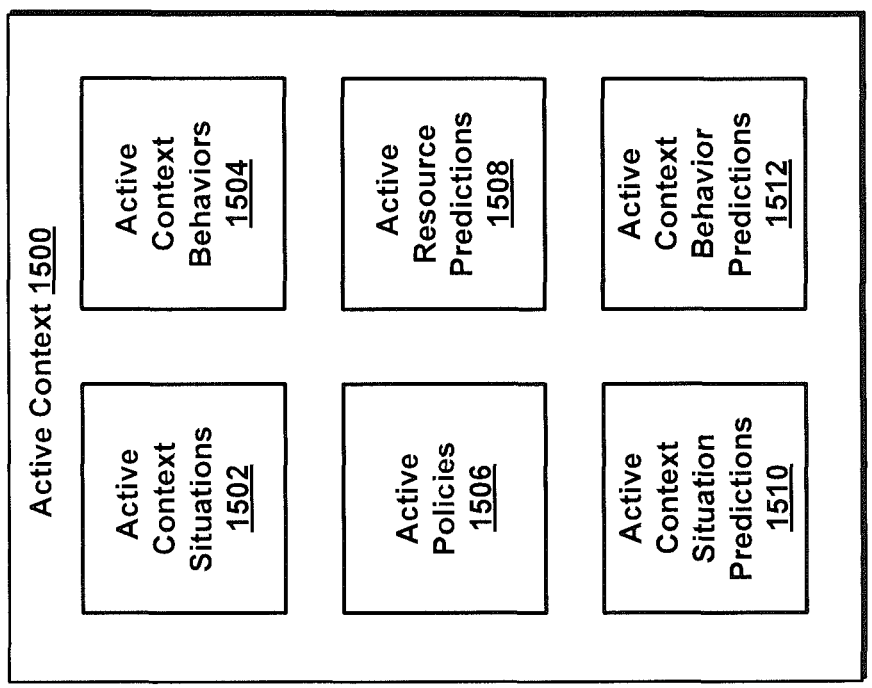
FIG. 15 shows a block diagram of the Active Context component.

Referring now to FIG. 15, the details of the active context 1500 are illustrated. The active context 1500 refers to either the active context 1166 which resides in the server/cloud context management service 1150 or the active context 1122 which resides in the mobile device 100. The context manager 1160 is responsible for placing context situations, context behaviors, policies, resource predictions, context situation predictions, and context behavior predictions into the active context 1122, based on the information in the activity store 154 and the CORPS 1170.

Active context situations 1502 are the specific instantiations of conceptual context situations, corresponding to context situations that are currently occurring. An active context situation 1502 is a conceptual context situation structure, with values for properties that correspond to the current state of the context elements derived from resources, applications, or the operating system on a particular mobile device, or of the context elements associated with the external environment of the device, and of any other constituent active context situations 1502.

An active context situation 1502 is marked as active when it is placed into the active context 1500; and when such a context situation ends, it is marked as inactive and may be removed from the active context 1500. In an embodiment, an active context situation 1502 marked as inactive is allowed to remain in the active context 1500 for a configurable amount of time before being removed, or to facilitate processing related to active context behaviors 1504.

Active context situations 1502 which are higher level context situations comprising multiple other context situations are linked together in the active context 1500.

Multiple context situations related to a user or a mobile device 600 can be active at a single point in time.

Active context behaviors 1504 are the specific instantiations of conceptual context behaviors, corresponding to context behaviors that are currently occurring. An active context behavior 1504 is a conceptual context behavior structure, with values for properties that correspond to the current state of the context elements derived from resources, applications, or the operating system on a particular mobile device, and of the context elements derived from the external environment of the device, and of any other constituent active context situations 1502 or active context behaviors 1504.

An active context behavior 1504 is marked as active when it is placed into the active context 1500; and when such a context behavior ends, it is marked as inactive and may be removed from the active context 1500. In an embodiment, an active context behavior 1504 marked as inactive is allowed to remain in the active context 1500 for a configurable amount of time before being removed, or to facilitate processing related to other parent active context behaviors 1504, and because the very definition of a context behavior may be such that it is only the passing of time without the occurrence of potentially constituent situations that defines the end of the context behavior.

Active context behaviors 1504 which are higher level context behaviors comprising multiple other context behaviors are linked together in the active context 1000.

Active policies 1506 are policies that are currently enabled for running on the mobile device 600, controlled by the device's active context policy manager 1120. An active policy is linked to one or more active context situations 1502 or active context behaviors 1504. The active context policy manager 1180 running on the server/cloud context management service 1150 communicates active policies 1506 from the active context 1166 to the active context policy manager 1120 running on the mobile device 600, where they are in turn stored in the device-side active context 1122.

Active resource predictions 1508 are resource predictions 1408 taken from the context history store 1400 when the mobile device 600 being managed has the applicable resources on it. These resource predictions are aggregate ones that can be used when novel situations or behaviors are encountered that do not have associated situation predictions or behavior predictions.

Active context situation predictions 1510 are placed into the active context 1166 by the context manager 1160 when a corresponding active context situation has been placed into the active context 1166.

Active context behavior predictions 1512 are placed into the active context 1166 by the context manager 1160 when a corresponding active context behavior has been placed into the active context 1166.

Referring now to FIG. 16, an illustration is made of the MORNING Fuzzy Set 1600, which is an example of how a resource context element 1302 can be processed from raw, low level data into a higher level representation. The fuzzy set membership function 1610 represents how a resource context element for time of day corresponds to the higher level context representation MORNING. This is standard type I fuzzy set technology. In an embodiment type II fuzzy sets can also be used.

Figure 17:
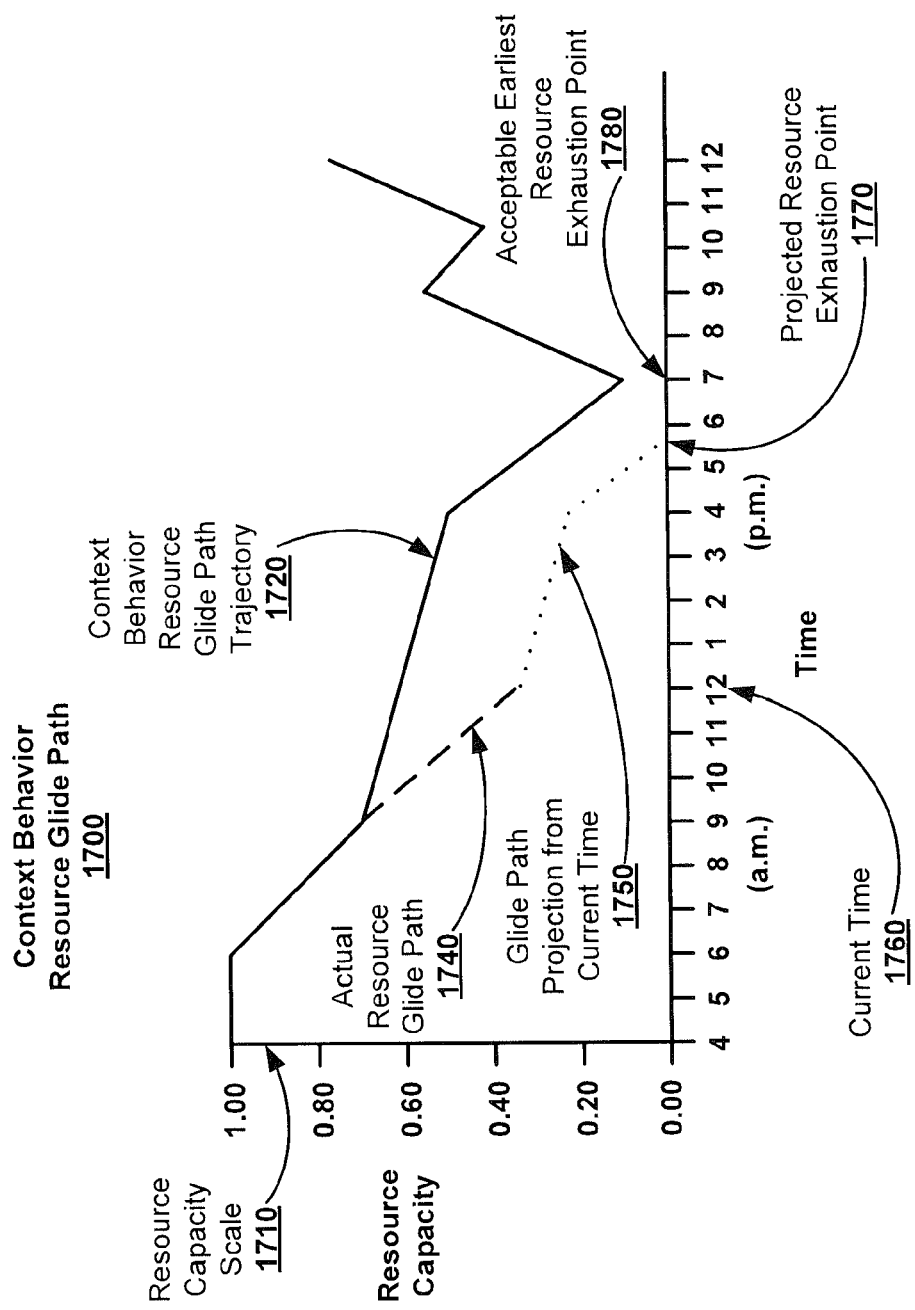
FIG. 17 shows a diagram of a Context Behavior Resource Glide Path.

Turning now to FIG. 17, an example context behavior resource glide path 1700 is detailed. The context behavior resource glide path is a property of a context behavior prediction. There can be multiple context behavior predictions that are active at any point in time; these may have an associated estimated probability or likelihood.

One such context behavior prediction could be designated as the best case prediction, where best case means in terms of minimal resource usage. Another such context behavior prediction could be designated the worst case prediction, where worst case means in terms of the largest expected resource usage. Another such context behavior prediction could be designated as the most likely case prediction, where most likely case is based on the statistical analysis of historical context behaviors. There can be different context behavior glide path properties for different resources 606 that exist on the mobile device 600.

For example, the context behavior resource glide path trajectory 1720 could be for a battery resource. In that case, the resource capacity scale 1710 would represent the battery capacity, with 1.00 indicating a fully charged battery, and 0.00 indicating a fully discharged battery. A context behavior resource glide path trajectory 1720 that is a property of a context behavior history 1404 is a context behavior history glide path; it represents what has happened in the past. A context behavior resource glide path trajectory 1720 that is a property of a context behavior prediction 1412 is a context behavior prediction glide path; it represents a prediction of what is likely to happen in the future.

The context behavior resource glide path trajectory 1720 represents a prediction that had been initially created by the context knowledge discovery manager 1164 and placed into the context history store 1162. The context manager 1160 placed the context behavior prediction into the active context 1166 when the corresponding context behavior was placed there. An active prediction can be modified while active according to changes in current context.

For example, additional information is available having been gathered by the activity monitor 610 on the mobile device 600. The actual resource glide path 1740 represents the actual resource usage that was measured on the mobile device 610. In this example, more of the resource had been used than had been predicted; the glide path is below the context behavior prediction glide path trajectory 1720. The context manager 1160 has updated the resource glide path 1700 accordingly with a glide path projection from current time 1750; current time 1760 is noon. This projection shows a projected resource exhaustion point 1770 occurring at about 5:30 p.m. An active policy 1506 associated with this active behavior 1504 may take action because there is now a projected resource exhaustion point 1770 that occurs sooner than the acceptable earliest resource exhaustion point 1780, which corresponds to the user's anticipated arrival at the user's residence where the user can charge the device battery.

In an embodiment the context manager 1160 can observe additional context information related to planned future events (such as calendar appointments) and use that information to modify a behavior prediction and its associated behavior resource glide path. For example, a future calendar appointment may indicate that the user's time away from the HOME context situation (where there known to be a battery charger available) may be extended, and to adjust the context behavior resource glide path accordingly. In this embodiment, a special type of active context situation 1502 can be entered into the active context 1166, representing a planned future context situation. This could lead to the creation of a new context behavior that encompasses the existing WORKDAY context behavior, and contains the modified context behavior resource glide path.

In another embodiment the context manager 1160 can take into account user or administrator provided context information related to potential future events (such as phone calls) and use that information to modify a context behavior prediction and its associated context behavior resource glide path.

For example, a parent who is an administrator for a child's mobile device may specify that all context behavior planning needs to plan for having enough resources to make an emergency phone call, even though that occurrence may not occur frequently or ever in context behavior history. The emergency reserve for a specific number of specific types of resource consuming actions adjusts the context behavior resource glide path property of the context behavior, effectively raising the floor to which the policy manager will ever allow the resource capacity to fall before taking a mitigation action. There is an advantage in terms of either specifying types of reserves or in a user's understanding of reserve provisions in a policy to being able to express them with respect to higher level user actions (such as "make a phone call") versus lower level resource specific criteria (such as "maintain at least 8 percent battery charge").

An example of a policy's mitigation actions is when the active context policy manager, understanding that there is barely enough battery capacity left to make an emergency phone call, shuts off all other services on the phone (including music player applications, SMS texting, Wi-Fi network connections, and game applications), and notifies the child user what has happened and why.

In another embodiment context behavior resource glide paths (historical or predicted) can be represented by type I or type II fuzzy sets. A traditional defuzzification process can be used to convert these to a normal context behavior resource glide path; but the richer amount of information represented using fuzzy sets allows for policies to use more sophisticated mechanisms for resource shortage mitigation.

Policy templates stored in the CORPS can be viewed and edited by suitably authorized users or other designated policy administrators, by on-device user interfaces controlled by the active context policy manager 1120 or via web user interfaces controlled by the active context policy manager 1180. An advantage of this system is that it enables the composition and simultaneous enforcement of policies from administrators and users in a manner consistent with the aims of both and enables a consistent approach to resource and policy management across all apps whether they are aware of the context management infrastructure or not. It also allows for the contextual enforcement of security and privacy policies regarding the access to or use of context information.

In another embodiment the active context policy manager 1180 can take advantage of the fact that the server/cloud context management service 1150 manages context and policies for very many devices used by many users. In this embodiment the active context policy manager 1180 can use evolutionary computation/genetic algorithm techniques to explore the space of possible policy variants in search of optimal effectiveness.

When a context situation or context behavior is observed in the context history store 1162 to be common across many devices and users by the active context policy manager 1180, the policy manager can choose to generate several possible policy templates 1310 for the same situation, using the usual genetic algorithm techniques of mutation and crossover operators. The active context policy manager 1180 can select different variations of a policy for deployment into the active context 1166 for different devices or users.

Subsequent analysis of the effectiveness of each policy using the policy execution history 1406 in the context history store 1400 with respect to resource conservation or other metrics provides the evaluation function/fitness function that genetic algorithms use to further evolve variations on solutions. Successful policies can then be evolved in another generation. In this embodiment the policies for all users become more effective over time because of the ongoing optimization process involved in generating policy variants. Examples of policy variations can include adjusting resource settings earlier or later, or using resource settings that are more or less conservative, or using user notifications instead of taking direct actions by the policy manager.

Some examples of the many items of activity information, which are related to resources, applications, or the operating system on a mobile device, that an activity monitor can collect are listed below:

Current state of device or components or applications or other connected devices:
- Current system reported battery level (0 percent to 100 percent) for each battery currently connected
- Current settings of battery (including battery saver or performance modes) for each battery currently connected
- Current state of battery charging (e.g., currently being charged by a battery charger or other external power source, or not currently being charged) for each battery currently connected
- Current power availability state of any external power source connected to device but not being used for battery charging, such as external battery, fuel cell, solar cell, or other power source, measured in mAh (milli Amp hours) or in Wh (Watt hours)
- Current other internal state of any external power source connected to device, such as external battery level, fuel cell current butane level, solar cell measured ambient light level, current power level being generated by mechanical means (e.g., power harvesting technology from walking or bicycling or other user motion using piezoelectric or other devices), or other power sources,
- System reported battery level (0 percent to 100 percent) at the time of power-related events for each battery currently connected; power-related events include among other things the beginning of a battery charging event, the end of a battery charging event, a device power on event, a device power off event, a detection of a switch in battery identifier,
- System reported battery level (0 percent to 100 percent) at the time of power-related events for each battery currently connected
- Time elapsed since various power-related events for each battery currently connected
- Measured battery charging during last charging event (e.g., measured in mAh (milli Amp hours) or in Wh (Watt hours) or by Coulomb counting or other methods) for each battery currently connected
- Measured battery usage since last charging event or device power on event (e.g., measured in mAh (milli Amp hours) or in Wh (Watt hours) or by Coulomb counting or other methods) for each battery currently connected
- Identification of battery or battery type or model for each battery currently or previously connected
- Elapsed time since manufacture of battery (age of battery) for each battery currently or previously connected
- Elapsed total time battery has been on while not charging, for each battery currently or previously connected, since the manufacture of battery or since the last charging event or since the last device power on event
- Elapsed total time battery has been on while charging, for each battery currently or previously connected, since the manufacture of battery or since the last charging event or since the last device power on event
- Number of charging events for battery, for each battery currently or previously connected
- Current operational status of battery charging capability, i.e., able to charge using external power source, or unable to charge (e.g., due to charging system failure) for each battery currently or previously connected
- Current internal device temperature, humidity, or moisture levels; this includes sensor values for the device itself and for device components such as processors
- Current external or ambient temperature or humidity; this includes external or ambient values from sensors on the device, as well as inferred external temperatures using device location and temperature or humidity values for weather stations nearby the device location
- Average, minimum, and maximum internal device-related temperatures since the occurrence of various power-related events
- Average, minimum, and maximum external or ambient temperatures since the occurrence of various power-related events
- Current power draw by device (e.g., measured in mAh (milli Amp hours) or in Wh (Watt hours) or by Coulomb counting or other methods)
- Identification of each CPU or associated or auxiliary processor (such as GPUs or cryptographic processors), or processor type or model for each processor that is part of or attached to the device
- Elapsed CPU time since last power on event or last charging event, for each CPU in device (including any associated processors such as GPUs or cryptographic processors)
- Normal rated frequency of operation for each processor that is part of or attached to the device (including any associated processors such as GPUs or cryptographic processors)
- Current operating frequency of operation for each processor that is part of or attached to the device (including any associated processors such as GPUs or cryptographic processors)
- Currently activated CPU power preserving modes for each processor that is part of or attached to the device (such as Intel SpeedStep or AMD PowerNow!)
- Potentially available CPU power preserving modes for each processor that is part of or attached to the device (such as Intel SpeedStep or AMD PowerNow!)
- Identification of communication devices or components, or type of communications device or component (such as radios, Wi-Fi, GPS, Bluetooth, NFC, GSM, CDMA, 3G, LTE, 2G, and others, or for optical communications such as infrared or visible light communications, or for audio communication such as powering internal or external speakers or microphones, or for quantum communications), or model for each communication device or component that is part of or connected to the device, Current external communication state (such as on or off or in any of several operating modes such as standby, power-preserving mode) and settings, such as signal strength, elapsed time communication has been used, measured power consumption for communication, for each communication type and technology, such as for radiofrequency communications such as Wi-Fi, GPS, Bluetooth, NFC, GSM, CDMA, 3G, LTE, 2G, and others, or for optical communications such as infrared or visible light communications, or for audio communication such as powering internal or external speakers or microphones, or for quantum communications, and which communications protocols have been in use, and measurements of the amount of communication such as bytes sent, bytes received, number of communications initiated or responded to.

Identification of display(s) or display type (e.g., LCD or OLED or electronic ink, or projection display, among others) or model for each display that is part of or connected to the device, Current display settings (including brightness level, autobrightness setting, positive vs. negative mode, contrast level) for each display that is part of or connected to the device, Elapsed time that each display has been on, since last charging event end or most recent device power on event, for each display that is part of or connected to the device Measured energy usage since last charging event end or most recent device power on event, for each display that is part of or connected to the device Identification of audio output or input devices or type or model for each audio output or input device that is part of or connected to the device Current audio output or input settings (including volume level, microphone sensitivity) for each audio output or input device that is part of or connected to the device Elapsed time that each audio output or input device has been on since last charging event or device power on event or other time or event, for each audio output or input device that is part of or connected to the device Measured energy usage since last charging event end or most recent device power on event, for each audio output or input device that is part of or connected to the device Identification of sensors (such as accelerometers, compasses, temperature sensors, barometric pressure sensors, altitude sensors, humidity sensors, moisture sensors, touch or pressure sensors, orientation sensors, cameras, scanning devices, proximity sensors, gyroscopes, ambient light sensors, chemical or odor sensors, biometric input sensors, or medically related sensors such as heartbeat, respiration, blood pressure, blood oxygen levels using for example pulse oximetry, EEG sensors including low level frequency and amplitude measurements or derived information regarding the presence or strength of wave patterns such as Delta, Theta, Alpha, Beta, Gamma, or Mu, or tDCS or TMS sensors or ECG sensors) or sensors related to a device user's gaze direction or sensor types or models for each sensor that is part of or connected to the device Current sensor state (on, off, performance mode) and settings for each sensor that is part of or connected to the device Elapsed time that each sensor has been on since last charging event or device power on event, for each sensor that is part of or connected to the device Measured energy usage since last charging event end or most recent device power on event, for each sensor that is part of or connected to the device Identification of which apps or services or operating system components are installed on the device or on removable media connected to the device or may be running on the device, including app name, version, app vendor name, digital signature with which the app may be signed Current app or service or operating system components state (running, quiescent, not running) and settings, for each such item that is installed on the device or on removable media connected to the device or may be running on the device Elapsed time that each app or service or operating system component has been running since last charging event or device power on event, for each such item that is installed on the device or on removable media connected to the device or may be running on the device Elapsed CPU time or network usage time for each app or service or operating system component since last charging event or device power on event, for each such item that is installed on the device or on removable media connected to the device or may be running on the device Measured energy usage for each app or service or operating system component since last charging event or device power on event, for each such item that is installed on the device or on removable media connected to the device or may be running on the device Current location of device (to be correlated with usage history for presence or availability of charging devices)

Identification of the data or other communication limits for the device such as monthly data usage limits.

Measurement of the data or other communication quantities since the beginning of the accounting period for measuring such quantities, or since the last charging event, or since the last power on event, or other power-related events, including such items as the number of communications initiated or responded to, the number of bytes sent or received, elapsed time for communications, measured CPU usage or power usage for the communications, the communications technology or component or device used, the protocols used.

Demographic information about the users of the device, including but not limited to age, gender, occupation, hobbies, years of education, and so on, and which user is the currently active user of the device.

The current and recent history of whether airplane mode has been turned on or off, or regarding the settings and switching of other profiles.

The current device autolock time interval or time interval for turning device display off; elapsed times spent in locked and unlocked states, the number of autolock or manual lock and unlock events.

Identification of SIM cards currently or recently used in the mobile device.

Information about any applications which are holding any type of operating system lock, for example, a wake lock.

Information about the occurrence of user level events (the things that users do or observe, as opposed to events that relate to the inner workings of parts of a mobile device. Examples include the number and size of text messages sent and their destination or received and their source; the number and length of music songs or voice podcasts listened to, and their source (local device storage or from a specific network source, played by which applications); the number and length of communications sent at the network level (packets, bytes sent/received); the number and duration and connected numbers of inbound or outbound voice phone calls; information about which communication base stations have been observed, their identifiers and technology used and signal strength, including cell towers, Wi-Fi base stations, and so on; the number of location requests made, the durations for which location services were turned on and active including GPS or other location services; the number of application related notifications received; the number and identification of apps that have push notifications turned on, the notification refresh rate, the duration of time that push notification has been turned on; settings in email or similar applications regarding push or regarding fetch or polling or synchronization intervals, including what those intervals are and the elapse time spent in each state; the screen brightness settings (e.g., high, low, auto adjustment based on lighting conditions); browser settings, including plugins are related identifying information and settings; settings for the use of a device LED for notifications (on, off, blink, etc.); application level settings and counts for things like tweets, mentions, direct messages, refresh interval, notification on/off, synchronizing twitter data, synchronizing contacts; RSS reader update frequencies; power or signal level settings that a mobile device has used either when conducting communications or when searching for connections such as to cell towers or Wi-Fi stations (this could lead to modeled situations with policies to turn off services while in such areas to conserve battery but to periodically check if a different area with different characteristics has been entered or to switch communications mode from 4G to 3G or from dual mode into a mode that would use less power such as GSM); current audio notification settings such as normal ringer or vibrate or both or silent; the number of movies or videos watched, elapsed time, the source of the material (local or from which network source); the number of times and the timestamps and durations of a phone being put to sleep and awakened; information about all applications and application services, how many times run, elapsed time, resources used; the setting for "setting time zone automatically" (which uses location and location change to auto set the time zone for device but uses power to do so); which ringtones are in use and the ringtone volume level and average RMS level; whether a phone is rooted or not and the timestamp when it happened; current calendar status (in a meeting, text content, location tag for meeting), the time start and stop for it; and for other items on the calendar for today (prior and upcoming); count and duration of times when the mobile device was being used for Wi-Fi tethering; the amount of CPU, network usage, and battery related to the receiving and presenting advertisements and counts of such events, together with information regarding which application and ad network was used to mediate the receipt and presentation;

The activity store 654 can store any of the things collected by the activity monitor. In an embodiment it can also collect various histories and statistics regarding any of those items. Examples of these items include:

Minimum, maximum, average battery usage, and other information related to the historical or statistical distribution of battery usage, such as standard deviation of measured battery usage, in aggregate or broken out by time of day, or by day of week, or by type of day (workday, weekend, holiday), or by location or location category (e.g., home, work, commuting, etc.), or by app or service or operating system component, or by communications device or processor or sensor, or combination thereof.

Historical or statistical information regarding the times of regular charging events, in aggregate or broken out by time of day, or by day of week, or by type of day (workday, weekend, holiday), or by location or location category (e.g., home, work, commuting, etc.)

Historical or statistical information regarding location categories, e.g., clusters of time and location dwell times, such as the location of home, of work, of commuting, or other clusters which may or may not have an associated user label or category Historical or statistical information regarding the time and/or location of the end of day event or arrival or departure from any of the labeled or unlabeled location categories Historical or statistical information regarding the time, location, and duration of battery charging events or external power supply events or arrival or departure from any of the labeled or unlabeled location categories at which charging events or external power supply events have occurred, and information regarding the type of battery charging operation or external power supply operation which occurred (e.g., including the type, model, settings, and usage of battery charger or external power supply, or fuel cell, solar cell, mechanical power-generating means or other power sources)

Historical or statistical information regarding the reported battery levels at the beginning and end of each battery charging event or device power on event for each battery that has ever been connected to the device Historical or statistical information regarding the reported battery levels broken out by location or location category or time of day or day of week or combination thereof for each battery that has ever been connected to the device Historical or statistical information regarding occurrences when battery levels have dropped to zero or below established thresholds, broken out by location or location category or time of day or day of week or combination thereof for each battery that has ever been connected to the device Historical or statistical information regarding battery charging measurements made during charging events (e.g., measured in mAh (milli Amp hours) or in Wh (Watt hours) or by Coulomb counting) for each battery that has ever been connected to the device Historical or statistical information regarding battery usage during intervals between charging events and/or device power on events, measured in mAh (milli Amp hours) or in Wh (Watt hours) or by Coulomb counting) for each battery that has ever been connected to the device Historical information regarding the identification of battery or battery type or model for each battery ever connected Historical information regarding the elapsed time since manufacture of battery (age of battery) for each battery that has ever been connected to the device Historical or statistical information regarding the elapsed total time battery has been on while not charging, for each battery that has ever been connected to the device, cumulative since the manufacture of battery or for each interval between charging events or device power on events Historical or statistical information regarding the elapsed total time battery has been on while charging, for each battery that has ever been connected to the device, cumulative since the manufacture of battery or for each interval between charging events or device power on events Historical or statistical information regarding the number of charging events for each battery that has ever been connected to the device Historical record of every occurrence of a change in the current operational status of battery charging capability, i.e., able to charge using external power source, or unable to charge (e.g., due to charging system failure) for each battery that has ever been connected to the device Historical or statistical information regarding the temperature, humidity, or moisture levels at the device or in device components over time (internal device or device component temperature, humidity, moisture levels, and external or ambient temperature or humidity)

Historical or statistical information regarding the power draw by device over time Historical or statistical information regarding CPUs or associated or auxiliary processors (such as GPUs or cryptographic processors), including identification of each processor, processor type or model, a time series of the elapsed CPU time over time with power-related events indicated (such as device charging event start, device charging event end, device power off event, device power on event), the actual frequency of operation or any special processor modes related to energy usage such as power preserving modes Historical or statistical information regarding the identification of communication devices or components, or type of communications device or component (such as radios, Wi-Fi, GPS, Bluetooth, NFC, GSM, CDMA, 3G, LTE, 2G, and others, or for optical communications such as infrared or visible light communications, or for audio communication such as powering internal or external speakers or microphones, or for quantum communications), or model for each communication device or component that is part of or connected to the device or ever has been part of or connected to the device; and historical or statistical information regarding when each of such devices have been operating, on, off, or in any of several operating modes such as standby, power-preserving mode, and using what power, with what signal strength, using what protocols, for what duration, and measurements of the amount of communication such as bytes sent, bytes received, number of communications initiated or responded to.

Historical or statistical information regarding the identification of display(s) or display type (e.g., LCD or OLED or electronic ink, or projection display, among others) or model for each display that is part of or connected to the device or ever has been, the time series information regarding display settings (including brightness level, auto-brightness setting, positive vs. negative mode, contrast level), with power-related events indicated (such as device charging event start, device charging event end, device power off event, device power on event), the amount of time that each display was on, the measured energy usage for each display.

Historical or statistical information regarding the identification of audio output or input devices or types or models for each audio output or input device that is part of or connected to the device or ever has been, and time series information regarding the audio output or input settings (including volume level, microphone sensitivity), with power-related events indicated (such as device charging event start, device charging event end, device power off event, device power on event), the amount of time each audio output or input device was on, and the measured energy usage for each audio output or input device.

Historical or statistical information regarding identification of sensors (such as accelerometers, compasses, temperature sensors, barometric pressure sensors, altitude sensors, humidity sensors, moisture sensors, touch or pressure sensors, orientation sensors, cameras, scanning devices, proximity sensors, gyroscopes, ambient light sensors, chemical or odor sensors, biometric input sensors, or medically related sensors such as heartbeat, respiration, blood pressure, blood oxygen levels using for example pulse oximetry, EEG sensors including low level frequency and amplitude measurements or derived information regarding the presence or strength of wave patterns such as Delta. Theta, Alpha, Beta, Gamma, or Mu, or tDCS or TMS sensors or ECG sensors) or sensors related to a device user's gaze direction or sensor types or models for each sensor that is part of or connected to the device or ever has been, the time series information regarding the sensor state (on, off, performance-saving mode) and settings, with power-related events indicated (such as device charging event start, device charging event end, device power off event, device power on event), the amount of time that each sensor was on, the sensor measurements themselves, and the measured energy usage for each display.

Historical or statistical information regarding the identification of which apps or services or operating system components are installed on the device or on removable media connected to the device or may be running on the device or ever have been, including app name, version, app vendor name, digital signature with which the app may be signed, timestamp for installation, updates, uninstallation, and time series information regarding when each such was running in what state and settings, elapsed time that each such was running, elapsed CPU time or network usage time, measured energy usage with power-related events indicated (such as device charging event start, device charging event end, device power off event, device power on event), Historical or statistical information regarding the location of the device over time, with power-related events indicated (such as device charging event start, device charging event end, device power off event, device power on event), Historical or statistical information regarding the data or other communication limits for the device such as monthly data usage limits and time series information on the measurement of the data or other communication quantities since the beginning of the accounting period for measuring such quantities, or since the last charging event, or since the last power on event, or other power-related events, or since the beginning of accounting time periods related to the data usage limits, including such items as the number of communications initiated or responded to, the number of bytes sent or received, elapsed time for communications, measured CPU usage or power usage for the communications, the communications technology or component or device used, the protocols used.

Historical or statistical information about the user(s) of the device, including but not limited to age, gender, occupation, hobbies, years of education, and so on, and time series information about which user has been an active user of the device, with power-related events indicated (such as device charging event start, device charging event end, device power off event, device power on event).

Historical or statistical information about any applications which have held any type of operating system lock, for example, a wake lock, including when the lock was requested, how long the lock was held, and whether the lock was ever relinquished.

Historically measured values related to user behavior and usage of device:

Expected time until end of day

Expected time until next normal charging event

Expected time until device will next be in a location at which charging events have occurred, where location can be an absolute location such as user's home or work, or a relative location such as in the user's car where charging may be possible.

In an embodiment the context knowledge discovery manager 1164 can automatically assign a user-label property to discovered context situations and context behaviors. When meaningful labels can be generated automatically for context situations and context behaviors it is easier for users and administrators to view information about context situations and context behaviors in the CORPS 1170, context history store 1162, and active contexts 1166 and 1122. A set of heuristics and rules for creating compound user-label values are effective in generation.

E.g., the context situation with the greatest location dwell time during the night, where night is a duration of at least six hours in the same location with no significant activity on the mobile device can usually be labeled HOME. A context situation that has the same location as the HOME context situation and which begins with a period of inactivity of user interaction on the mobile device and terminates with an alarm event can confidently be labeled HOME-SLEEP.

For most users who are of working age, the context situation with the greatest location dwell time during the daytime hours can usually be labeled WORK; for users of school age, such context situations discovered that happen during the school year can usually be labeled SCHOOL.

Repeated geographical behaviors (frequent occurrences of similar motion tracks) can be labeled TRAVEL. When a TRAVEL context behavior begins at the location of the HOME context situation and ends at the location of the WORK context situation, the behavior's user-label can be modified to COMMUTE-HOME-TO-WORK. A TRAVEL context behavior in the other direction can be modified to COMMUTE-WORK-TO-HOME. If the locations on the motion track for the TRAVEL context situation that is part of COMMUTE-HOME-TO-WORK coincide with externally known locations of a public transit line such as BART in the San Francisco area, then the user-label can be further refined to be COMMUTE-HOME-TO-WORK-VIA-BART.

A brief TRAVEL context behavior during the hours that the WORK context situation prevails followed by a short duration at the destination, followed in turn by substantially retracing the original TRAVEL behavior and ending at the WORK context situation location could be labeled ERRAND-FROM-WORK. If an external content service can be employed to identify the name or category of business (e.g., a Staples store in category OFFICE-SUPPLIES-STORE then the label could be refined to ERRAND-FROM-WORK-TO-STAPLES or ERRAND-FROM-WORK-TO-OFFICE-SUPPLIES-STORE.

The advantage in generating such labels automatically is that a user or administrator does not have to assign labels or define context situations and context behaviors; these are discovered automatically based on data analysis techniques, clustering techniques, data mining, and heuristics and combining and refining rules for labels. Having labels on context situations and context behaviors makes policy rules more readable and intelligible, and explanations of actions taken by policies more understandable.

In another embodiment the policy manager can make certain context behavior predictions and changes in current behavior available to applications that have chosen to be aware of this context management infrastructure. Such an application can provide enhanced functionality to the user of the mobile device.

One example of such enhanced functionality is for a network enabled music player application, which fetches songs from a network source for play on the mobile device. Such an application, although not active during the currently active context situation or context behavior, may be part of a predicted context behavior. E.g., the AT-WORK context behavior is predicted to end in 30 minutes, and the successor context behavior COMMUTE-HOME-FROM-WORK predicts that the music player application will be used for the duration of that event. Unfortunately for the user, the motion track for the evening commute uses subway tunnels and passes through other areas with poor network connectivity. The application can use the information from the context behavior prediction to know that it can wake up and has 30 minutes to download new music that can then be played to the user during the COMMUTE-HOME-FROM-WORK behavior (during which time it would be unable to download new music due to poor network connectivity). This is an example of context behavior prediction enabled prefetch, or more generally, a context behavior prediction enabled pre-action.

Another example of enhanced functionality using context behavior predictions and context behavior changes is called postfetch, or more generally, a context behavior prediction enabled post-action. A typical scenario for postfetch is when a user wants to perform an activity that requires network connectivity, but the user is currently in a context in which such an activity is going to be slow or expensive or even impossible. When the system detects the user attempting to initiate such an activity while in a network-poor context, the system (or a context management infrastructure aware application) can choose to record the user's intentions (e.g., to perform a particular network search, or to send an email or an SMS text message), and then when the context switches later to one with better network connectivity, to perform the actions as indicated by the user's previously recorded intentions, and then to notify the user that these actions have been completed. In another embodiment the system can simply alert the user that the user's intended action during the current context will be slow or expensive or impossible; the alert can include information about the historical resource usage that is associated with performing the user's intended action.

Another example of enhanced functionality using context behavior predictions and context behavior changes is called contextual substitution. In one embodiment the system, or an application that is aware of the context management infrastructure, can take note of the current context and make a substitution in terms of how services are performed to accommodate the current situation. An example would be a user at work in an interior room of a large office building. In this interior room there is essentially no cell phone network connection due to interference from the building structure, but there is Wi-Fi provisioned throughout the workplace.

In this example, detecting the changed context (no cell connection, but Wi-Fi available), a contextual substitution can take place to route device inbound or outbound phone calls or text messages via the Wi-Fi network rather than through the normal cell connection. This may be accomplished by a combination of actions taken on the device and on external services, directed by the active context policy manager.

For example, outbound phone calls could be directed to use a VOIP application sending call information over the available Wi-Fi network; external services could be invoked to set up call forwarding to a temporary or permanent VOIP phone number which would connect to the user's device over the available Wi-Fi network. Contextual substitution also allows for selection of several alternative methods of provisioning a particular service based on current contextual considerations.

In another embodiment context information can be used for contextual routing of communications or notifications or content in a situation in which a user has multiple devices (e.g., smartphone, tablet, or personal computer (PC)) that are being employed by the user. One aspect of the current active context includes which device to which the user is currently attending. For example, when a device is being interacted with by the user, it is known that the user is attending to a particular device. When a user is interacting with one device, and a different user device is not in the same location, it is known that the different device is not being attended to by the user. A user may be interested in notifications or information that comes into a device that is not currently being attended by the user.

The context management system can route the notification or information to a device to which the user is currently attending. This can be accomplished by the context management system, or can be handled by an application that is aware of the context management system. In one example, a user setting down the user's smartphone on the user's desk while begging to use the user's PC, is actively attending the PC and not the smartphone; when an SMS text message arrives at the smartphone, the context management system (or an application that is aware of the context management system and its context information) can deliver the SMS text message or notification that it was received to the user's PC.

In another example, a user can begin using an internet-based music playing service on the user's smart phone. If the user sets the phone down and picks up the user's tablet and walks away, the same application running on the user's tablet can begin to play the same song at the same point while the smartphone application can stop playing the song.

Another example of a policy in action is where the system has previously observed a rule with high confidence that on Fridays the user does not usually plug in to recharge the device battery until around 3 a.m. On this Friday afternoon the system sees that the battery is at 60 percent capacity and has a prediction that it will not last until 3 a.m. The system's policy alerts and prompts the user to charge the battery now to ensure that adequate battery resource will be available until the expected usual 3 a.m. charging event.

In another embodiment applications that are aware of the context management system can enable more effective context adaptation by informing the active context policy manager before the application takes an action as to what the action would be, including what the configuration parameters would preferentially be from the perspective of the application, and the active context policy manager disapproves the action, or approves the action, or conditionally approves the action with modified configuration parameters.

In another embodiment applications that are unaware of the context management system can become context adaptive by way of the functionality of the context management system. For example, typically applications store their configuration information and settings somewhere on the mobile device, e.g., in a database or in a file in the file system on the device. The active context policy manager can modify the stored configuration information and settings based on an active context policy. The policies can be those that are automatically determined by the context management system, or ones that have been manually specified by the user or an authorized administrator.

There may be different authorization rules for the specification or modification of policies for different administrators or for the user. For example, an enterprise administrator and only an enterprise administrator may be authorized to modify policies that affect the functioning of enterprise applications that are installed on the device; or an enterprise administrator may be able to modify policies for the device as long as the current active context is that the device is physically in the workplace; or the device user may be the only one authorized to modify policies affecting certain personal apps that the user has installed, but the enterprise administrator may be authorized to prevent such apps from running while in certain enterprise contexts. An example of enterprise context is while the device is connected to an enterprise network. Another example of enterprise context is while any enterprise installed app is executing; a sample policy could be that no non-enterprise installed apps can run concurrently with enterprise installed apps, for security and data privacy reasons.

In another embodiment a context management service can use the collective contextual information from a group of users to inform the active context for all such users. For example, all users that are in the same geographical location could be a context group. Communication of the contextual information from the users (and their devices) in the context group could be via their devices' connections to a server/cloud based context management system, or could be a peer to peer communication by active context policy managers on their devices to other devices in the context group.

For some types of context information the sharing of context information among users in the ad hoc, geographical location based context group could be free and unpermissioned; for other types of context information the sharing of context information could require an opt-in permission from the members of the context group, or at least those members whose devices are the source of the shared context information.

Context groups may be formed by the users themselves as needed; for example a context group for a group of friends who are going out for an evening of dining and entertainment. Context groups could be persistent, such as for family members who may wish to share their context information regularly. The availability of shared contextual information from a context group can improve the precision and accuracy of some measurements, or can make available automatic adaptations based on individual active context situations and behaviors. For example, a context group including friends out for an evening's entertainment, if one of the user's device is low on battery, the context group could use contextual substitution to direct incoming voice calls or SMS text messages to the device of one of the other users in the context group who has adequate battery resource.

The act of obtaining or measuring some aspect of context may itself have an impact on context, on various resources;

for example, to obtain location context might require the use of GPS or Wi-Fi station presence interrogation which in turn uses network and CPU and battery resources. In one embodiment an active policy can weigh the potential benefits from learning a piece of context information against the mostly known cost of obtaining that piece of context information, and decide whether to obtain the context information or not.

In another embodiment the context management system can use contextual substitution of an alternative source of context information; an example of this would be in a context group including friends out together, it would only be necessary for one user in the context group to have the GPS location system active on that user's device, and the GPS location context information can be shared with the other users and their devices within the context group. The net gain for the context group would be greatly reduced aggregate battery resource. In an embodiment the user whose device is known to do the best job of obtaining GPS location could be the one so designated for use by the context group. In an embodiment the role of which user in a context group is providing a particular type of shared context information can rotate among the different users in the context group, so as to minimize the resource consumption aspect with respect to any individual user in the context group.

The historical context information that is captured in the activity store 654 in the server/cloud management 650 service, or that is captured in the activity store 654 and the context history store 1162 in the server/cloud management 1150 service, can be of great use to application developers, advertising networks, device and device component manufacturers, operating system providers, and communications carriers, for a variety of different reasons.

Such information represents realistic workloads performed by actual users, as well as annotating that information with a rich set of contextual information that provides additional meaning for the interpretation and understanding of this data. In an embodiment the aggregate contextual information that is captured is made available to such consumers of contextual information, either periodically in batch or in substantially real-time. Such aggregate contextual information can be summarized, anonymized, and without any personal identifying information to preserve the privacy of all the users whose contextual information was collected. In particular the overall aggregate contextual information and statistics regarding it, relative to high level context situations and context behaviors would have great value to those data consumers; such information is essentially impossible to obtain today.

In another embodiment the context management system is used to develop, deliver, and enforce policies for devices that are part of what has been called "the internet of things." In the internet of things there are multiple devices which operate on their own, without accompanying and attendant users. Such devices may be mobile or sessile; they may have various sensors and computing and communication capabilities and may run applications; schematically they can be considered substantially similar to a mobile device 600. "Things" in the internet of things themselves have context information, and can participate in a variety of ways in a context management system, as mobile devices 600 or as external environment resources 630. They can be managed with active context policies. Such "things" may have occasional interactions with their owners or administrators, who may monitor the things or modify settings on these things. Such owners or administrators play the role of users with respect to the "thing" devices as far as the context management system is concerned.

In another embodiment the active context policy manager could enforce a policy that temporarily disables in-application advertising communications during contexts of constrained network bandwidth or battery charge levels.

In another embodiment the active context policy manager could perform a contextual substitution to have in-application advertising communications request purely textual advertisements instead of ones using images or animations (which could use more resources) during contexts of constrained network bandwidth or battery charge levels.

In another embodiment the active context policy manager could perform a contextual substitution to have in-application advertising communications obtain advertisements from an already on-device cache of advertisements instead of obtaining them over a network during contexts of constrained network bandwidth or battery charge levels.

In another embodiment the active context policy manager could provide enriched contextual information to in-application advertising components to permit the connected advertising network to serve ads based on high level context information.

In another embodiment the active context policy manager could be enforcing a policy which restricts the amount of contextual information that an in-application advertising component is allowed to obtain from either the context management system itself or from the device's applications, operating system, or resources; in this embodiment the policy is applied to advertising components of applications, not to applications as a whole, which requires the ability to determine which component of an application a request for context information is coming from.

In an embodiment a context management system communicates with a server/cloud advertising broker, in which context information is sent from the device to the broker, and in which advertisements with contextual conditions are submitted to the broker, and in which the broker matches the current active context information from devices with the contextual conditions submitted with advertisements, and serves the matched advertisements to the device. In this process the broker does not disclose the contextual information to the submitter of the advertisement.

In an embodiment the advertisement may be submitted with not just conditional context information to be matched by the broker, but also with a price the submitter is willing to pay for having the advertisement served; the broker can match devices with advertisements based on the combination of goodness of fit between current context information and the conditional context information submitted with the advertisement, and using information about the price the submitter is willing to pay for having the advertisement served.

In an embodiment the device submits contextual information to the broker with a fee that the user of the device requires to be paid in exchange for viewing an advertisement, and advertisements are submitted with not just conditional context information to be matched by the broker, but also with a price the submitter is willing to pay for having the advertisement served; the broker can match devices with advertisements based on the combination of goodness of fit between current context information and the conditional context information submitted with the advertisement, and using information about the fee the device user is willing to accept for having the advertisement served, and the price the submitter of the advertisement is willing to pay for having the advertisement served.

In an embodiment the system above may have several "goodness of fit" criteria associated with multiple different fee levels (to be received by a device user) or multiple price levels (to be paid by the submitter of an advertisement). The broker can match devices with advertisements based on all of this information.

In an embodiment the device lock screen displays the current actual and projected resource glide paths, together with information about any actions taken automatically by the system to optimize performance, or actions taken by the system with user's approval, or actions taken directly by the user either based on prompting or independently. Information about active policies is shown. In another embodiment a similar display is available in an application, and the user is able to drill into details or modify policies.

In an embodiment the active state policy manager or the active context policy manager takes the fewest possible number of actions that result in an acceptable resource glide path.

In an embodiment the active state policy manager or active context policy manager detects a user action (for example, launching a game application); the active state policy manager can advise the user how long the user can safely play the game before dropping the resource glide path below acceptable levels.

In an embodiment the current active resource predictions can be presented as notifications in the device notification area. In another embodiment the current active resource predictions can be presented in the user's calendar; a time of predicted resource exhaustion can be shown at that time in the calendar; a time of recommended action (e.g., plug device into charger) can be shown at that time in the calendar.

In an embodiment the system using machine learning can write association rules for sets of actions that are taken by a user when a user enters a particular context situation; the system can prompt the user who is entering a particular context situation or behavior for which there exist high confidence association rules asking if the system should take the set of actions that the user normally takes. In an embodiment the user can specify that such actions should be taken automatically in the future when the user enters that particular context situation or behavior. The message to the user contains the context situation label and description. In an embodiment the set of user actions are represented as a policy, and added as a policy template linked to the particular context situation or behavior.

In an embodiment the system may contain policies intended to preserve contextual privacy by specifying limits on the precision with which the contextual information can be made available to an application or sent off the device, or by specifying limits on the frequency with which contextual information can be requested, or the maximum duration during which contextual information can be requested.

Figure 19:
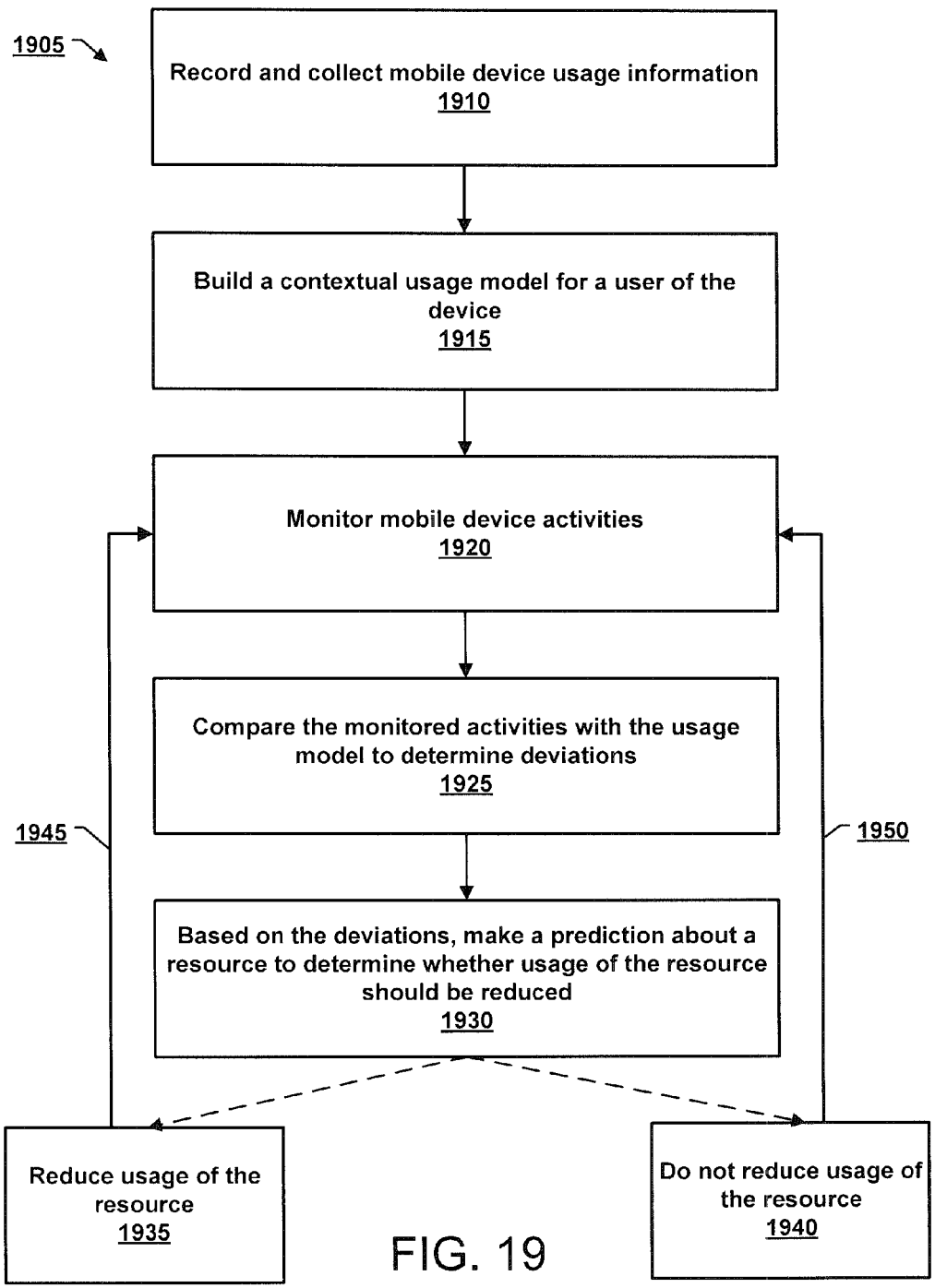
FIG. 19 shows an overall flow for resource predictions.

FIG. 19 shows an overall flow 1905 of a specific implementation of the resource prediction system. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular process, application or based on the data.

In a step 1910, the system logs and collects mobile device usage information. The information can include data collected over the course of a day (or less), week, month, or more. For example, data may be collected over a 24-hour period, 48-hour period, 72-hour period, 96-hour period, 120-hour period, 168-hour period, 336-hour period, or 744-hour period.

Data collected over a longer period can provide a more accurate usage model as compared to a usage model based on data collected over a shorter time period. A dataset collected over a shorter time period, however, can be used to more quickly create the usage model. Whether the data is collected over a longer or a shorter period can depend on factors such as the application of the system, desired accuracy, variability in the collected data, and other factors. For example, if a user's schedule and daily activities has a large degree of variability it may take a longer period of time to collect a sufficient amount of data in order to properly model the user's behavior and the various contexts in which the user's mobile device is used. If, however, the user's schedule is fairly routine it can take a shorter period of time to collect the data for the usage model.

Table A below shows an example of some of the historical usage information that may be collected for a particular user.

TABLE A

| Time/Date | Activity | Location (latitude/longitude) | Speed (miles per hour) |
| --- | --- | --- | --- |
| Oct. 7, 2011, 1:00 AM | No activity detected | 37.789753, −122.457709 | 0 |
| Oct. 7, 2011, 1:10 AM | No activity detected | 37.789753, −122.457709 | 0 |
| Oct. 7, 2011, 1:20 AM | No activity detected | 37.789753, −122.457709 | 0 |
| ... | ... | ... | ... |
| Oct. 7, 2011, 6:20 AM | No activity detected | 37.789753, −122.457709 | 0 |
| Oct. 7, 2011, 6:30 AM | Movement detected | 37.7911186, −122.4011706 | 20 |
| ... | ... | ... | ... |
| Oct. 7, 2011, 6:40 AM | Movement detected | 37.790358, −122.3992305 | 22 |
| Oct. 7, 2011, 6:50 AM | No activity detected | 37.7919084, −122.3986221 | 0 |
| Oct. 7, 2011, 7:00 AM | Phone call, no movement detected | 37.7919084, −122.3986221 | 0 |
| Oct. 7, 2011, 7:10 AM | Productivity application executing, no movement detected | 37.7919084, −122.3986221 | 0 |
| ... | ... | ... | ... |
| Oct. 7, 2011, 5:00 PM | Movement detected | 37.790358, −122.3992305 | 15 |
| Oct. 7, 2011, 5:10 PM | Movement detected | 37.7911186, −122.4011706 | 18 |
| Oct. 7, 2011, 5:20 PM | No activity detected | 37.789753, −122.457709 | 0 |
| Oct. 7, 2011, 5:30 PM | No activity detected | 37.789753, −122.457709 | 0 |
| ... | ... | ... | ... |

The entries in Table A above are periodic data samples to track the user's use and nonuse of the mobile device. In this example, the log interval is 10 minutes. The log interval, however, can vary. A shorter log interval can provide a larger dataset for a more accurate model, but will consume more resources (e.g., storage and battery power). A longer log interval will provide a smaller dataset, but will help to conserve resources. The log interval can be configurable such as by a user or system administrator.

As shown in Table A above, each entry may include contextual information such as a time and date stamp, a description of the activity detected, a location of the mobile device at the time of the detection, and a speed of the mobile device at the time of detection.

In a step 1915, a contextual usage model for a user of the mobile device is built using the collected information. In a specific implementation, the contextual usage model is created by analyzing the data for patterns. The patterns can be tagged or associated with a context label or category from the context ontology. Some examples of pattern matching include searching the log data for groups of consecutive entries where no activity, movement, or both are detected, and searching entries where activity, movement, or both are detected.

Patterns may be identified by comparing and correlating data collected during one time period with data collected during another or corresponding time period. The time period can be of any duration, can be during any part of the day (e.g., morning, afternoon, or evening), and can be during any part of the year (e.g., fall, winter, spring, or summer).

As an example, data collected during a weekday context may be compared with data collected during another weekday context to determine expected use of the device on a weekday. Data collected on a weekend context may be compared with data collected on another weekend context to determine expected use on a weekend. Data collected on the weekend context may be compared with data collected on a weekday context to determine differences in expected use during weekends versus weekdays. Data collected on, for example, a Monday, may be compared with data collected on a different Monday to determine expected use on Mondays. The data may be cross-referenced to other sources of information. For example, location or GPS coordinate data may be cross-referenced against a database that maps GPS coordinates to a street address or zip code.

Identifying contexts to include in the model can be based on the frequency that the context occurs. Contexts that occur frequently may be included in the model. Contexts that do not occur frequently may be excluded or omitted from the model.

Table B below shows a subset of consecutive entries from Table A where no activity and movement was detected.

TABLE B

| Time/Date | Activity | Location (latitude/longitude) | Speed (miles per hour) |
|---|---|---|---|
| Oct. 7, 2011, 1:00 AM | No activity detected | 37.789753, −122.457709 | 0 |
| Oct. 7, 2011, 1:10 AM | No activity detected | 37.789753, −122.457709 | 0 |
| Oct. 7, 2011, 1:20 AM | No activity detected | 37.789753, −122.457709 | 0 |
| ... | ... | ... | ... |
| Oct. 7, 2011, 6:20 AM | No activity detected | 37.789753, −122.457709 | 0 |

The system examines the data and can make the following observations: the time and date of the entries was during the night on a weekday (e.g., Monday), the duration between the first and last entry is 5 hours 20 minutes, and that the location corresponds to a residential area. The system can compare the collected data with data collected for another corresponding time period (e.g., another Monday night). If the comparison shows a similar pattern, based on these observations, the system can associate or tag the pattern with the context "HOME."

Another example of pattern matching is to search the log data for groups of consecutive entries where movement is detected. Table C below shows a subset of consecutive entries from Table A where movement was detected.

TABLE C

| Oct. 7, 2011, 6:30 AM | Movement detected | 37.7911186, −122.4011706 | 20 |
|---|---|---|---|
| ... | ... | ... | ... |
| Oct. 7, 2011, 6:40 AM | Movement detected | 37.790358, −122.3992305 | 22 |

As discussed above, the collected data can be compared with data collected for another corresponding time period to identify patterns. The comparison may indicate, for example, that travel started from about the same location, travel ended at about the same location, the route traveled was about the same, the speed of travel was about the same, or combinations of these. The system may further observe that the ending or destination location corresponds to a commercial building, the speed and distance of travel likely indicates travel not by foot, and other observations. Based on the comparisons and observations, the system may tag the pattern with the context "COMMUTE-TO-WORK."

The system can apply the pattern matching technique discussed above to the remaining entries in Table A to identify an "AT-WORK" and "COMMUTE-HOME" context and expected device usage and non-usage during each context. In a specific implementation, the usage model includes a set of context situations. Each context situation includes a first time indicating when a context situation is expected to begin, a second time indicating when the context situation is expected to end, a location of the context, information indicating whether the context is expected to fall on a weekday or weekend, expected speed of travel during the context, expected device usage during the context, or combinations of these. Device usage during a particular context may include, for example, an identification of applications used, duration of application usage, calls placed, calls received, duration of call, text messages sent, text messages received, text message size, and so forth.

In a step 1920, the system monitors mobile device activities. The monitoring can include, for example, tracking the location and movement of the device, applications running on the device (e.g., time when application was started, or duration of application use), the level of battery charge in the device, phone calls (e.g., time a phone call was placed, time a phone call was received, or duration of phone call), network activity (e.g., time when a network connection was established, or duration of the network connection)—just to name a few examples.

In a step 1925, the system compares the monitored activities with the contextual usage model (step 1915) to determine any deviations between the model and the activities. In a specific implementation, the comparison includes using the monitored activities to determine a current context of the mobile device, identifying from the usage model expected usage of a resource during the current context, and comparing the expected usage of the resource with actual usage of the resource. For example, the monitored activities may include information indicating that the user is traveling along a particular route. The system can use the collected information to match or identify the current context of the mobile device as being "COMMUTE-TO-WORK." The usage model can specify the expected usage of the resource (e.g., battery) during the "COMMUTE-TO-WORK" context. The expected usage of the resource (or battery) is compared to the actual usage of the resource to determine deviations between expected and actual use.

In a step 1930, based on the deviations, a prediction is made about the resource to determine whether an amount of the resource will be available for a context following the current context as specified by the contextual usage model. The following context may or may not be an immediately following context. For example, a usage model may include a set of contexts that are chronologically arranged as: "AT-HOME," "COMMUTE-TO-WORK," "AT-WORK," "COMMUTE-TO-HOME," and "AT-HOME-AFTER-WORK." If the current context is "AT-WORK," a context after or following the current context can be "COMMUTE-TO-HOME," or "AT-HOME-AFTER-WORK."

If the prediction indicates the resource amount will not be sufficient for the following context, the system reduces use of the resource (step 1935). If the prediction indicates the resource amount will be sufficient for the following context, the system does not reduce use of the resource (step 1940).

More particularly, a deviation may indicate that actual usage of the resource is higher than expected. The user may have made several unexpected phone calls during the current context. For example, the "COMMUTE-TO-WORK" context may have information indicating that no phone calls are expected during the context.

On this particular occasion, however, the user may have made a number of phone calls while commuting to work. These unexpected phone calls may have consumed an amount of battery charge such that the charge level will be insufficient to support the activities during the following context (e.g., "AT-WORK"). So, the system can reduce resource usage (step 1935) so that the resource will be available for the "AT-WORK" activities. In a specific implementation, reducing usage of the resource (e.g., battery) is by activating one or more resource reduction policies that specify actions to take on the device in order to conserve the resource.

Alternatively, a deviation may indicate that actual usage of the resource is lower than expected. For example, the model may specify that during the current context (e.g., "COMMUTE-TO-WORK") the user is expected to use a particular application.

On this particular occasion, however, the user may not have used the application. So, the amount of battery charged that was expected to be consumed through use of the application will not have been consumed. Thus, there may be a surplus. Usage of the resource will not have to be reduced (step 1940).

When there is a surplus, a policy may be activated that increases usage of the resource. For example, a service that may have been disabled, such as a non-priority or non-essential location service, may be enabled so that the user can enjoy the benefits of the location service with the assurance that the battery charge-level will be sufficient to support the activities of the following context (e.g., "AT-WORK"). Activating device features when there is a surplus of battery power lets the user enjoy the full potential of the device.

For example, message notification frequency may be initially set at a long duration in order to conserve battery power. When there is a surplus, however, the notification frequency can be set to a shorter duration so that the notifications are more up-to-date. As another example, GPS tracking may initially be disabled in order to conserve battery power. If, however, there is a surplus, GPS tracking may be enabled so that the user receives the benefits of location-based services.

As shown by loops 1945 and 1950, the system can continuously monitor activities, make estimates and re-estimates, compare the actual resource usage with the expected resource usage of the context, and make resource adjustments as needed so that the resource will be available for the following context as specified by the contextual usage model.

FIG. 20 shows a specific implementation of a flow 2005 for the resource glide path shown in FIG. 10. In a step 2010, the system analyzes the contextual usage model of the user to determine a first time after which it will be acceptable for a battery of the mobile device to fall below a threshold charge level. The threshold charge level can be the level of charge in the battery at which the mobile device will no longer operate (e.g., will not turn on) or automatically shuts down. In a specific implementation, the system scans the context situations listed in the usage model to identify the context situations where the mobile device is expected to be connected to a charger.

A charger is a device used to put energy into a battery by pushing an electric current into the battery. Depending upon the type of charger, a charger may be adapted to connect to an alternating current (AC) electrical socket such as may be found in one's home or a building, a direct current (DC) electrical socket such as may be found in a cigarette lighter receptacle of an automobile. A mobile device may be charged through a charging kiosk or station such as may be found at an airport.

As an example, the context "AT-HOME" may include information indicating that the user charges the mobile device while they are home. Upon identifying the context, the system determines the expected starting time of the context. In this example, the context "AT-HOME" may include information indicating that the user is expected to arrive home at about 7:00 p.m. (see FIG. 10). In this example, the first time is 7:00 p.m. In other words, after 7:00 p.m. it will be acceptable for the battery to fall below a threshold charge level or be exhausted because the user will have arrived at their home and have access to a charger.

Thus, in an implementation, a context in which it may be acceptable for the battery to fall below the threshold charge level is when the context specifies the presence of a charger. As an example, if the user typically charges the mobile device while at home then the acceptable context may be "AT-HOME." If the user typically charges the mobile device while at work then the acceptable context may be "AT-WORK." If the user typically charges the mobile device while commuting, such as in their car, then the acceptable context may be "COMMUTING-VIA-CAR." There can be multiple acceptable contexts. In another specific implementation, the acceptable context may be based on the user being in the presence of other acquaintances (e.g., spouse, relatives, friends, associates, or colleagues) who have mobile devices. In these cases, it may be acceptable for the battery to fall below the threshold charge level because the user may be able to rely on, for example, their spouse's mobile device.

In a step 2015, the system examines current usage of the mobile device to predict a second time at which the battery will fall below the threshold charge level (see reference number 1070—FIG. 10). In a specific implementation, the prediction includes analyzing a set of data points, each data point corresponding to a specific charge level of the battery measured at a specific time.

In a specific implementation, the analysis includes an interpolation of the data points in order to estimate the second time. The interpolation can be a linear interpolation as shown in FIG. 10. It should be appreciated, however, that other types of interpolation or estimation may instead or additionally be used. Other examples of interpolation or approximation methods that may be suitable include piecewise constant interpolation or nearest-neighbor interpolation, polynomial interpolation, spline interpolation, a Gaussian process, rational interpolation, trigonometric interpolation, Whittaker-Shannon interpolation, multivariate interpolation, bilinear interpolation, bicubic interpolation, trilinear interpolation, or least squares—just to name a few examples. In the example shown in FIG. 10, the battery is predicted to fall below the threshold charge level at the estimated second time of 4:00 p.m.

In a step 2020, if the second time is before the first time, the system reduces usage of the battery. In the example shown in FIG. 10, the second time (i.e., 4:00 p.m.) is before the first time (i.e., 7:00 p.m.). In a specific implementation, reducing usage of the battery includes activating a resource reduction policy to take actions on the mobile device as discussed in this patent application.

In a specific implementation, calculating the second time is based on a most recent charge of the battery. If, for example, the battery was charged (either fully or partially charged) after the second time had been calculated, then the second time may be recalculated. This helps to ensure a good estimate for the second time because the calculation will be based the state of the battery as of the last charging session.

The first time may be recalculated if the system detects a change in the contexts upon which the first time was originally calculated. For example, the first time may have been calculated based on the assumption that the user will return home by 7:00 p.m. Consider, however, that on this particular occasion, the user is working late. The system can detect that the user has not left the office at the expected time (e.g., 6:30 p.m.) and may then recalculate the first time. For example, the first time may originally have been calculated to be 7:00 p.m., but may be recalculated to be 9:00 p.m. (e.g., the new estimate for when the user is expected to arrive home).

Interpolation and estimates can be subject to errors. In a specific implementation, the trigger for reducing battery usage is when the second time is more than a predetermined amount of time before the first time. The amount of time can be user-configurable. For example, the user can configure the time to be 0, 5, 10, 15, 20, 25, or 30 minutes, or any other value as desired. In a specific implementation, battery usage is reduced if the second time is at least a predetermined amount of time before the first time. The predetermined amount of time can be a setting of the system that is managed by the user. Having a predetermined amount of time can help to prevent the policy from being activated prematurely.

FIG. 21 is a block diagram showing some of the actions or consequences of activating a policy to reduce usage of a resource such as a battery. As discussed above, policy activation 2105 can include disabling a service on the mobile device 2110, providing the user with a suggestion on how to reduce usage 2115 (e.g., displaying a message on the electronic screen of the device with a recommendation to turn-off WiFi), prompting the user for permission to reduce usage before reducing usage 2120, reducing usage automatically 2125 (i.e., without prompting the user for permission), changing a setting on the mobile device 2130, providing a substitute service 2135, providing cached information (see FIG. 22), or combinations of these.

Actions to reduce resource usage can be prioritized such as based on the importance of the service. For example, if WiFi connectivity is less important than checking email every 5 minutes, then WiFi may be disabled before email checking.

As discussed above, in some embodiments, a server is used to help manage resources on the mobile device. Thus, reducing usage can include transmitting from the server to the mobile device instructions to change a device setting, e.g., change a setting from a first value to a second value, where when the setting is at the second value less of the battery is consumed that when the setting is at the first value. Reducing usage can include substituting services provided by a first application program currently running on the device with services provided by a second application program not currently running on the device, where the second application program consumes less of the battery than the first application program.

Figure 22:
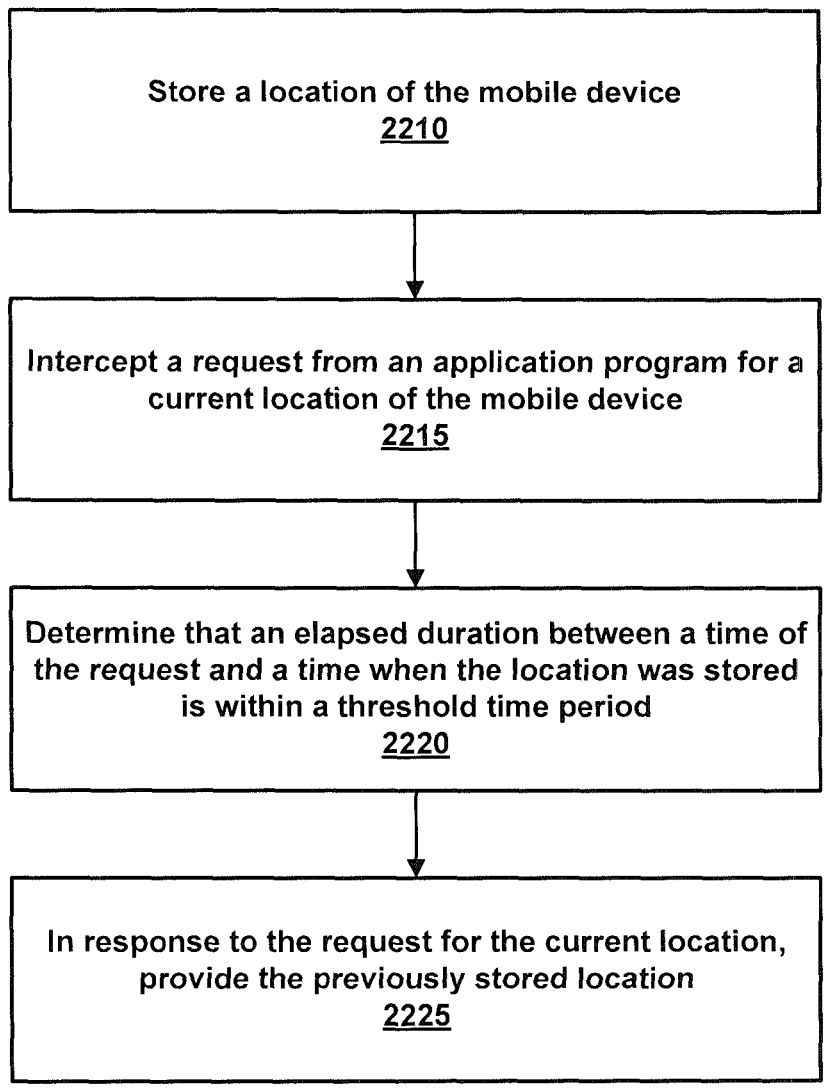
FIG. 22 shows a flow for providing cached location information.

FIG. 22 shows a flow 2205 for providing cached information such as cached location information in order to conserve resources. In brief, in a step 2210, the system stores a location of the mobile device. The location may be GPS coordinates acquired from a GPS receiver of the device that indicate a geographical location of the mobile device. In a step 2215, the system intercepts a request from an application program for a current location of the mobile device. The request may include instructions to activate the GPS receiver and acquire the current location. In a step 2220, the system determines that an elapsed duration between a time of the request and a time when the location was stored is within a threshold period. In a step 2225, in response to the request from the application program for the current location, the system provides the previously stored location.

The amount of power consumed by a GPS receiver can be significant. For example, power is needed for the device antenna and power is needed for capturing and processing the satellite signals for triangulating position. Intercepting the request prevents the GPS receiver from being activated and conserves battery power. Comparing the elapsed duration between the time of the request and the time the location was stored with a threshold time period helps to ensure that the stored location information is not too stale. For example, if the elapsed duration was merely several seconds, then the previously stored location may be sufficiently accurate for the requesting application. The threshold time period can range from about 5 seconds to about 5 minutes. The time period can be less than 5 seconds or greater than 5 minutes.

In a specific implementation, the threshold time period various depending upon context. For example, if the user is traveling at a low rate of speed (e.g., walking) the threshold time period may be longer as compared to when the user is traveling at a high rate of speed (e.g., driving). Thus, good location accuracy can be provided when the user's position is changing quickly (e.g., user is driving). Conversely, if the user's position is not changing quickly (e.g., user is walking) then the previously stored location information may be a reasonable approximation of the user's current location and battery power can be conserved by not activating the GPS receiver.

In a specific implementation, the system provides for the discovery, via analysis by the activity knowledge discovery manager, of the effects that different application or device settings can have on resource usage, including network bytes sent/received, cpu processor cycles, battery charge used, etc., via the collection of information from multiple devices (including ones not owned by the user).

For example, first information may be collected from a first mobile device of a first user. Second information may be collected from a second mobile device of a second user, different from the first user. The first and second information is analyzed to make a discovery regarding a resource on the first mobile device.

In some cases, information may be collected from multiple devices belonging to the same user in order to create a usage model. In a specific implementation, a method includes collecting first information from a first mobile device of a user, collecting second information from a second mobile device, different from the first mobile device, of the user, and analyzing the first and second information to create a contextual usage model for the user.

In a specific implementation, resource glide path processing can be configured for resources other than battery power, such as monthly data limits. For example, a first value indicating a monthly data limit for a particular month is obtained. The system predicts a second value that estimates an amount of data to be used during the particular month. If the second value is greater than the first value, a policy is activated to reduce network data usage.

In a specific implementation, a system provides for the use of the ontology and ontology related processing of low level data into high-level data, and the specification of policy templates based on these abstracted conceptual context situations and behaviors. The construction of context situations can be from observations made from collection of data; e.g., the USING-EMAIL-APP-WHILE-COMMUTING-TO-WORK-FROM-HOME-VIA-BART example.

In a specific implementation, a system provides for the discovery and creation of context behaviors (sequences of context situations) from observed data and the automatic labeling of context situations and behaviors. As discussed above, in a specific implementation, context-awareness is used to intelligently manage the mobile device battery. In another specific implementation, context-awareness is used to adapt the mobile device to a current context. Based on the current context, the home page screen of the device may display some icons, but hide or not display other icons. For example, if the current context happens to be "AT-WORK," the home screen may not display mobile applications related to games, but may instead display applications related to business productivity. This can help reduce the appearance of clutter on the home screen.

In a specific implementation, a method includes displaying on a home screen of a mobile device a first set of application icons when the mobile device is in a first context, detecting that the mobile device is currently in a second context, different from the first context, and upon the detecting, displaying on the home screen a second set of application icons, different from the first set of application icons. The first set of application icons may belong to a first category of mobile applications (e.g., games or entertainment). The second set of application icons may belong to a second category of mobile applications (e.g., business productivity). A number of application icons in the first set may be different or the same as a number of application icons in the second set. For example, the user may have installed more games as compared to business productivity applications.

As another example, when the user is at the theater, the mobile device may automatically be configured to vibrate so as to not disturb other theater patrons when the user receives a call. In another specific implementation, a method includes permitting an option of the mobile device to remain at a first setting while the mobile device is in a first context, detecting that the mobile device is currently in a second context, different from the first context, and upon the detecting, changing the option to a second setting, different from the first setting. The option may be, for example, a ringer. The first setting may to enable ringing, and the second setting may be to enable vibration. The first context may be "COMMUTE." The second context may be "THEATER."

In a specific implementation, modification of resource-usage policies can be by administrators, parents, etc. A "reserve" in resource usage may be provided to allow the completion of a certain number of activities of certain types, e.g., "can make at least one phone call of 3 minutes duration").

In a specific implementation, the system uses information about the structural relationship amongst different resources to optimize or improve resource usage; e.g., CPU processor activity consumes a certain amount of battery power; thus a policy template goal to reduce battery usage can accomplish this by choosing a policy action which reduces CPU processor activity (which, by the modeled or discovered (via data mining) structural relationship between CPU processor activity and battery power consumption, will therefore reduce battery power consumption).

In a specific implementation, the system provides for the use of an external context-enhancement service to obtain additional information which can be used to select appropriate policy templates for activation; ref., e.g., the example of using a context enhancement service to take GPS coordinates and obtain information about the geophysical location that this is a particular movie theater, which in the ontology is modeled as a conceptual MOVIE-THEATER which inherits properties from parent concept node PERFORMANCE-VENUE, which may have associated with it a set of policy templates which can be activated when the user's current context is a PERFORMANCE-VENUE (e.g., turn phone ringer from ring to vibrate, turn off WiFi and GPS services).

In a specific implementation, a system provides for the use of {context-situation discovery, context-behavior discovery} and data mining based frequency analysis to surface/discover frequently occurring contexts for which an administrator can author policy templates and attach them to those particular contexts.

In a specific implementation, a system provides mined context situations and context behaviors to third parties, for their use in, e.g., modeling typical user workloads on devices in typical situations, for the purposes of optimizing or improving the design of device features and applications. For example, the system can make context situations available through an API or software development kit (SDK).

In a specific implementation, a system provides for the usage of planned future events (e.g., from a user's calendar) to inform the resource prediction method about (a) likely future resource usage, and (b) opportunities for resource reduction during such events, and (c) anomalous extensions to the usual context behaviors (e.g., user has concert tickets tonight at 8 pm and thus won't be at home where a battery charger is even though that's the normal context behavior for this user).

In a specific implementation, a system provides for context behavior adaptation via prefetch (e.g., the music player example), context behavior adaptation via postfetch (as per example discussed above), and context behavior adaptation via substitution (see the example above of arranging VOIP switchover for voice calls).

In a specific implementation, a system provides for use of knowledge about which device a user is currently attending (paying attention to) to drive decisions about which resource conservation actions may be acceptable. In a specific implementation, a system provides for serving ads based on context situations and context behaviors, including the anonymity of ad matching, the auction for ad matching to contexts, etc. In a specific implementation, a system provides for optimizing or prioritizing the choice of what set of active policy templates can be used to achieve a particular goal. In a specific implementation, a system provides for privacy preservation regarding the use and dissemination of context information.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method comprising:
obtaining, by a server, context information including usage information and location information of a mobile communication device;
analyzing, by the server, the collected context information to determine a first time and a first place when and where it will be acceptable for a battery of the mobile communication device to fall below a threshold charge level;
examining, by the server, current usage information for the mobile communication device to predict a second time at which the battery will fall below the threshold charge level;
examining, by the server, the context information for the mobile communication device to predict a place where the mobile communication device will be at the second time; and
if the second time is at least a predetermined amount of time before the first time and if the predicted place at the second time is different than the first place, reducing usage of the battery by transmitting instructions from the server to the mobile communication device to change a setting on the mobile communication device from a first value to a second value, wherein the mobile communication device consumes less of the battery when the setting is at the second value than when the setting is at the first value.

2. The method of claim 1 wherein the behavior information is collected by the server.

3. The method of claim 1 wherein the reducing the usage of the battery comprises:
receiving at the mobile communication device an instruction from the server to disable one or more services on the mobile communication device.

4. The method of claim 1 comprising:
not reducing the usage of the battery if the second time is a predetermined amount of time after the first time.

5. A method comprising:
determining, by a server, using context information including usage information and location information of a mobile communication device, a first time and a first place when and where it will be acceptable for a battery of the mobile communication device to fall below a threshold charge level;
predicting, by the server, a second time at which the battery will fall below the threshold charge level; and
predicting, by the server, using the context information, a place where the mobile communication device will be at the second time; and
if the second time is at least a predetermined amount of time before the first time and if the predicted place is not the same as the first place, reducing usage of the battery by transmitting instructions from the server to the mobile communication device to change a setting on the mobile communication device from a first value to a second value, wherein the mobile communication device consumes less of the battery when the setting is at the second value than when the setting is at the first value.

6. The method of claim 5 comprising:
not reducing the usage of the battery if the second time is at least a predetermined amount of time after the first time.

7. The method of claim 5 comprising:
interpolating between a first data point and a second data point to predict the second time, wherein the first data point corresponds to a first charge level of the battery that is recorded at a third time, and the second data point corresponds to a second charge level of the battery that is recorded at a fourth time.

8. The method of claim 5 wherein the reducing the usage of the battery comprises:
automatically reducing the usage of the battery.

9. The method of claim 5 comprising:
before the reducing the usage of the battery, prompting a user of the mobile communication device with a suggestion on how to reduce the usage of the battery.

10. The method of claim 5 comprising:
before the reducing the usage of the battery, prompting a user of the mobile communication device for permission to reduce the usage of the battery.

11. The method of claim 5 wherein the reducing the usage of the battery comprises at least one of dimming a brightness of a screen of the mobile communication device, disabling Wi-Fi network connectivity on the mobile communication device, disabling Bluetooth connectivity on the mobile communication device, starting an application on the mobile communication device, closing an application on the mobile communication device, or disabling a global positioning system (GPS) receiver on the mobile communication device.

12. The method of claim 5 wherein when the battery falls below the threshold charge level, the mobile communication device automatically shuts down.

13. A method comprising:
determining, by a server, using context information including usage information and location information of a mobile communication device, a first time and a first place when and where it will be acceptable for a battery of the mobile communication device to fall below a threshold charge level;
storing a plurality of data points, each data point corresponding to a specific charge level of the battery measured at a specific time;
predicting, by the server, using the stored plurality of data points, a second time at which the battery will fall below the threshold charge level;
predicting, by the server, using the context information, a place where the mobile communication device will be at the second time;
determining, by the server, that the second time is at least a predetermined amount of time before the first time; and
if the second time is at least a predetermined amount of time before the first time and the predicted place at the second time is different than the first place, reducing usage of the battery by transmitting instructions from the server to the mobile communication device to change a setting on the mobile communication device from a first value to a second value, wherein the mobile communication device consumes less of the battery when the setting is at the second value than when the setting is at the first value.

14. The method of claim 13 wherein the reducing the usage of the battery comprises:
substituting services provided by a first application program currently running on the mobile communication device with services provided by a second application program not currently running on the mobile communication device, wherein the second application program consumes less of the battery than the first application program.

15. The method of claim 13 comprising:
before the reducing the usage of the battery, prompting a user of the mobile communication device to change a setting of the mobile communication device from a first value to a second value.

16. The method of claim 13 comprising:
before the reducing the usage of the battery, prompting a user of the mobile communication device for permission to change a setting of the mobile communication device;
receiving the permission; and
upon receipt of the permission, changing the setting.

17. The method of claim 13 wherein the reducing the usage of the battery comprises:
storing a location of the mobile communication device;
intercepting a request from an application program for a current location of the mobile communication device;
retrieving the stored location; and
providing the stored location to the application program in response to the request, wherein the location of the mobile communication device is stored on the mobile communication device before the intercepting the request from the application program.

18. A method comprising the steps of:
on a mobile communications device having an activity monitor component, collecting by the activity monitor component context information including a plurality of activities associated with usage of the mobile communications device and location information of the mobile communications device, and receiving at the mobile communications device a plurality of activity policies from a server;
on the mobile communication device, analyzing the context information collected by the activity monitor component to estimate a first time and a first place when and where the mobile communications device battery will fall below a predetermined charge level;
on the mobile communication device, subsequent to the estimation of the first time and the first place, collecting by the activity monitor component current context information about the mobile communications device;
on the mobile communications device, using the current context information collected by the activity monitor component, estimating a second time and a place when and where the mobile communications device battery will fall below the predetermined charge level based upon current context information; and,
if the estimated second time is a predetermined amount of time before the first estimated time and if the estimated place at the second time is different than the first place, then employing an activity policy manager on the mobile communications device to implement at least one activity policy on the mobile communications device to reduce battery usage by changing a setting on the mobile communication device from a first value to a second value, wherein the mobile communication device consumes less of the battery when the setting is at the second value than when the setting is at the first value, such that upon re-estimating in view of the implemented at least one activity policy, the estimated second time is the same as or later than the estimated first time.

19. A method comprising the steps of:
on a mobile communication device, using context information including usage information and location information of a mobile communication device, determining an original battery glide path projection with a first battery exhaustion point and a first battery exhaustion place;
on the mobile communication device, at a time subsequent to the determination of the original battery glide path projection, determining a current battery glide path projection with a second battery exhaustion point and a place; and
if the second battery exhaustion point is more than a predetermined amount of time before the first battery exhaustion point, and before an earliest acceptable exhaustion point, and if the place at the second battery exhaustion point is different than the first place, then, on the mobile communication device, employing an activity policy manager to cause a reduction in battery usage by changing a setting on the mobile communication device from a first value to a second value, wherein the mobile communication device consumes less of the battery when the setting is at the second value than when the setting is at the first value, the reduction in battery usage sufficient to allow a third battery exhaustion point to occur at the same time or later than the first exhaustion point, wherein the first battery exhaustion point is after the earliest acceptable exhaustion point.

20. A method comprising the steps of:
on a mobile communications device, using context information including usage information and location information of a mobile communication device, determining a first projected battery exhaustion point and a first projected battery exhaustion place;
on the mobile communication device, at a time subsequent to the determination of the first projected battery exhaustion point, determining a second projected battery exhaustion point and a place based upon information about the battery and about the then-current context information of the mobile communication device; and
if the second projected battery exhaustion point is more than a predetermined amount of time before the first projected battery exhaustion point, and before an earliest acceptable exhaustion point, and if the place at the second projected battery exhaustion point is different than the first battery exhaustion place, then, on the mobile communication device, employing an activity policy manager to cause a reduction in battery usage by changing a setting on the mobile communication device from a first value to a second value, wherein the mobile communication device consumes less of the battery when the setting is at the second value than when the setting is at the first value, the reduction in battery usage sufficient to allow a third battery exhaustion point to occur at the same time or later than the first projected battery exhaustion point, wherein the first projected battery exhaustion point is after the earliest acceptable exhaustion point.

21. The method of claim 1 wherein the first time is associated with the mobile communication device being in a specific context, and the reducing usage of the battery comprises:
reducing usage of the battery if the second time is at least a predetermined amount of time before the first time, and if the second time is before a starting time of the specific context.

22. The method of claim 21 wherein the specific context comprises an indication that the battery of the mobile communication device is charged during the specific context.

* * * * *